(12) United States Patent
Henry et al.

(10) Patent No.: US 10,104,863 B1
(45) Date of Patent: Oct. 23, 2018

(54) ROBOTIC ARM WITH IMPROVED TRACKING

(71) Applicant: Technologies Holdings Corp., Houston, TX (US)

(72) Inventors: Joel R. Henry, Manvel, TX (US); Bruce A. Schroeder, Houston, TX (US); Adam R. Hachey, Philadelphia, PA (US); Rizwan Ajaz, Manvel, TX (US); Peter Willem van der Sluis, Ijsselmuiden (NL)

(73) Assignee: Technologies Holdings Corporation, Houston, TX (US)

( * ) Notice: Subject to any disclaimer, the term of this patent is extended or adjusted under 35 U.S.C. 154(b) by 0 days.

(21) Appl. No.: 15/948,645

(22) Filed: Apr. 9, 2018

Related U.S. Application Data

(63) Continuation of application No. 15/884,792, filed on Jan. 31, 2018.

(51) Int. Cl.
*A01J 7/04* (2006.01)
*B25J 9/16* (2006.01)
(Continued)

(52) U.S. Cl.
CPC . *A01J 7/04* (2013.01); *B25J 5/02* (2013.01); *B25J 9/1679* (2013.01); *B25J 9/1697* (2013.01); *B25J 15/0019* (2013.01); *B25J 15/04* (2013.01); *A01K 1/126* (2013.01); *Y10S 901/02* (2013.01); *Y10S 901/09* (2013.01)

(58) Field of Classification Search
CPC .. A01J 5/0175; A01J 7/04; A01J 5/017; A01J 5/007; A01J 7/025; A01J 5/044; A01J 7/00; A01J 5/003; A01J 5/0075; A01J 5/013; A01J 5/08; A01J 7/02; A01J 7/022; A01J 11/06; A01J 5/01; A01J 5/0132; A01J 5/0133; A01J 5/04; A01J 5/041;
(Continued)

(56) References Cited

U.S. PATENT DOCUMENTS 6,363,883 B1 * 4/2002 Birk .................. A01J 5/0175
119/14.08
6,532,892 B1 * 3/2003 Nilsson .............. A01J 5/0175
119/14.03
(Continued)

FOREIGN PATENT DOCUMENTS

WO WO2015/009158 1/2015

*Primary Examiner* — Yvonne R Abbott-Lewis
(74) *Attorney, Agent, or Firm* — Baker Botts L.L.P.

(57) ABSTRACT

An apparatus includes a carriage, camera, spray tool, and controller. The carriage is movably coupled to a track. The camera and spray tool are coupled to the carriage. The controller moves the carriage along the track away from a starting position based on a first signal from the camera, and as the carriage moves away from the starting position, discharges, through the spray tool, a solution for a first time. The controller moves the carriage towards the starting position after the solution has been discharged for the first time, and based on a second signal from the camera as the carriage moves towards the starting position and before the carriage reaches the starting position, moves the carriage away from the starting position. As the carriage moves away from the starting position, the controller discharges, through the spray tool, the solution for a second time.

21 Claims, 66 Drawing Sheets

US 10,104,863 B1
Page 2

(51) Int. Cl.
*B25J 15/00* (2006.01)
*B25J 15/04* (2006.01)
*B25J 5/02* (2006.01)
*A01K 1/12* (2006.01)

(58) Field of Classification Search
CPC ........ A01K 1/12; A01K 1/126; A01K 11/006; A01K 11/004
USPC ............ 119/14.08, 14.02, 14.18, 670, 14.03, 119/14.04, 14.1, 14.14, 651, 14.01, 14.47, 119/51.02, 14.11, 14.51, 14.12, 14.15, 119/14.44, 14.45, 14.54, 421, 516, 518, 119/520, 523, 652, 665, 908
See application file for complete search history.

(56) References Cited

U.S. PATENT DOCUMENTS

| | | | | |
|---|---|---|---|---|
| 6,626,130 | B1* | 9/2003 | Eriksson | A01J 7/025 119/651 |
| 7,246,571 | B2* | 7/2007 | Van Den Berg | A01J 5/0175 119/14.02 |
| 7,299,766 | B2* | 11/2007 | Van Den Berg | A01J 5/0175 119/14.02 |
| 7,377,232 | B2* | 5/2008 | Holmgren | A01J 5/0175 119/14.02 |
| 8,210,122 | B2* | 7/2012 | Pettersson | A01J 5/0175 119/14.08 |
| 8,393,296 | B2* | 3/2013 | Hofman | A01J 5/0175 119/14.08 |
| 8,671,885 | B2* | 3/2014 | Hofman | A01J 5/0175 119/14.02 |
| 8,707,905 | B2 | 4/2014 | Hofman et al. | |
| 8,787,621 | B2* | 7/2014 | Spicola, Sr. | G01G 9/00 382/100 |
| 9,901,067 | B2* | 2/2018 | Hofman | A01J 5/0175 |
| 2001/0024514 | A1* | 9/2001 | Matsunaga | G05D 1/0246 382/106 |
| 2002/0108576 | A1* | 8/2002 | Lely | A01K 1/12 119/14.02 |
| 2003/0097990 | A1* | 5/2003 | Bjork | A01J 5/0175 119/14.08 |
| 2004/0103846 | A1* | 6/2004 | Fransen | A01J 7/022 119/14.03 |
| 2005/0223997 | A1* | 10/2005 | Umegard | A01K 1/12 119/14.03 |
| 2006/0196431 | A1* | 9/2006 | Kaever | A01K 1/126 119/14.04 |
| 2007/0137579 | A1* | 6/2007 | Osthues | A01K 1/0088 119/14.03 |
| 2007/0277737 | A1* | 12/2007 | Maier | A01J 5/007 119/14.45 |
| 2008/0202432 | A1* | 8/2008 | Petterson | A01J 5/017 119/14.03 |
| 2010/0031889 | A1* | 2/2010 | Eriksson | A01K 1/126 119/14.02 |
| 2010/0095893 | A1* | 4/2010 | Kallen | A01J 5/0175 119/14.04 |
| 2010/0186675 | A1* | 7/2010 | Van Den Berg | A01J 5/0175 119/14.03 |
| 2010/0282172 | A1* | 11/2010 | Eriksson | A01J 5/007 119/14.02 |
| 2010/0289649 | A1* | 11/2010 | Holmgren | A01J 5/0175 340/573.3 |
| 2011/0114024 | A1* | 5/2011 | Van Den Berg | A01J 5/0175 119/14.02 |
| 2011/0239945 | A1* | 10/2011 | Van Den Berg | A01J 5/0175 119/14.02 |
| 2012/0000427 | A1* | 1/2012 | Nilsson | A01K 1/126 119/14.02 |
| 2012/0006269 | A1* | 1/2012 | McCain | A01J 5/007 119/14.02 |
| 2012/0048208 | A1* | 3/2012 | Hofman | A01J 7/04 119/651 |
| 2012/0180729 | A1* | 7/2012 | Van Dorp | A01J 5/0175 119/14.08 |
| 2018/0103604 | A1* | 4/2018 | Hofman | H04N 13/204 |

\* cited by examiner

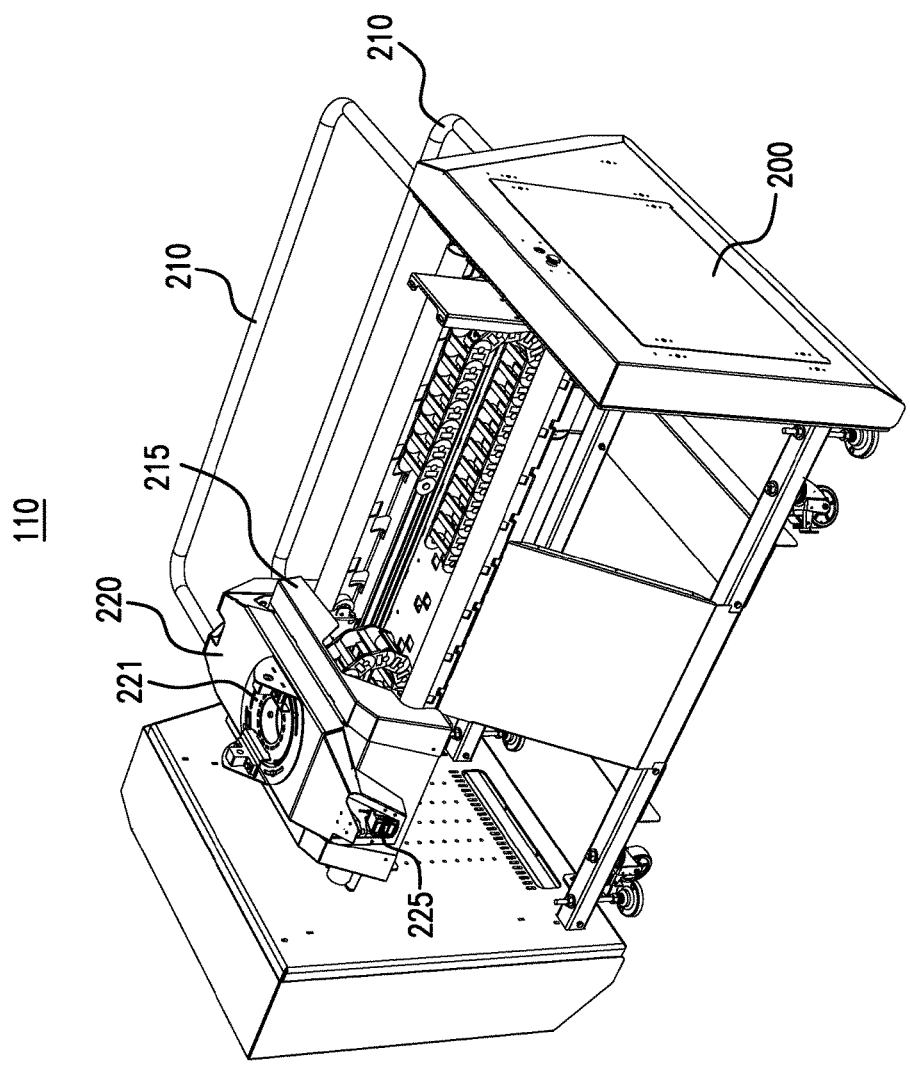

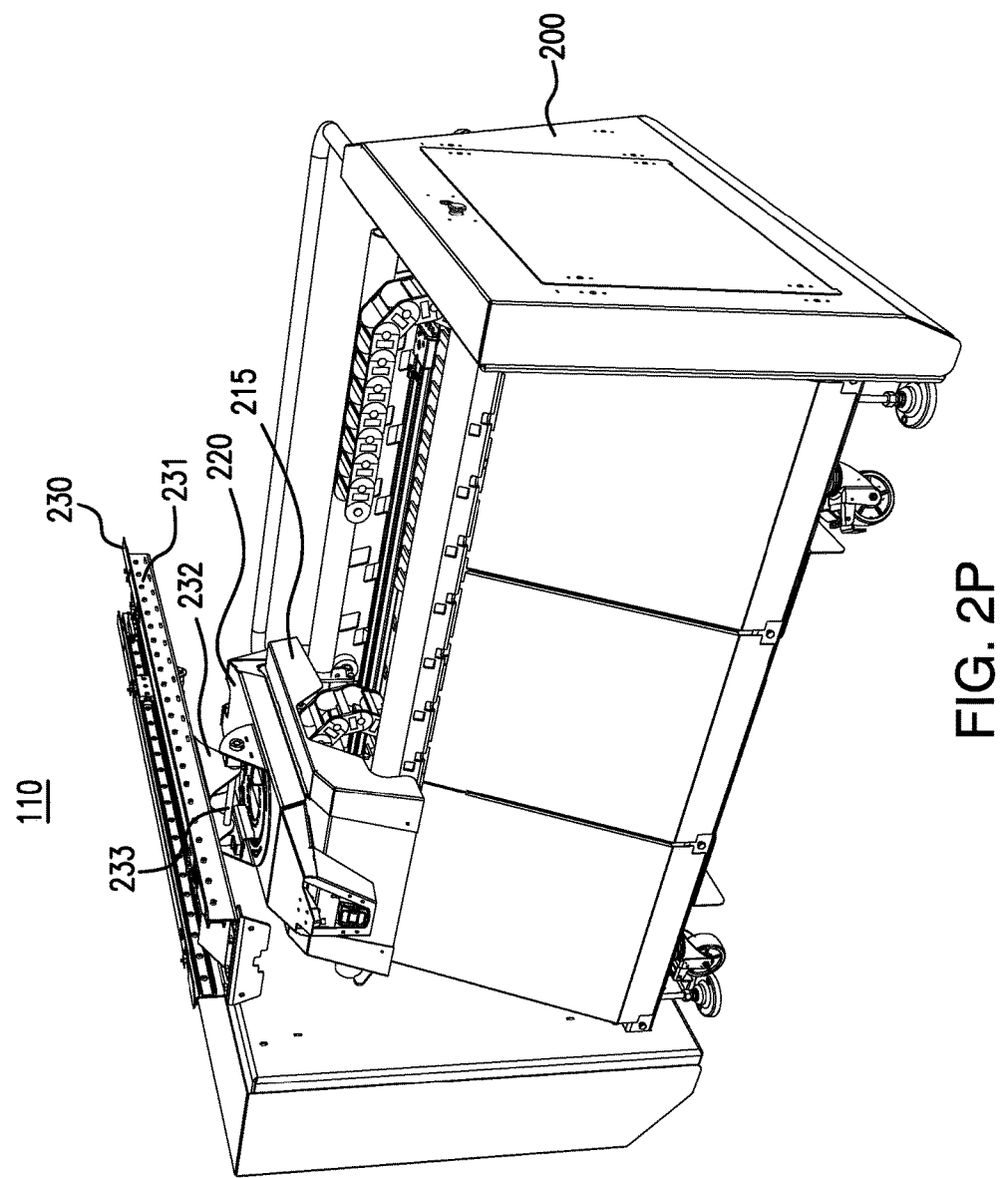

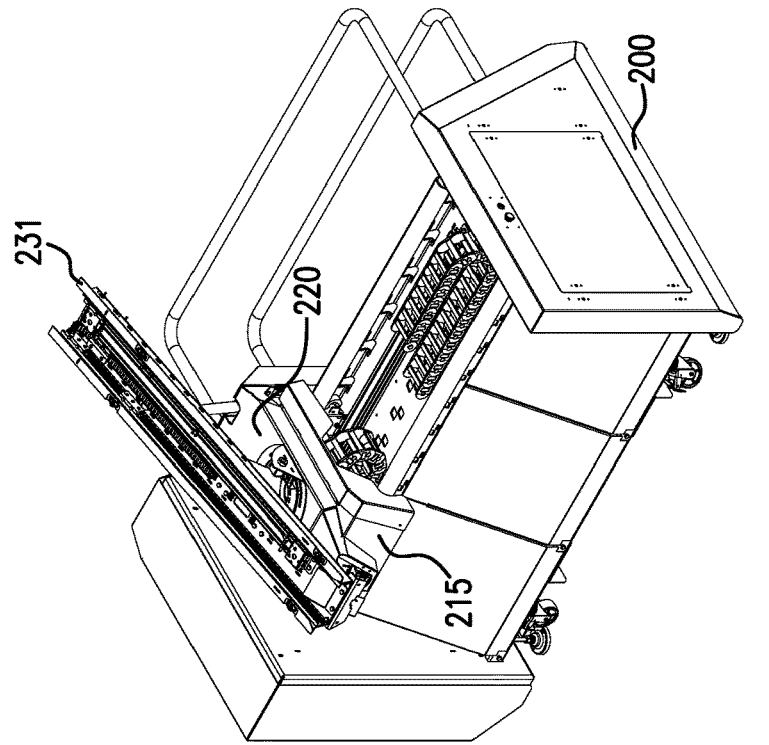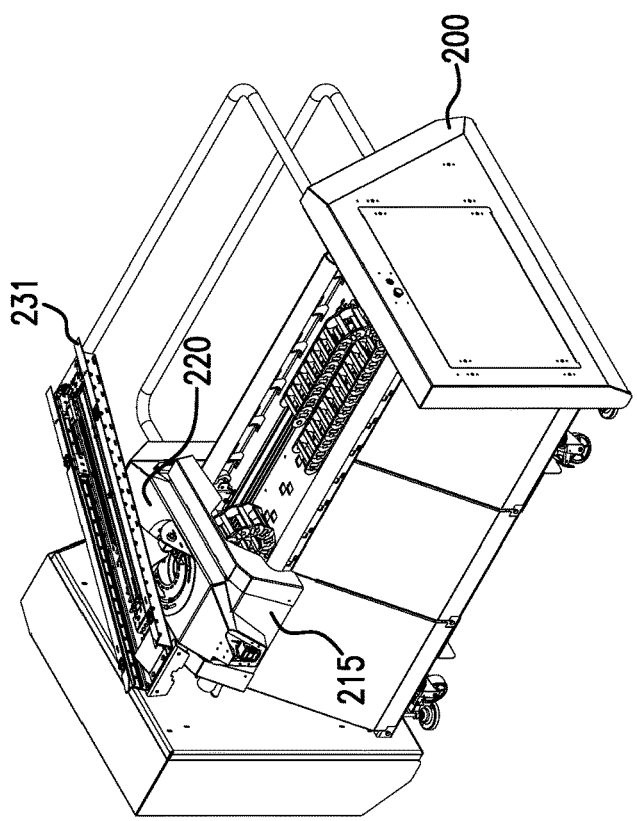
FIG. 2T

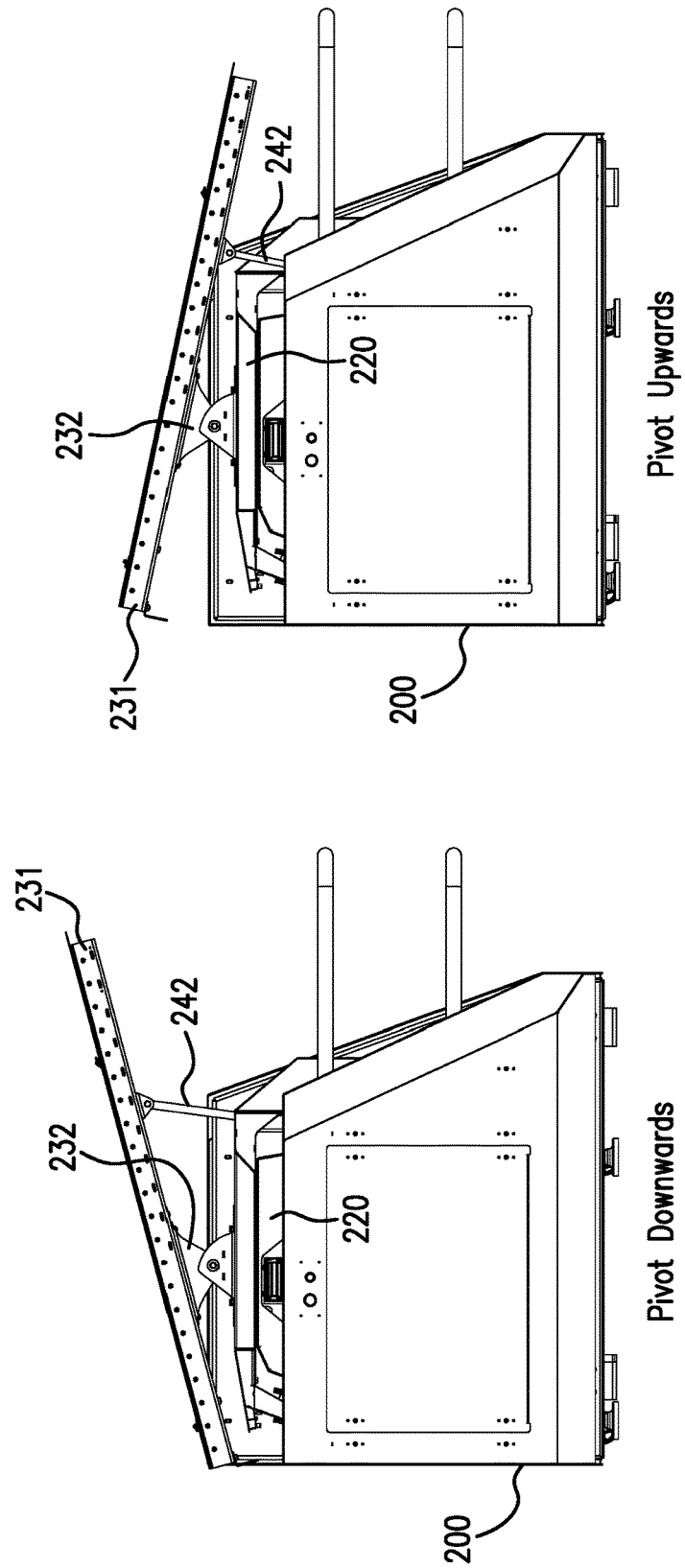

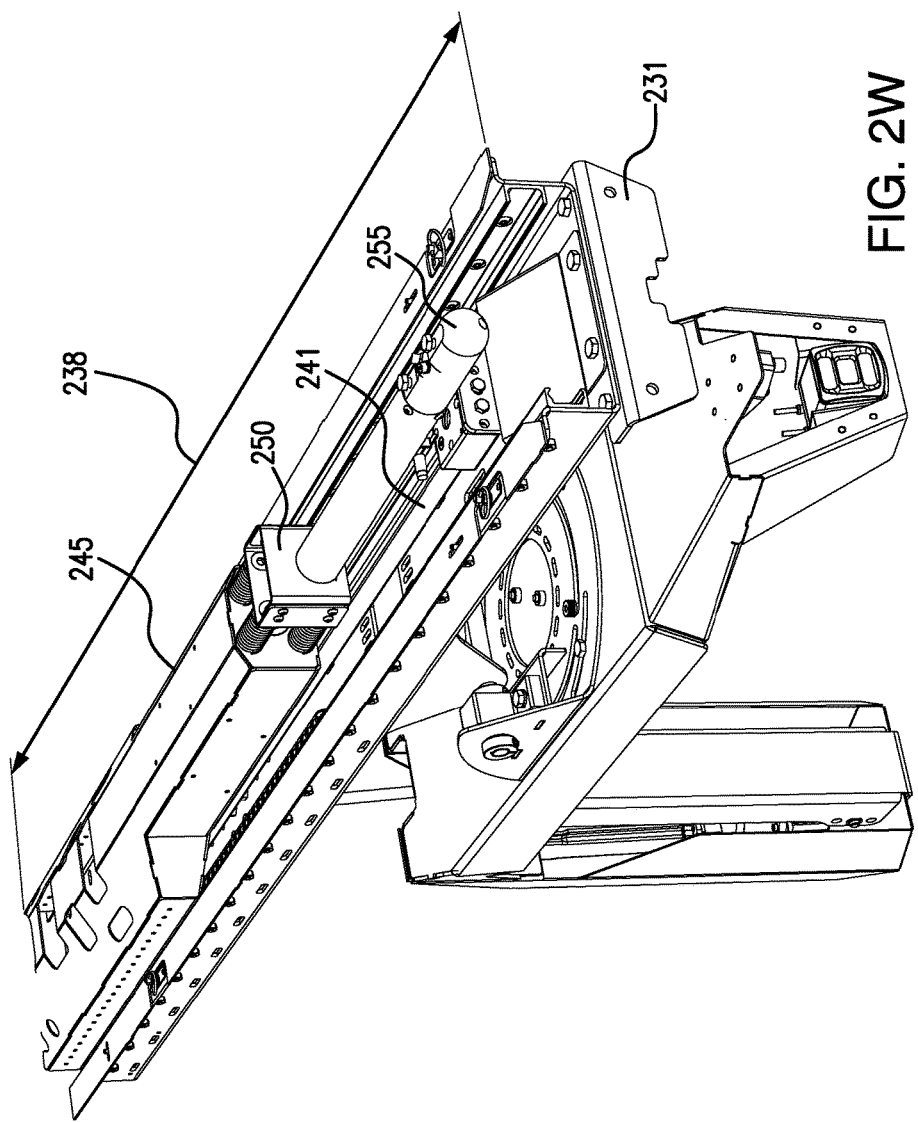

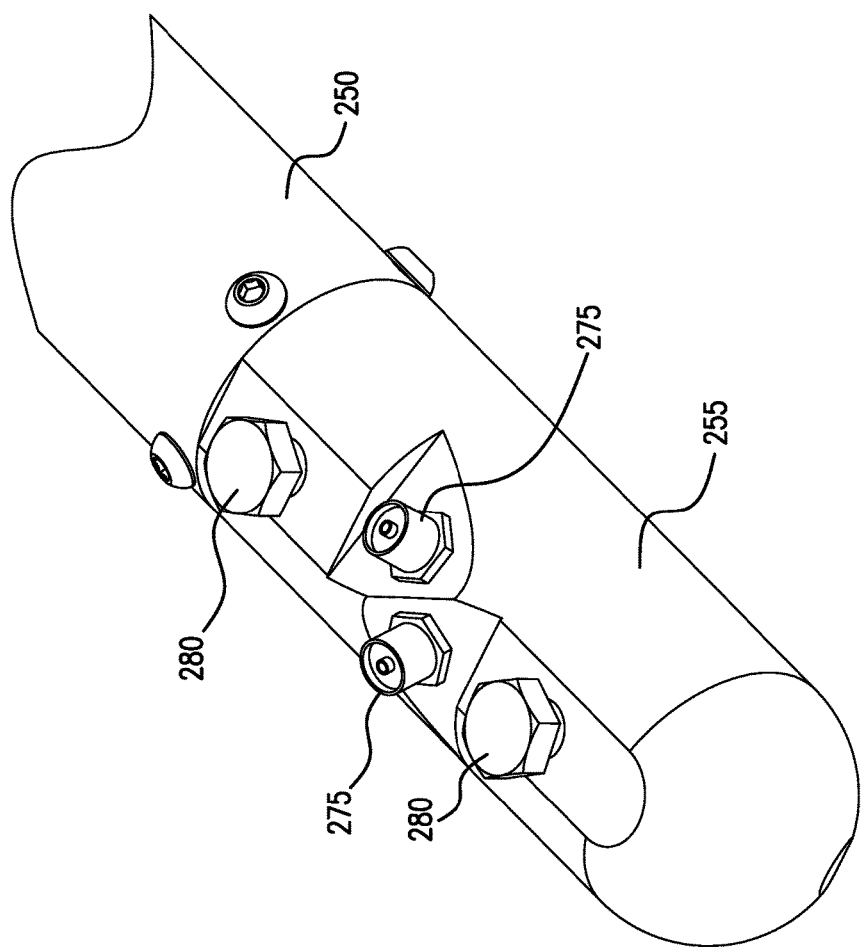

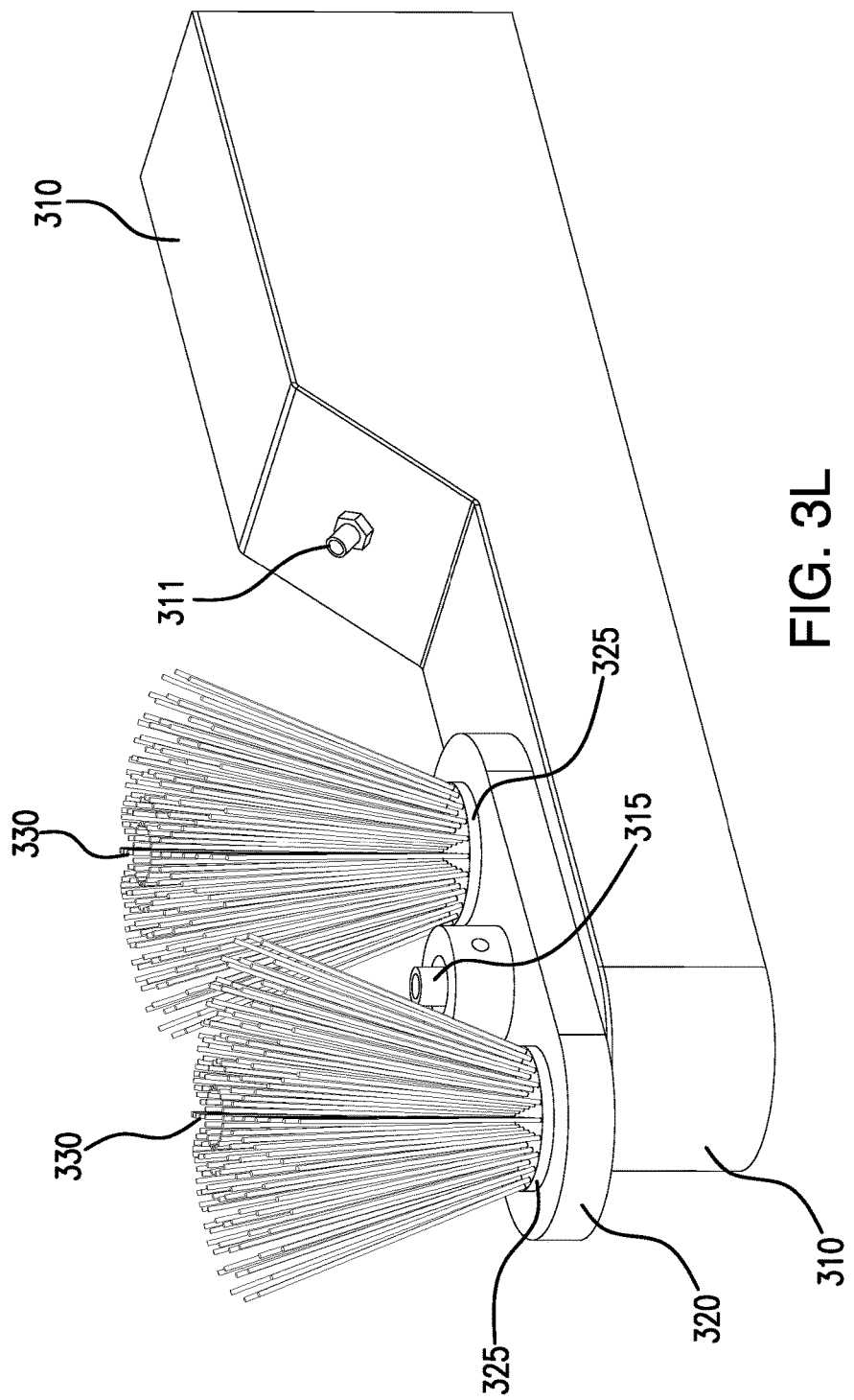

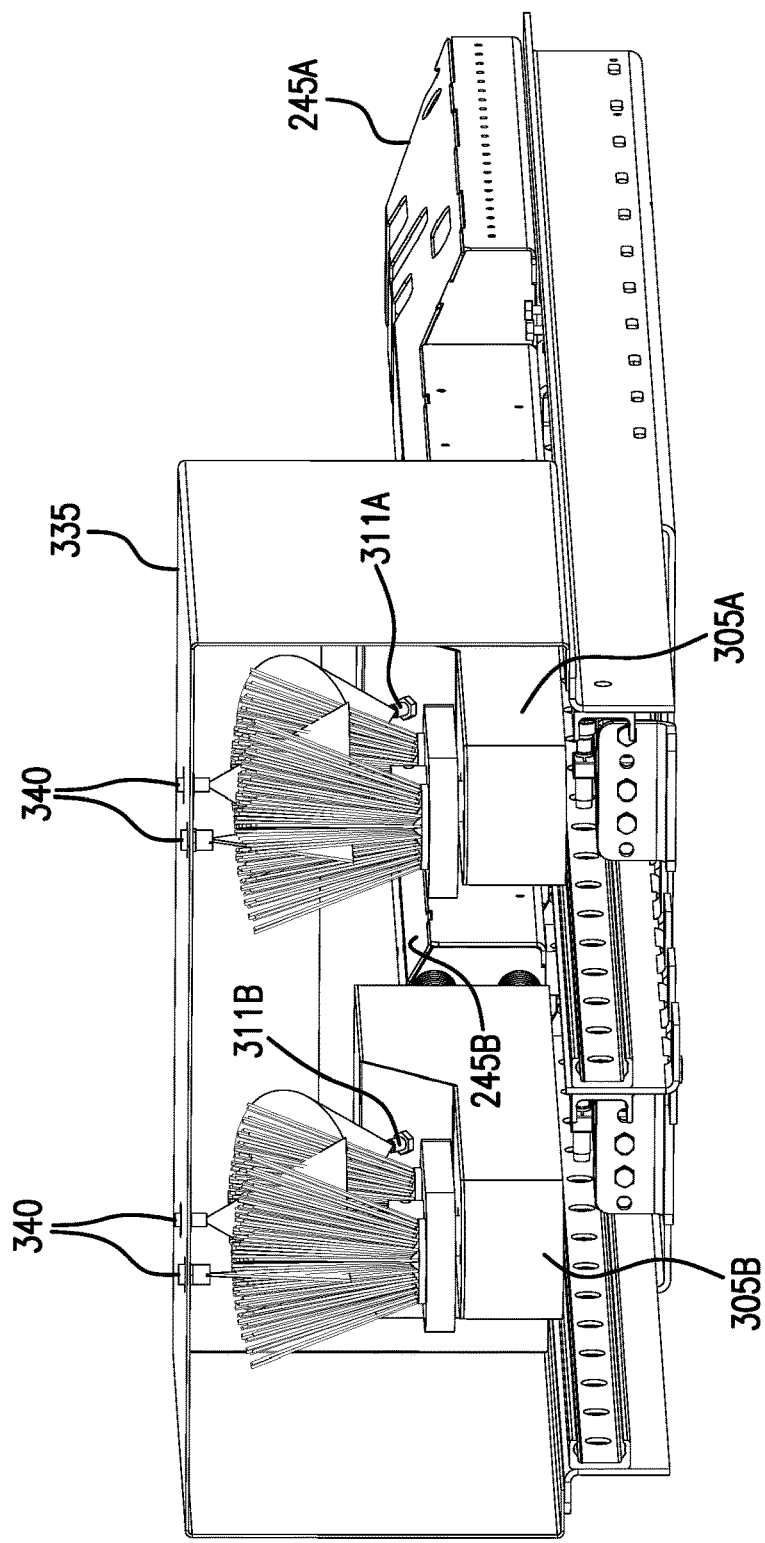

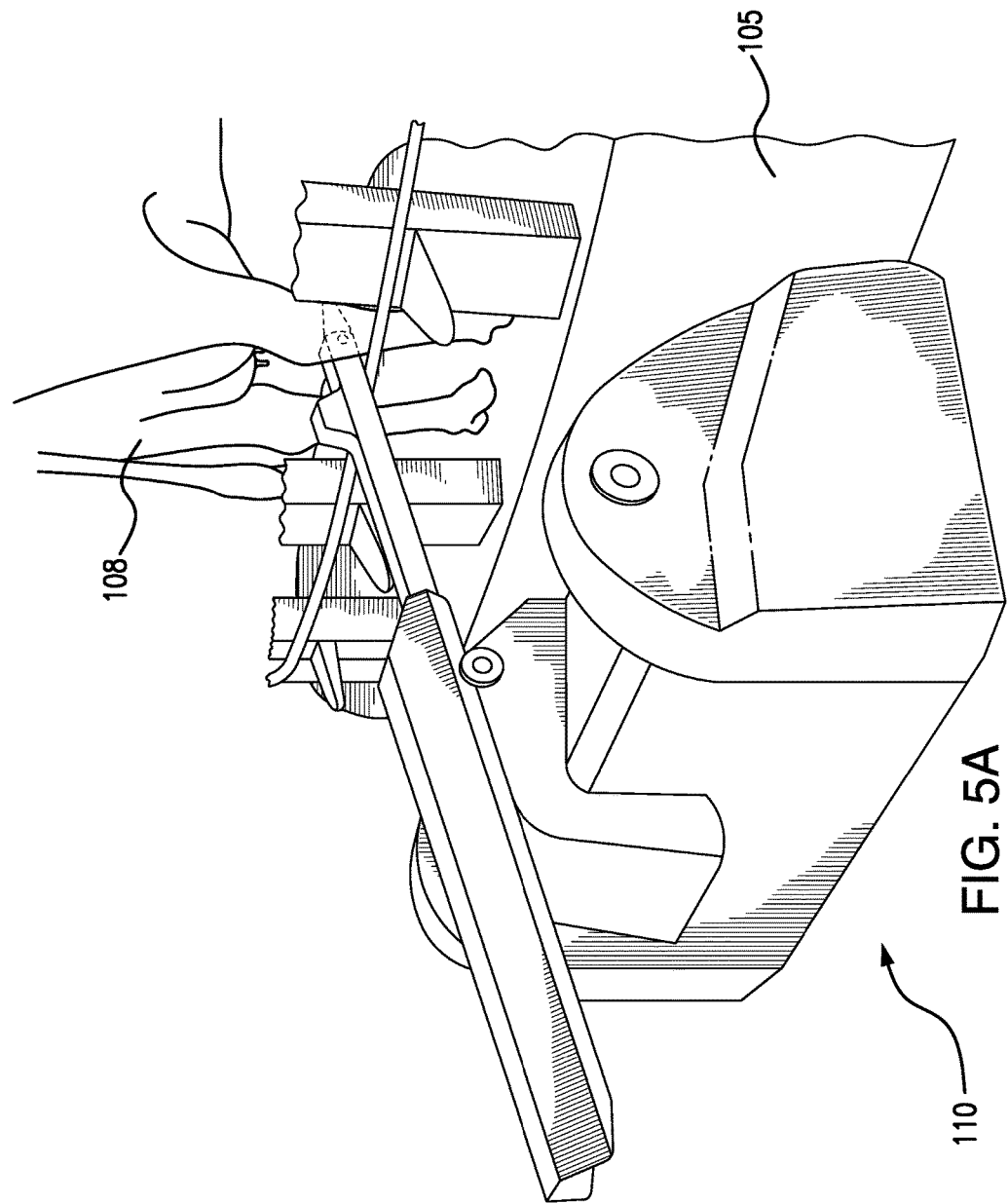

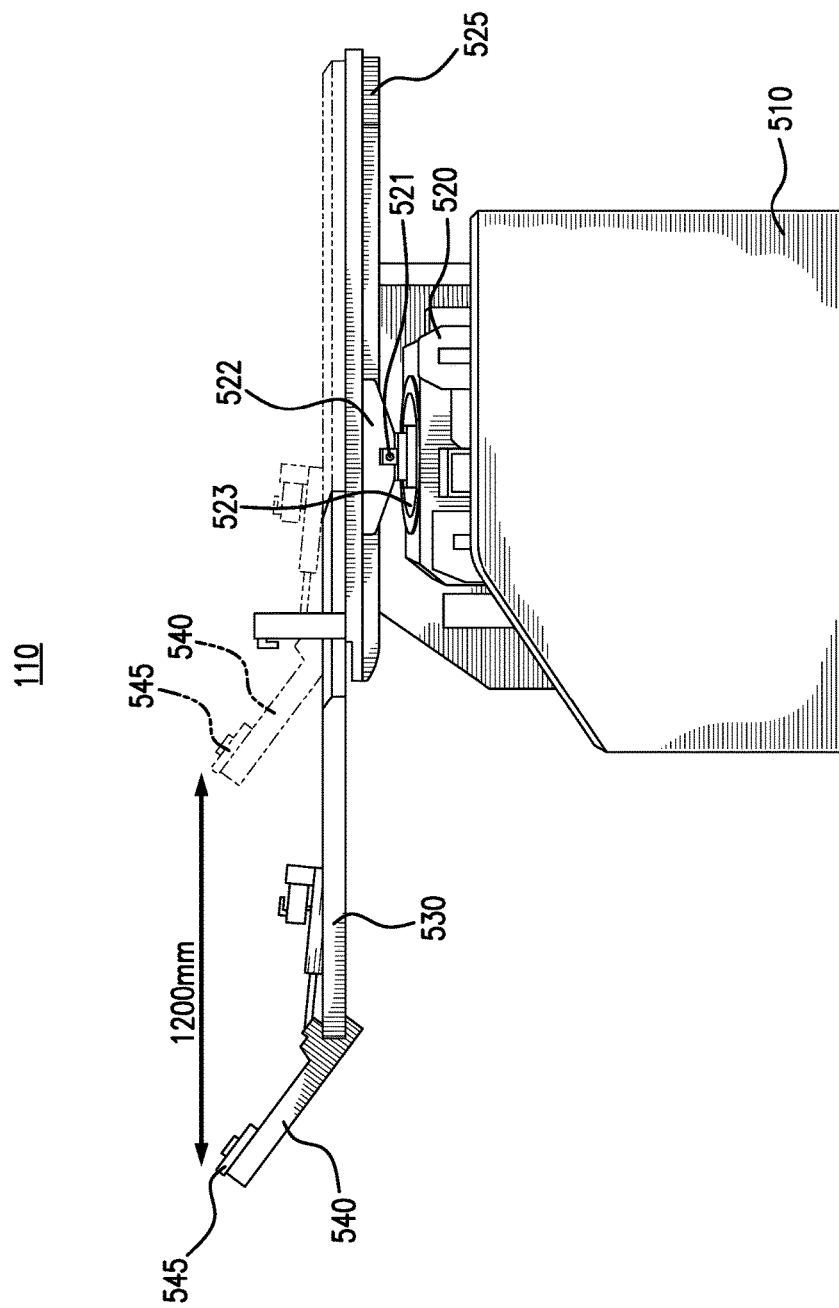

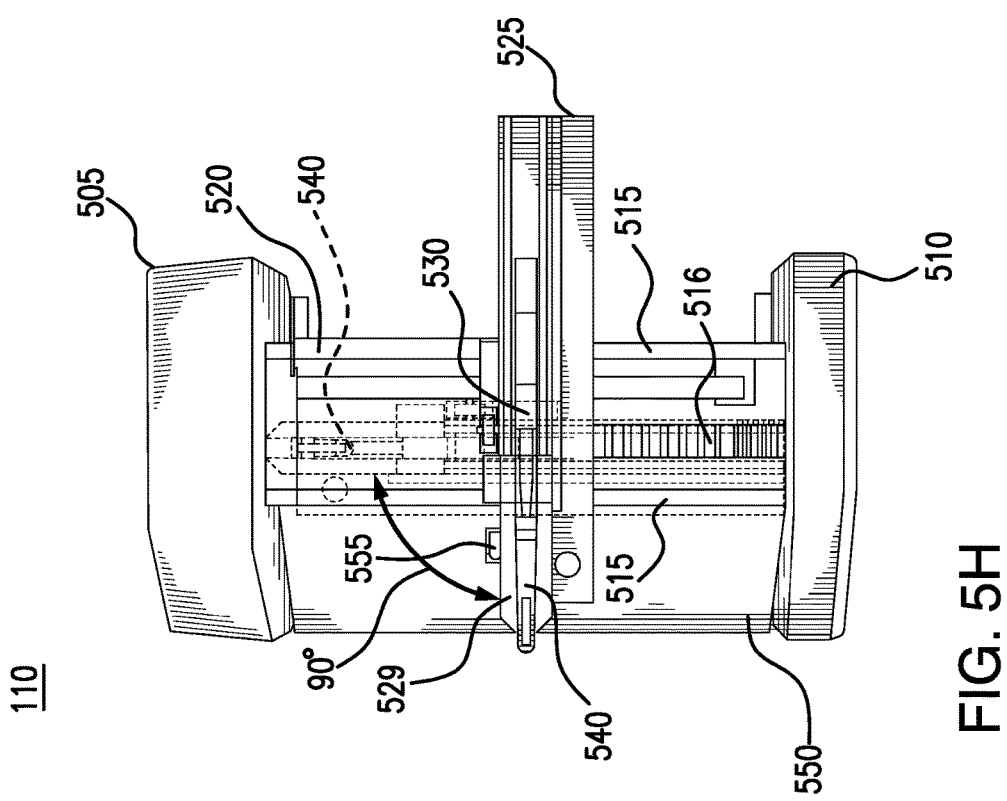

ROBOTIC ARM WITH IMPROVED TRACKING

CROSS-REFERENCE TO RELATED APPLICATIONS

This application is a continuation of U.S. patent application Ser. No. 15/884,792 filed on Jan. 31, 2018 and entitled "Robotic Arm."

TECHNICAL FIELD

This disclosure relates generally to a robotic arm with improved tracking.

BACKGROUND

A cow can be milked by attaching a milking device to the cow's udder that automates the milking process. This automated milking process is typically faster and more efficient than milking the cow by hand. The milking device may pass bacteria and/or viruses between cows, which could cause the spread of disease and/or infections.

SUMMARY OF THE DISCLOSURE

This disclosure contemplates an unconventional robotic arm that automatically detects and cleans the teats of a cow's udder as the cow is rotated in a rotary. The arm includes a carriage, a pivoting platform, an extension member, and one or more of a spray tool and a brush. The carriage moves along a track to follow the cow in the rotary. The pivoting platform is coupled to the carriage and pivots upwards and downwards to adjust an angle at which the robotic arm approaches the cow. The extension member is coupled to the platform and extends towards the cow along the trajectory set by the pivoting platform. The spray tool or brush is coupled to the end of the extension member. The robotic arm moves the carriage along the tracks, pivots the platform, and extends the extension member to position the spray tool or the brush near the teats of the cow's udder. The spray tool then discharges a disinfectant solution to the teats of the cow's udder. Alternatively, the brush cleans the surface of the teats. In this manner, the cow's udder can be cleaned or disinfected to prevent the spread of disease and infections. Additionally, the brush tool may stimulate the teats of the cow to encourage milk letdowns, which makes it easier to milk the cow.

A camera mounted on the arm (e.g. on the carriage) sends signals to a controller so that the controller can detect the presence and position of the cow in the rotary. When the cow is detected, the controller moves the carriage at a certain speed to track the cow as it is rotated in the rotary. The controller then pivots the platform and extends the extension member to position the spray tool or brush between the hind legs of the cow and near the cow's udder. The controller activates the spray tool or brush so that it cleans the cow's udder. The controller can reposition the arm so that it can clean each teat on the cow's udder. Two embodiments are described below. The first embodiment describes an apparatus (e.g., the robotic arm) and the second embodiment describes a method that may be performed by the robotic arm.

According to an embodiment, an apparatus includes a carriage, a foundation, a pivot coupler, a platform, a coupler, a linear actuator, an extension member, a spray tool member, and a controller. The carriage is coupled to a track along a bottom surface of the carriage. The carriage is configured to move along the track. The foundation is coupled to a top surface of the carriage. The top surface of the carriage is opposite the bottom surface of the carriage. The pivot coupler is coupled to the foundation. The platform includes a top surface and a bottom surface. The bottom surface of the platform is opposite the top surface of the platform. The top surface of the platform has a length in a lengthwise direction and a width orthogonal to the length. The length is greater than the width. The coupler is coupled to the bottom surface of the platform. The coupler is configured to couple the platform to the pivot coupler such that the platform may pivot about the pivot coupler. The linear actuator is coupled to the top surface of the platform. The extension member is coupled to the linear actuator such that the linear actuator may move the extension member in the lengthwise direction along the platform and away from the carriage. The spray tool member is coupled to the extension member. The controller is configured to cause the carriage to move along the track, the platform to pivot, and the extension member to move in the lengthwise direction to position a spray tool coupled to the spray tool member at a spray position from which the spray tool may discharge a solution to a teat of a dairy livestock.

According to another embodiment, a method includes moving a carriage along a track. The carriage is coupled to the track along a bottom surface of the carriage. A foundation is coupled to a top surface of the carriage. The top surface of the carriage is opposite the bottom surface of the carriage. A pivot coupler is coupled to the foundation. The method also includes pivoting a platform about the pivot coupler. The platform includes a top surface and a bottom surface. The bottom surface of the platform is opposite the top surface of the platform. The top surface of the platform has a length in a lengthwise direction and a width orthogonal to the length. The length is greater than the width. A coupler is coupled to the bottom surface of the platform. The coupler couples the platform to the pivot coupler. The method further includes using a linear actuator to move an extension member in the lengthwise direction along the platform and away from the carriage. The linear actuator is coupled to the top surface of the platform. The extension member is coupled to the linear actuator. The method also includes discharging, using a spray tool, a solution to a teat of a dairy livestock. The spray tool is coupled to a spray tool member. The spray tool member is coupled to the extension member.

Certain embodiments provide one or more technical advantages. For example, an embodiment includes an unconventional robotic arm that automatically cleans the teats of a cow in a rotary, which may prevent and/or limit the spread of disease and infections. As another example, an embodiment allows the robotic arm to accommodate various rotary heights by allowing an elevation of a carriage and tracks to be adjusted on the arm. As yet another example, an embodiment reduces the delay between disinfectant applications by allowing the robotic arm to detect and begin tracking a second cow after the robotic arm has finished cleaning a first cow but before the robotic arm has returned to an initial, starting position. As another example, an embodiment protects a camera mounted on the robotic from kicking and dirt buildup by mounting the camera on a carriage of the arm, rather than on a spray tool member of the arm. As yet another example, an embodiment improves the accuracy and speed at which the robotic arm positions a spray tool member by allowing for four independent degrees of motion in the robotic arm. As another example, an embodiment protects a spray tool or brush from breaking when kicked by coupling the spray tool or brush to an extension member using a spring coupler that flexes when force is applied. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIGS. 5A-5H illustrate an example robot of the system of FIG. 1;

DETAILED DESCRIPTION

Embodiments of the present disclosure and its advantages are best understood by referring to FIGS. 1 through 7 of the drawings, like numerals being used for like and corresponding parts of the various drawings.

I. Introduction

Cows can be milked by attaching milking devices to the cows' udders that automate the milking process. Each milking device may attach to all teats of a cow's udder, which allows the cow to be milked quickly with minimal human intervention. As a result, the automated milking process is typically faster, safer, and more efficient than milking the cows by hand.

As the milking device is used on different cows, bacteria and viruses begins to build on the milking device, which could lead to the spread of disease and infections. One way to reduce the risk of disease and infection is to periodically clean the teats on the cows' udders. Existing milking systems use a robot that locates the teat of a cow, positions a spray tool or brush near the teat, and cleans the teat using the spray tool or brush. However, these robots are slow to locate the teat of a cow and even slower to position the spray tool or brush in the appropriate location to clean the teat. As a result, a cow in a milking rotary may rotate too far past the robot before the robot can clean the teats of the cow, thus increasing the likelihood of disease and infection. This disclosure contemplates an unconventional robot that can quickly and accurately position a spray tool or brush to clean the teats of a cow. Various embodiments of this robot will be described in more detail using FIGS. 1 through 7. Although the examples in this disclosure describe the robot cleaning livestock in a milking environment, this disclosure contemplates the robot being used to clean an animal in any suitable environment.

Figure 1:
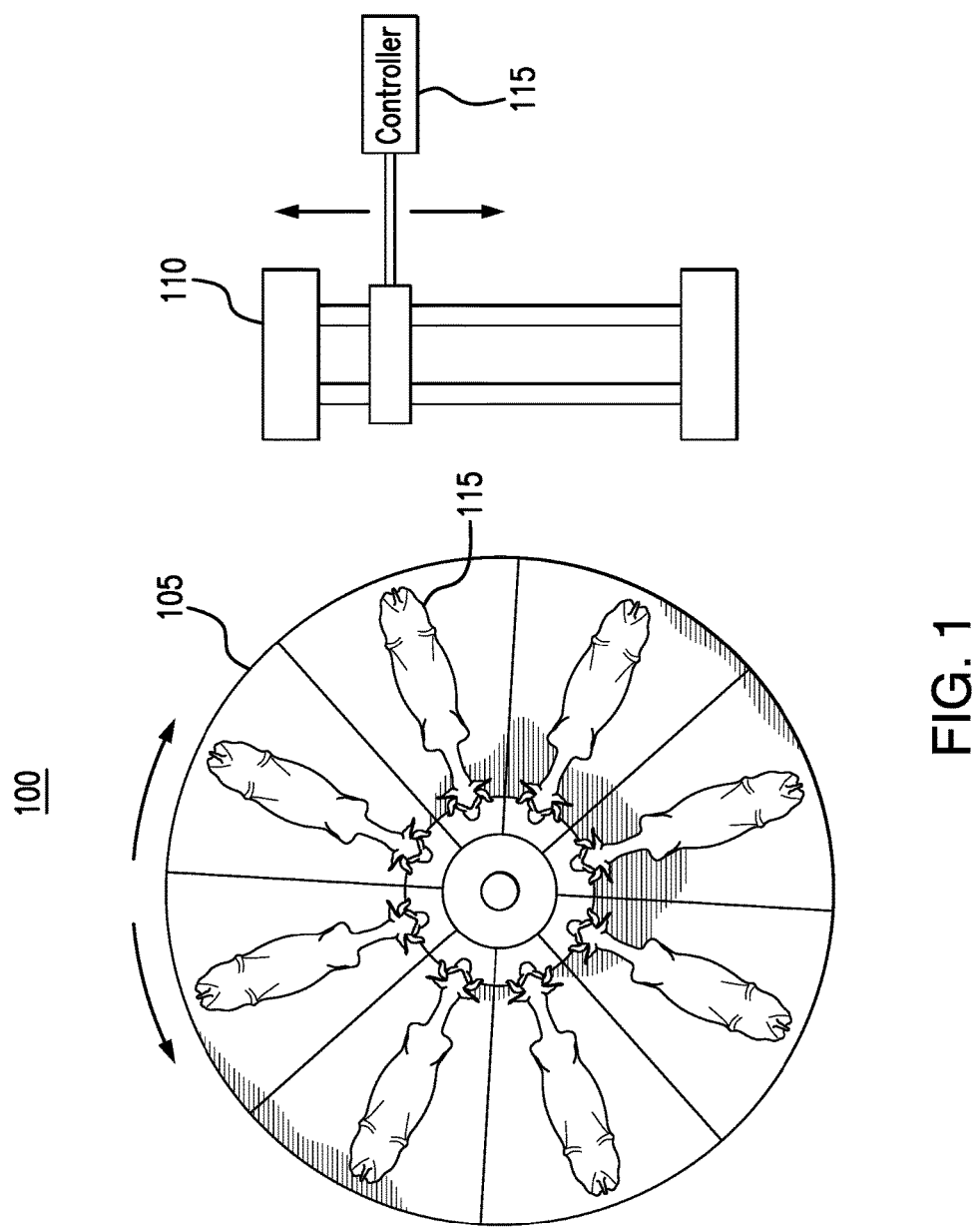
FIG. 1 illustrates an example milking system.

FIG. 1 illustrates an example milking system 100. As shown in FIG. 1, system 100 includes a rotary 105 and a robot 110. Generally, as one or more livestock 108 (e.g., dairy livestock such as a cow) rotate in rotary 105, robot 110 locates and cleans livestock 108. To emphasize various aspects of system 100, the elements of system 100 are not drawn to scale in FIG. 1. In practice, the size of rotary 105 is much larger than the size of robot 110 than as illustrated. In certain embodiments, robot 110 applies a disinfecting solution to livestock 108 as livestock 108 rotates in rotary 105. The disinfecting solution reduces and/or prevents the onset and/or spread of disease or infections. In some embodiments, robot 110 cleans livestock 108 by brushing livestock 108 instead of applying a disinfecting solution. Rotary 105 includes a rotating platform onto which livestock 108 can be loaded. Rotary 105 is divided into stalls. Livestock 108 are directed from an entry point into a stall of rotary 105. Rotary 105 then rotates and another livestock 108 is directed from the entry point into another stall of rotary 105. Rotary 105 rotates to move livestock 108 to an exit point. When livestock 108 reaches the exit point, livestock 108 is directed out of the stall and away from rotary 105.

As livestock 108 is rotated on rotary 105, milking devices are attached to livestock 108. The milking devices attach to the teats of livestock 108 to extract milk from livestock 108. The milk can be stored for processing. When the milking device has completed milking livestock 108, the milking device is detached and attached to another livestock 108 to begin the milking process again. Because the milking device is shared amongst livestock 108, the milking device spreads bacteria and/or viruses from livestock 108 to livestock 108. As a result, the milking device spreads diseases and/or infections between livestock 108. If livestock 108 contracts a disease or infection, then it may not be possible to use the milk extracted from livestock 108. Additionally, it may not be safe to extract more milk from livestock 108 until the disease and/or infection has been treated.

Robot 110 reduces the spread of disease and/or infection amongst livestock 108 in certain embodiments. Generally, robot 110 locates the teats of livestock 108 as livestock 108 rotates on rotary 105. Robot 110 then positions a cleaning tool (e.g., a spray tool or brush) near the teats of livestock 108. The cleaning tool then cleans the teats of livestock 108. As a result, the teats of livestock 108 are cleaned before and/or after the milking device has extracted milk from livestock 108. In this manner, bacteria and/or viruses are reduced and/or eliminated from the teats of livestock 108, thus preventing the spread of disease and/or infection to other livestock 108. Robot 110 will be described in more detail using FIGS. 2A-2AI, 3A-3S, 4, 5A-5F, and 6-7.

Figure 6:
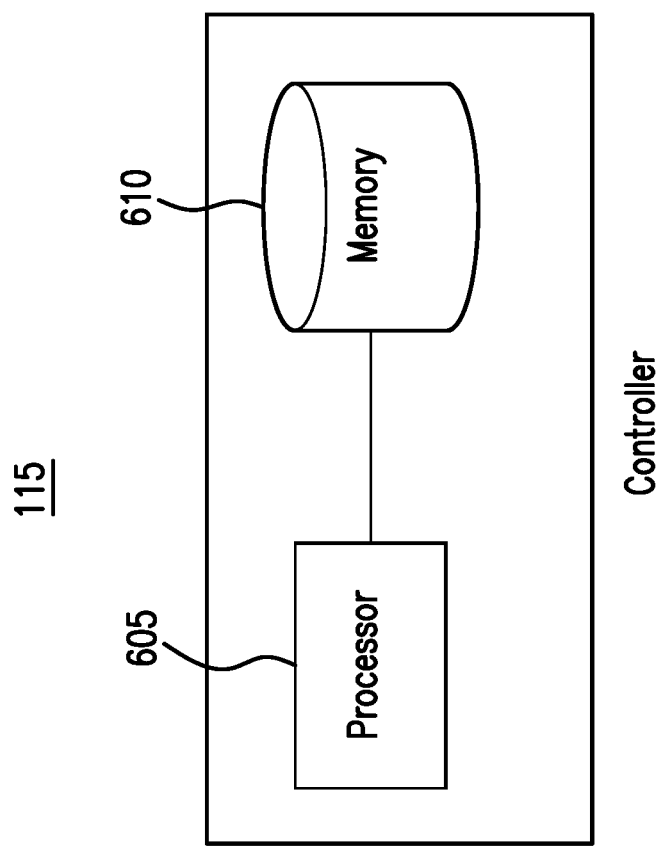
FIG. 6 illustrates an example controller of an example robot of the system of FIG. 1.

Robot 110 is controlled by a controller 115 which is described in more detail using FIG. 6. Controller 115 communicates with the various components of robot 110 to control the movement and/or operation of those components. These movements and operations will be described in more detail using FIGS. 2A-2AI, 3A-3S, 4, 5A-5H, and 7. This disclosure contemplates controller 115 being located in any appropriate location relative to robot 110. For example, controller 115 may be disposed on robot 110. As another example, controller 115 may be located separate from robot 110 and communicate with robot 110 through an interface. Controller 115 may also be distributed such that a portion of controller 115 is disposed on robot 110 and another portion of controller 15 is disposed separate from robot 110.

Generally, controller 115 processes signals from robot 110 (e.g., image signals from a camera mounted on robot 110) to determine the location and/or position of livestock 108 in rotary 105. Controller 115 then issues commands to various components of robot 110 to move these components to position a cleaning tool near a teat of livestock 108. For example, controller 115 may issue commands to activate various motors or actuators to position a spray tool or a brush tool near the teats of livestock 108. Controller 115 then issues a command to activate the cleaning tool so that it cleans the teat. The functions of robot 110 and controller 115 will be described in more detail using FIGS. 2A-2I, 3A-3S, 4, 5A-5H, and 7.

Controller 115 includes a processor 605 and a memory 610. This disclosure contemplates processor 605 and memory 610 being configured to perform any of the functions of controller 115 described herein. Generally, controller 115 communicates with one or more components of robot 110 to control the movements and/or operation of those components.

Processor 605 is any electronic circuitry, including, but not limited to microprocessors, application specific integrated circuits (ASIC), application specific instruction set processor (ASIP), and/or state machines, that communicatively couples to memory 610 and controls the operation of controller 115 and/or robot 110. Processor 605 may be 8-bit, 16-bit, 32-bit, 64-bit or of any other suitable architecture. Processor 605 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 605 may include other hardware and software that operates to control and process information. Processor 605 executes software stored on memory to perform any of the functions described herein. Processor 605 controls the operation and administration of controller 115 and/or robot 110 by processing information received from various components of controller 115 and/or robot 110. Processor 605 may be a programmable logic device, a microcontroller, a microprocessor, any suitable processing device, or any suitable combination of the preceding. Processor 605 is not limited to a single processing device and may encompass multiple processing devices.

Memory 610 may store, either permanently or temporarily, data, operational software, or other information for processor 605. Memory 610 may include any one or a combination of volatile or non-volatile local or remote devices suitable for storing information. For example, memory 610 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 610, a disk, a CD, or a flash drive. In particular embodiments, the software may include an application executable by processor 605 to perform one or more of the functions of robot 110 and/or controller 115 described herein.

Figure 2A:
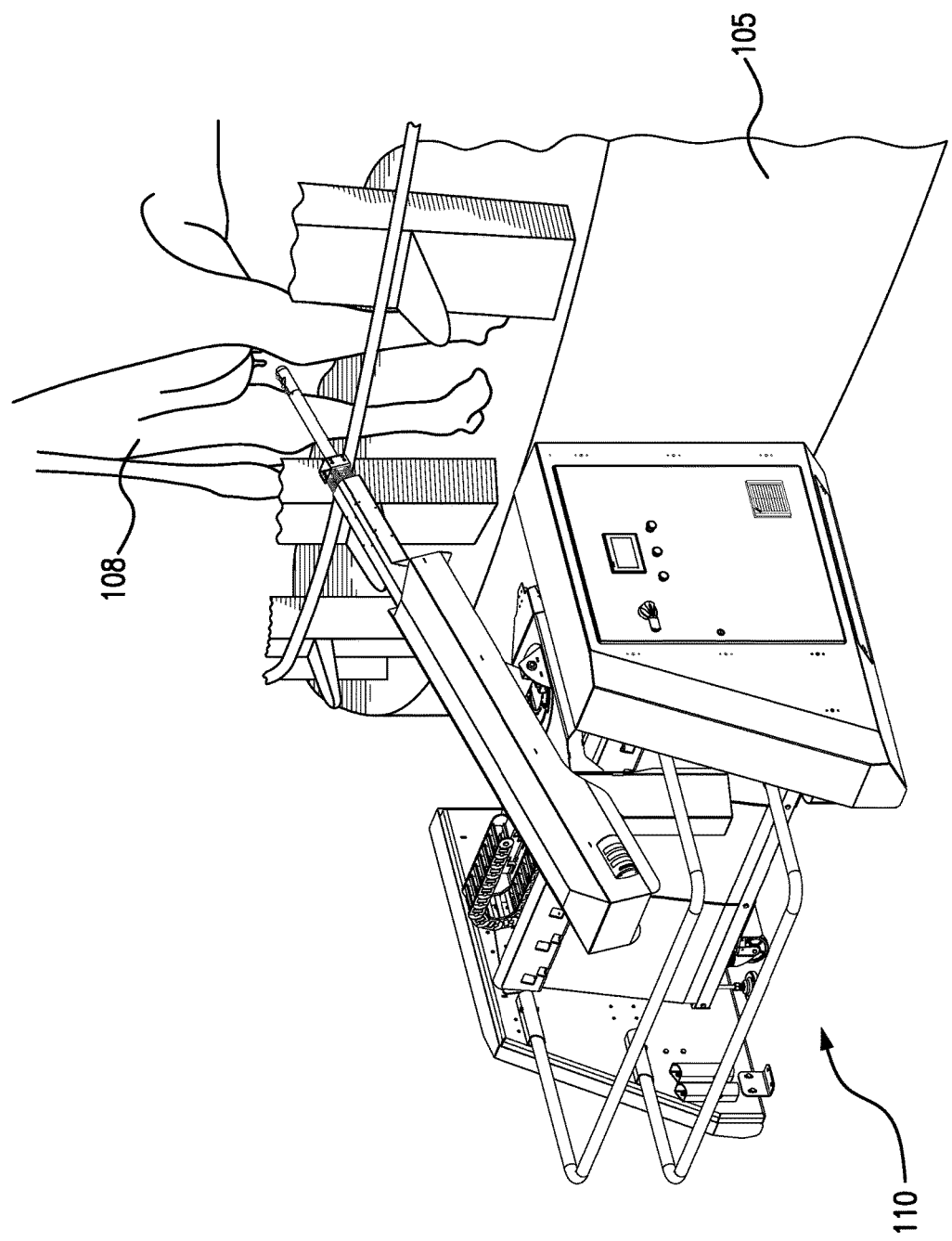
FIGS. 2A-2AI illustrate an example robot of the system of FIG. 1.
Figure 3A:
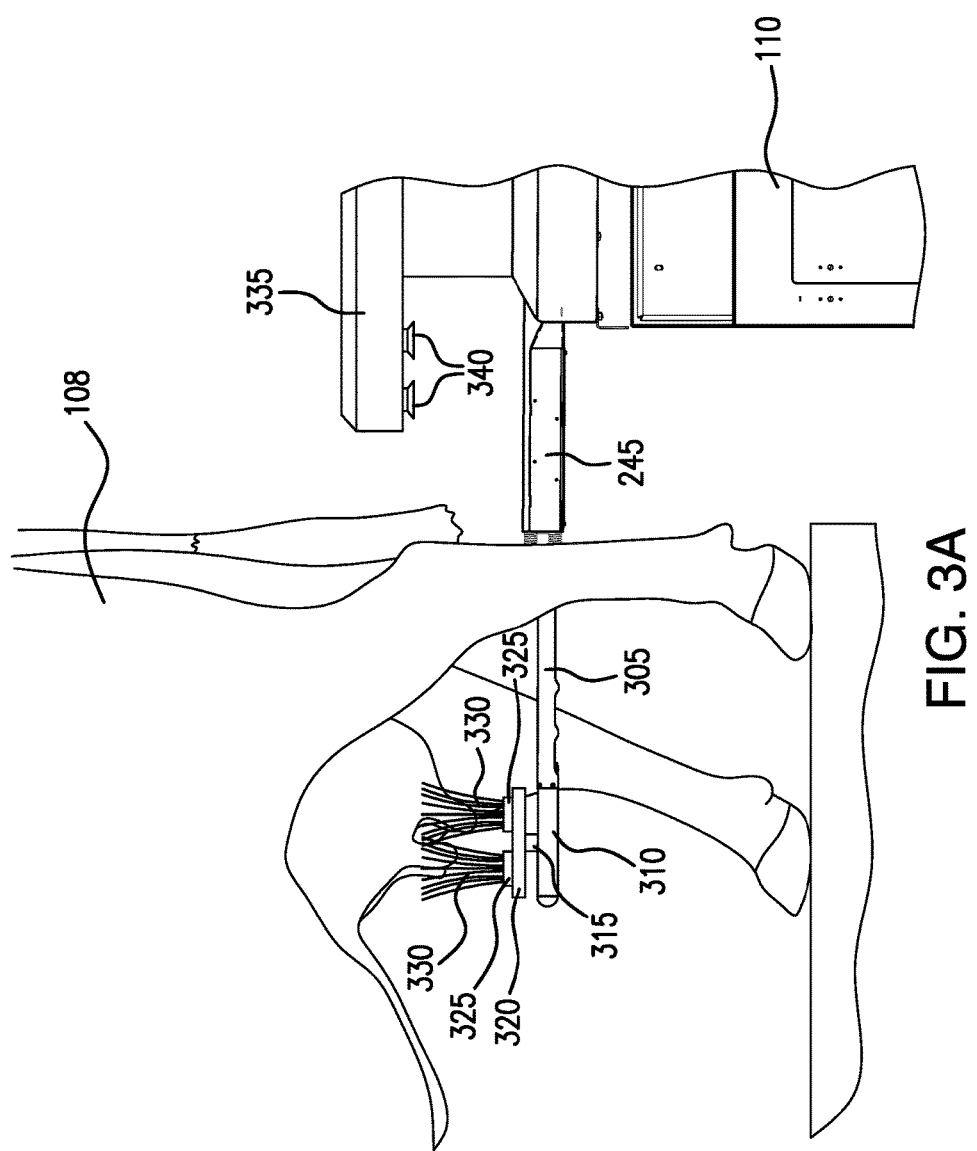
FIGS. 3A-3S Illustrate an example robot of the system of FIG. 1.
Figure 3S:
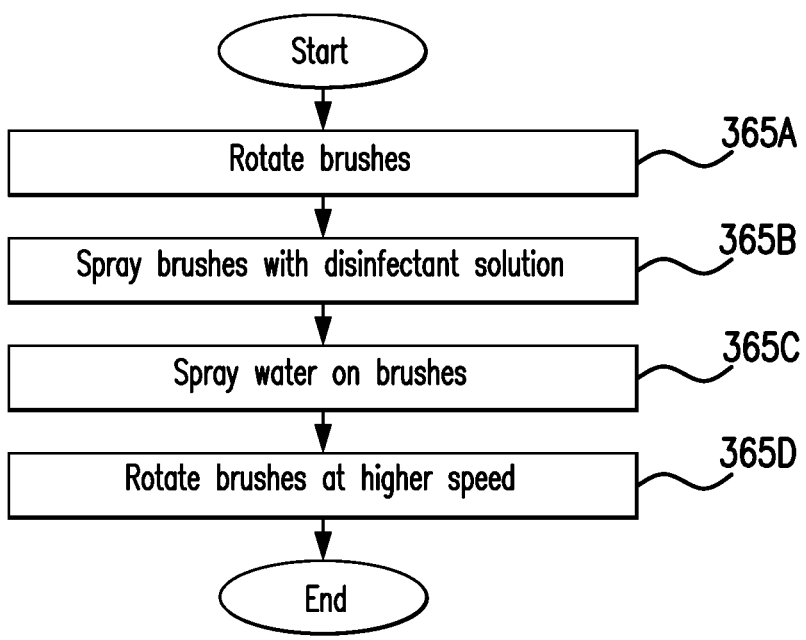
Figure 4:
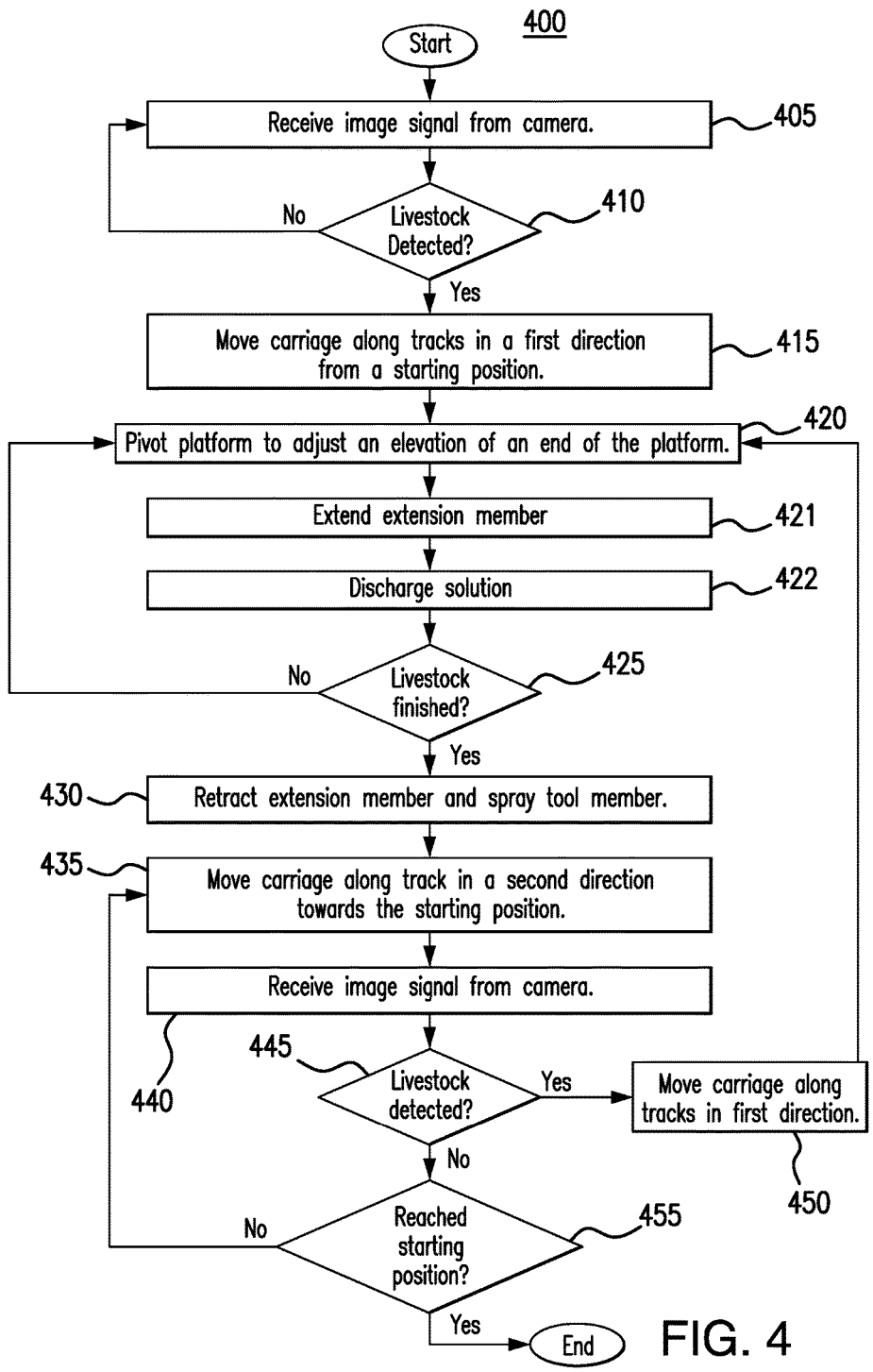
FIG. 4 is a flowchart illustrating an example method of operating the robot of the system of FIG. 1.
Figure 7:
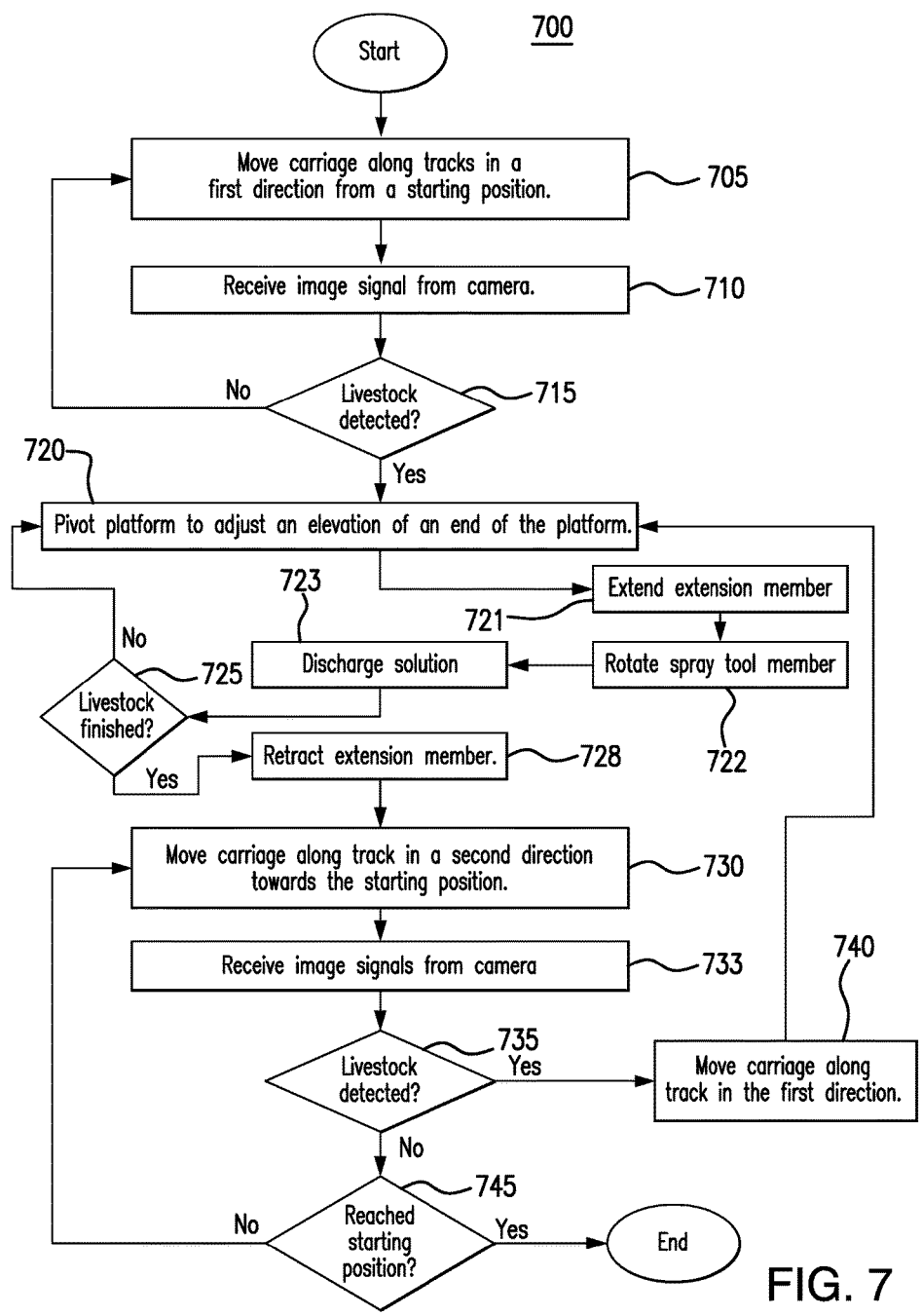
FIG. 7 is a flowchart illustrating an example method of operating a robot of the system of FIG. 1.

Robot 110 will be described in more detail using FIGS. 2A-2AI, 3A-3S, 4, 5A-5F, and 6-7. FIGS. 2A-2AI show embodiments of robot 110 that position a spray tool near the teats of livestock to spray a disinfectant solution onto the teats. FIGS. 3A-3S show embodiments of robot 110 that position a brush near the teats of livestock to clean the teats. FIGS. 4 and 7 illustrate example methods of operating robot 110. FIGS. 5A-5F illustrate a third embodiment of robot 110 that positions a spray tool near the teats of livestock to spray a disinfectant solution onto the teats. FIG. 6 illustrates an example controller 115. Due to the number of components in robot 110, to clarify certain figures or to emphasize certain components of robot 110, certain components of robot 110 may be illustrated but not identified and/or labeled in FIGS. 2A-2AI, 3A-3S, and 5A-5F. Additionally, certain components of robot 110 may be removed from certain figures so that other components of robot 110 are visible and/or more easily seen.

II. First Spray Robot Embodiments

This section describes the structure and operation of one or more embodiments of robot 110. As shown in FIGS. 2A through 2AI, generally in these embodiments robot 110 cleans the teats of livestock 108 by spraying a disinfectant solution on the teats of livestock 108. Robot 110 positions a spray tool near the teats of livestock 108 by moving various components coupled to the spray tool. Robot 110 performs at least three types of motions to position the spray tool near the teats of livestock 108. First, robot 110 moves a carriage laterally along a track. Second, robot 110 pivots a platform to adjust an angle of approach towards livestock 108. Third, robot 110 extends an extension member to move the spray tool towards livestock 108. When the spray tool is in the proper position, robot 110 discharges a disinfectant solution through the spray tool towards the teats of livestock 108. These movements and the structures that provide for these movements will be described in more detail in the following subsections.

A. Overview

FIG. 2A illustrates an example robot 110 of the system 100 of FIG. 1. As shown in FIG. 2A, robot 110 is positioned near rotary 105. Livestock 108 is positioned in rotary 105. As described previously using FIG. 1, livestock 108 is rotated by rotary 105. As livestock 108 passes robot 110, robot 110 positions a spray tool near the teats of livestock 108 and sprays a disinfectant solution onto the teats of livestock 108. After robot 110 has completed spraying livestock 108, robot 110 retracts the spray tool and returns towards a starting position to wait for the next livestock in rotary 105 to rotate past robot 110.

FIGS. 2B through 2E illustrate four different isometric views of robot 110. These figures will be used to describe some of the larger components of robot 110. Descriptions of the smaller subcomponents will be the focus of subsequent figures.

Figure 2B:
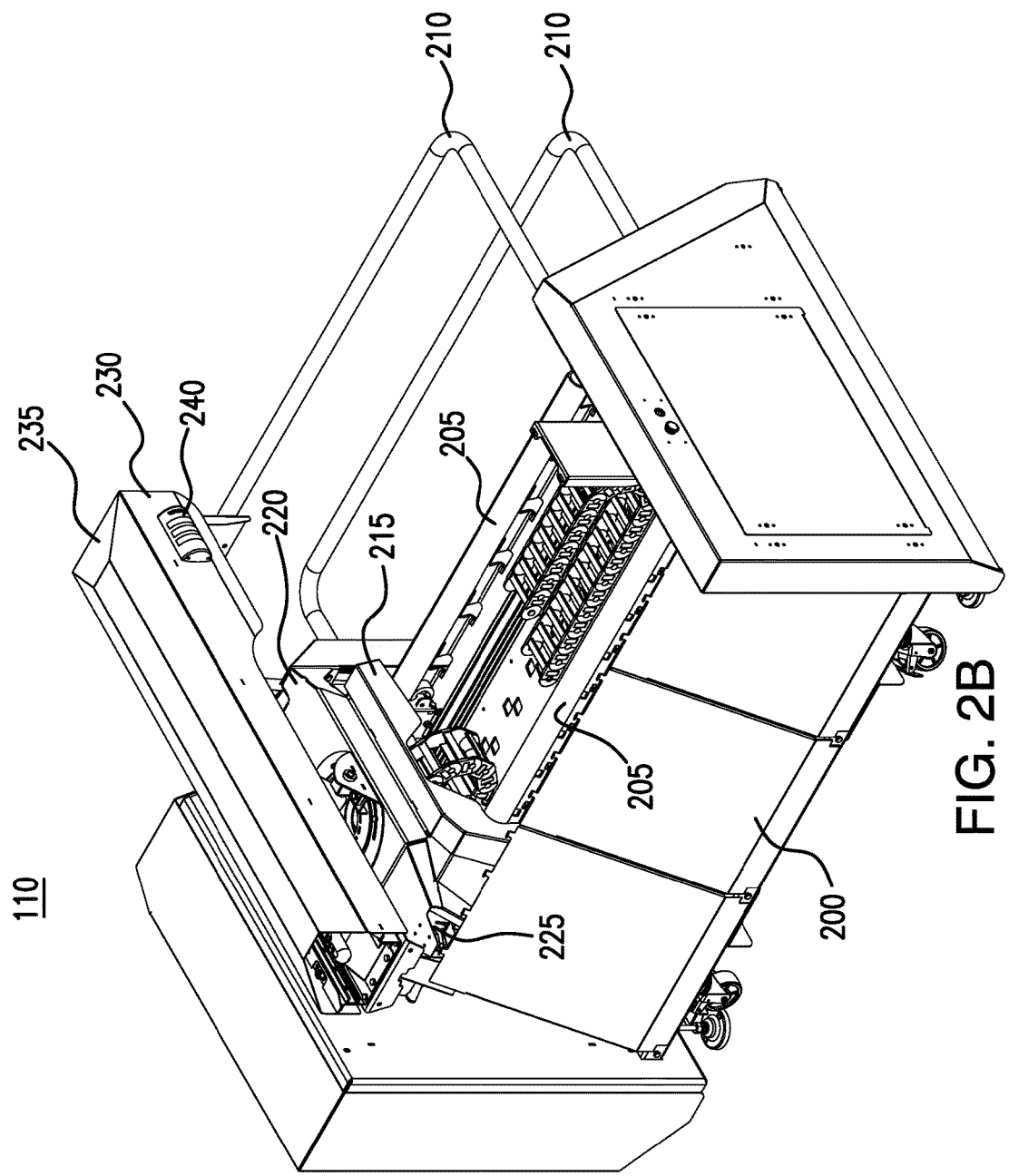

FIG. 2B illustrates a front isometric view of robot 110. As illustrated in FIG. 2B, robot 110 includes a base 200, one or more tracks 205, one or more gates 210, a carriage 215, a foundation 220, a camera 225, an arm 230 with housing 235 and warning lights 240. Generally, carriage 215 moves laterally along the one or more tracks 205. Arm 230 pivots on foundation 220. Arm 230 also extends towards a livestock 108 to discharge a disinfectant solution to livestock 108.

Base 200 provides a supporting structure for other components of robot 110. Base 200 may be made of any suitable material, such as metal and/or plastic, and base 200 may be any suitable shape. In the illustrated example of FIG. 2B, base 200 is formed using metal and/or plastic. Base 200 is a trapezoidal shape upon which the rest of robot 110 rests. For example, tracks 205 are coupled to a top surface of base 200 and gates 210 are coupled to a back surface of base 200. When robot 110 is in operation, base 200 may be stationary thereby providing a support structure for other moving components of robot 200. The structure of base 200 and its subcomponents will be described in more detail using FIGS. 2F and 2G.

Carriage 215 is coupled to the one or more tracks 205. Carriage 215 moves laterally along tracks 205 from one end of base 200 to another end of base 200. Carriage 215 and its subcomponents will be described in more detail using FIGS. 2H through 2J.

Foundation 220 is coupled to a top surface of carriage 215. Foundation 220 is a support structure upon which camera 225 and arm 230 are mounted. Arm 230 is coupled to foundation 220 such that arm 230 can pivot and swivel relative to foundation 220. Foundation 220 and its subcomponents will be described in more detail using FIGS. 2K through 2O.

Arm 230 is coupled to foundation 220. Arm 230 can pivot and/or swivel relative to foundation 220. Generally, arm 230 can pivot and extend itself towards livestock 108. Arm 230 includes several components that are blocked from view by housing 235 but will be shown in subsequent figures. Arm 230 and the subcomponents will be described in more detail using FIGS. 2P through 2AF.

Warning lights 240 are coupled to arm 230. Warning lights 240 include one or more lights of different colors such as, for example, green, yellow and red. Each colored light indicates a particular status of robot 110. For example, a green light may indicate that robot 110 is operating normally. As another example, a yellow light may indicate a warning or an impending error condition such as, for example, that robot 110 is running low on disinfectant solution. As yet another example, a red light may indicate that robot 110 has encountered an error such as, for example, that the robot has run out of disinfectant solution or that the robot has been kicked by livestock 108. In certain embodiments, when robot 110 encounters an error, robot 110 ceases to operate until the error is resolved. Thus, warning lights 240 provide a visual indicator as to the status and/or operating health of robot 110.

Figure 2C:
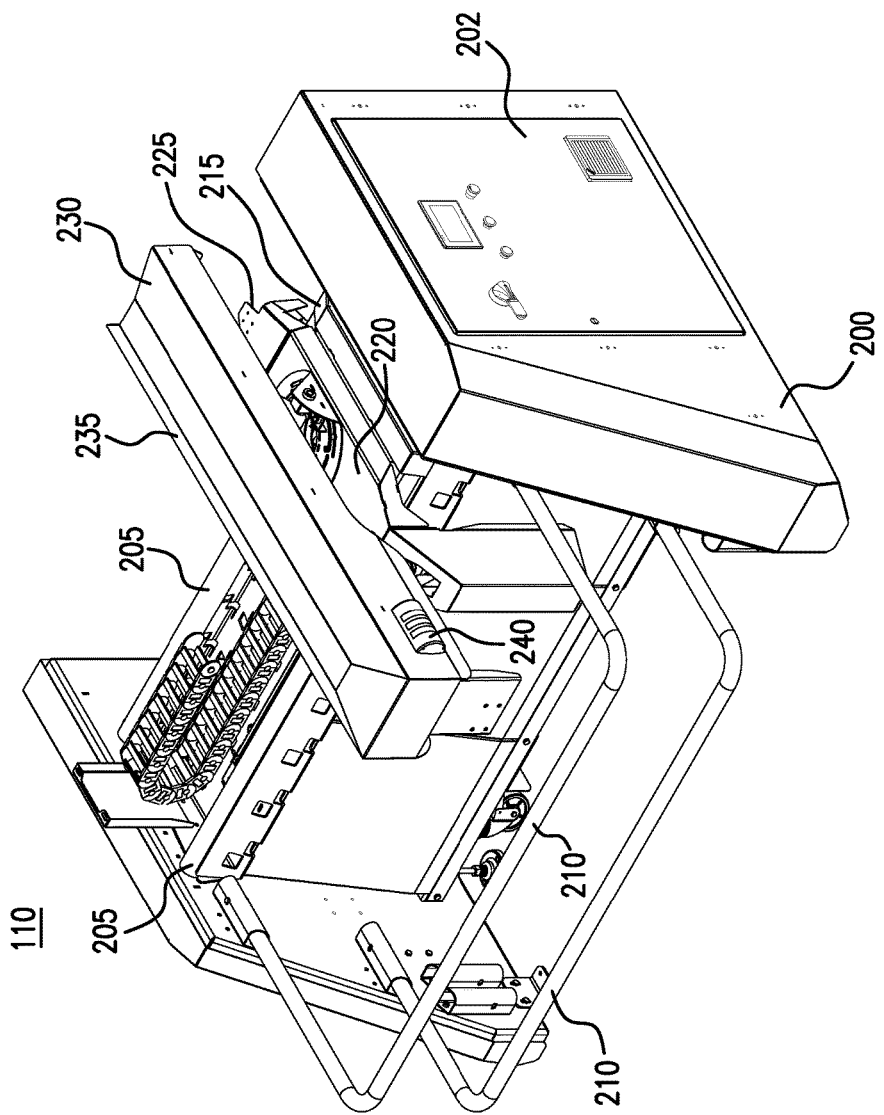

FIG. 2C illustrates a back isometric view if robot 110. As shown in FIG. 2C, base 200 includes a hatch 202. Hatch 202 protects certain internal components of robot 110 such as, for example, controller 115. Hatch 202 can open to reveal controller 115. When hatch 202 is closed, hatch 202 protects controller 115 from damage. Hatch 202 also provides ventilation for controller 115. Hatch 202 is shown as including a lever that can be pulled and/or rotated to open hatch 202. This disclosure contemplates hatch 202 being opened and/or closed using any suitable mechanism such as, for example, a knob and/or a handle.

FIG. 2C also shows an additional set of warning lights 240 coupled to the side of arm 230. This additional set of warning lights 240 operates in the same manner as warning lights 240 shown in FIG. 2B on the other side of arm 230. Also, as shown in FIG. 2C, gates 210 couple to base 200 near a back surface of base 200. In some embodiments, gates 210 couple to the side surfaces of base 200. When deployed, gates 210 serve to prevent animals or users from approaching robot 110 from behind. Gates 210 thus protect the components of robot 110 from damage, and they protect robot 110 from injuring animals and users.

Figure 2D:
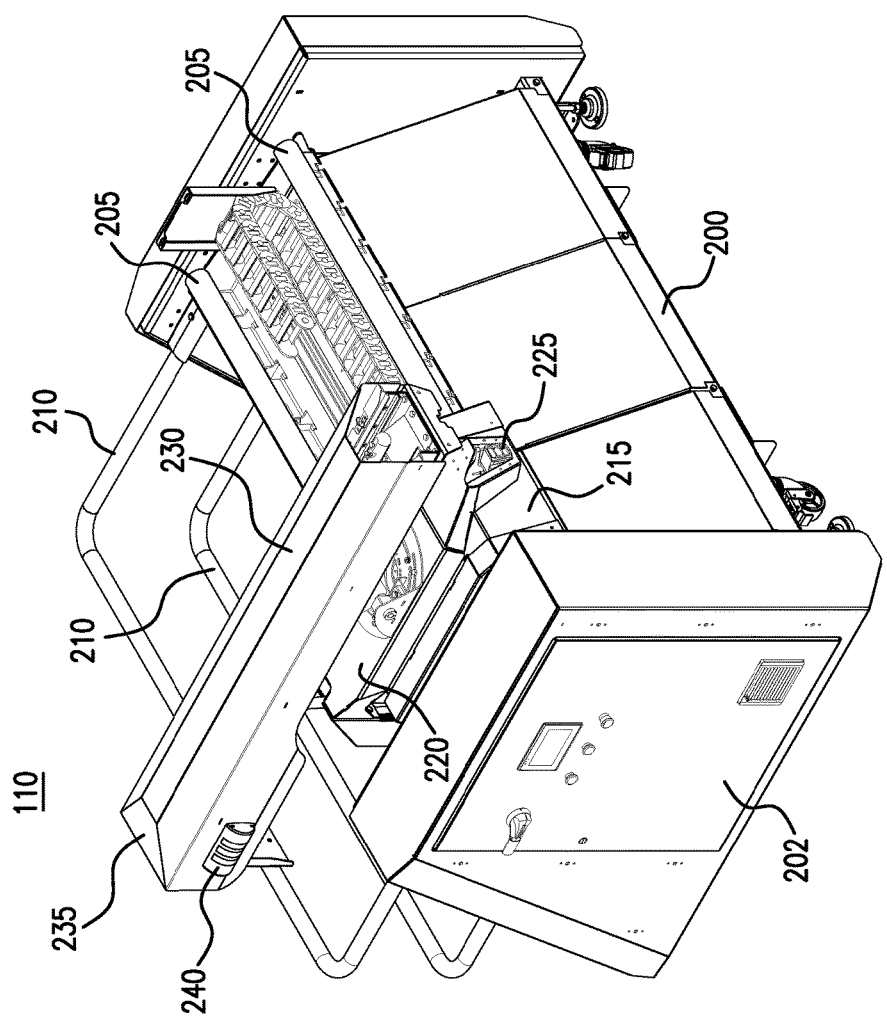

FIG. 2D illustrates a front isometric view of robot 110. As shown in FIG. 2D, robot 110 includes hatch 202 on the side of base 200 and an additional set of warning lights 240 on another side surface of arm 230. Other components of robot 110 are as described in FIGS. 2B and 2C.

Figure 2E:
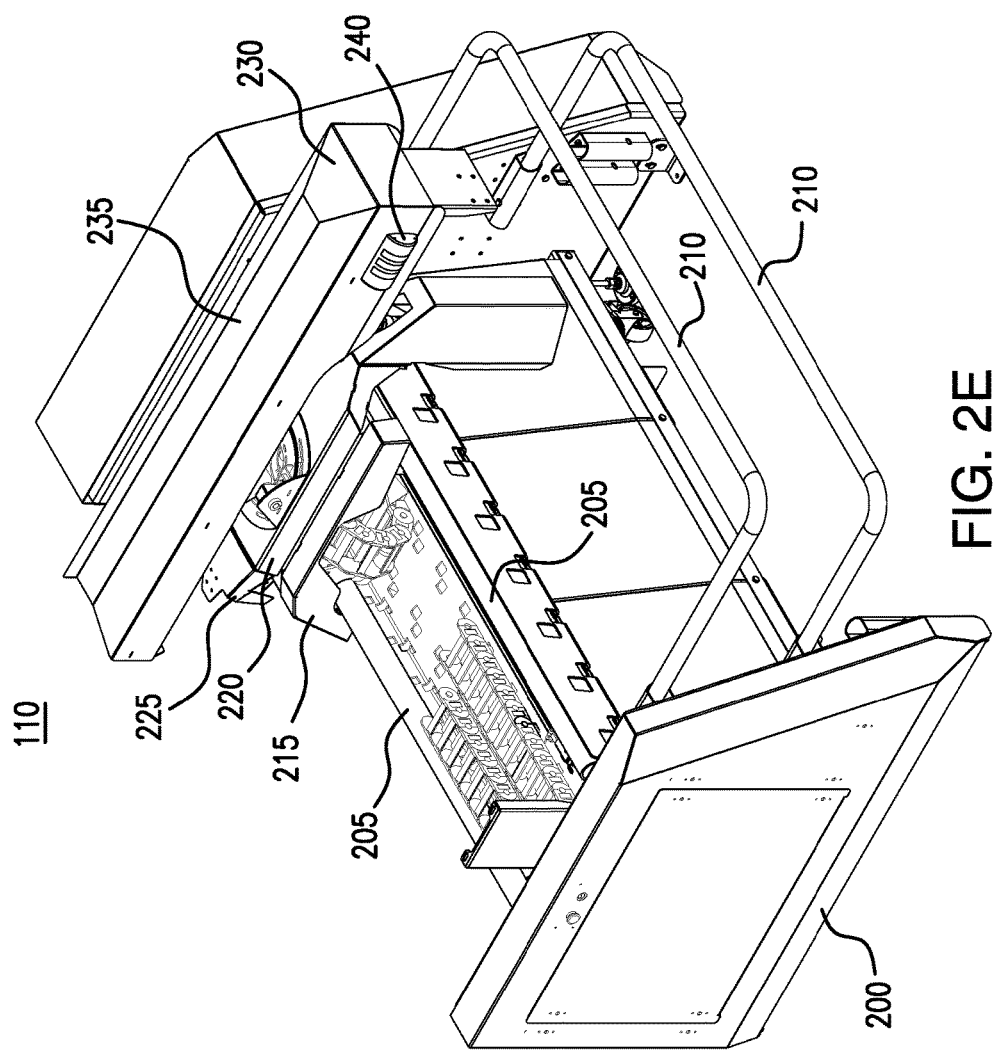

FIG. 2E shows a back isometric view of robot 110. The components of robot 110 shown in FIG. 2E are the same as those described using FIGS. 2B through 2D.

B. Base

Figure 2F:
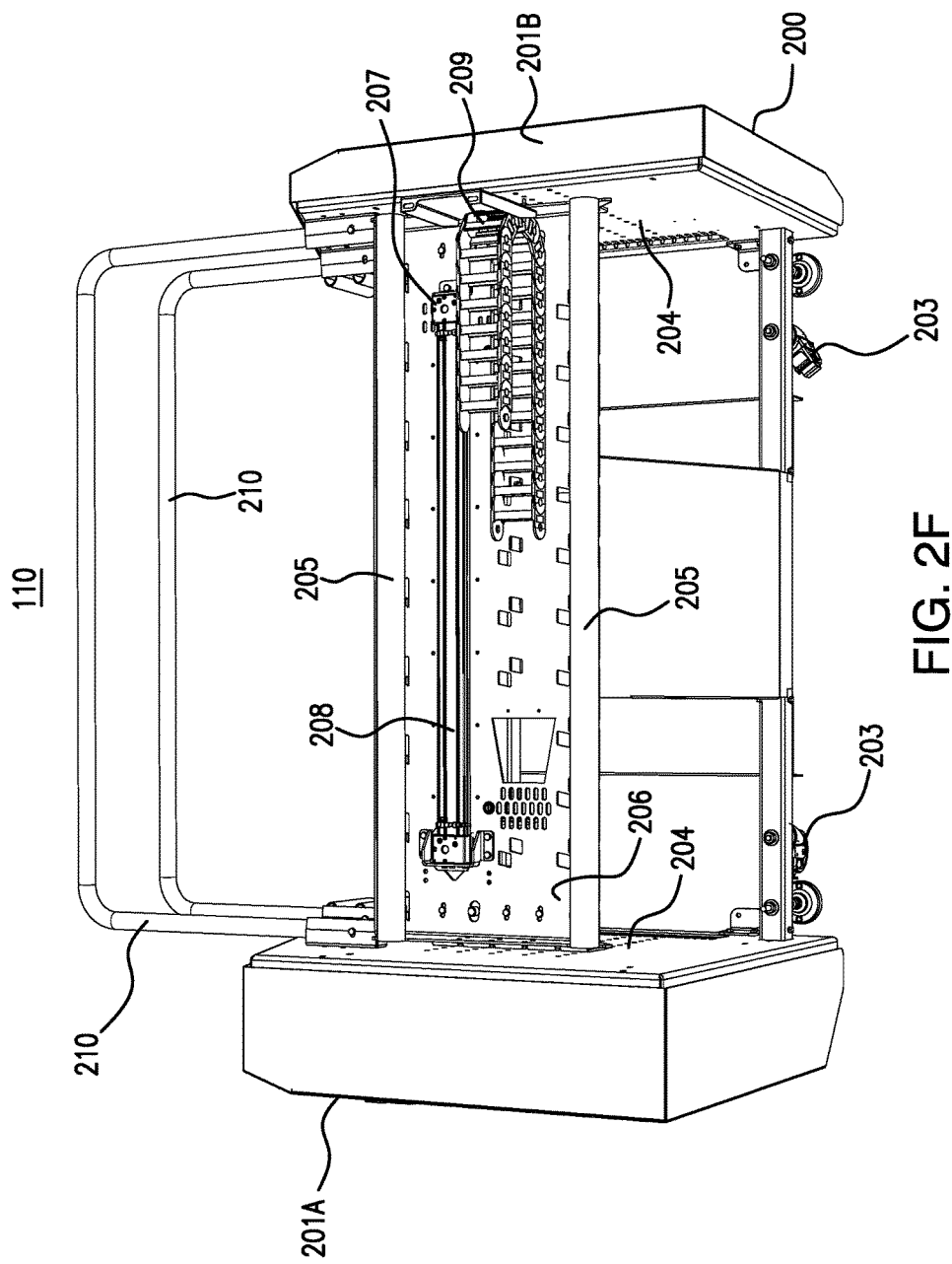
Figure 2G:
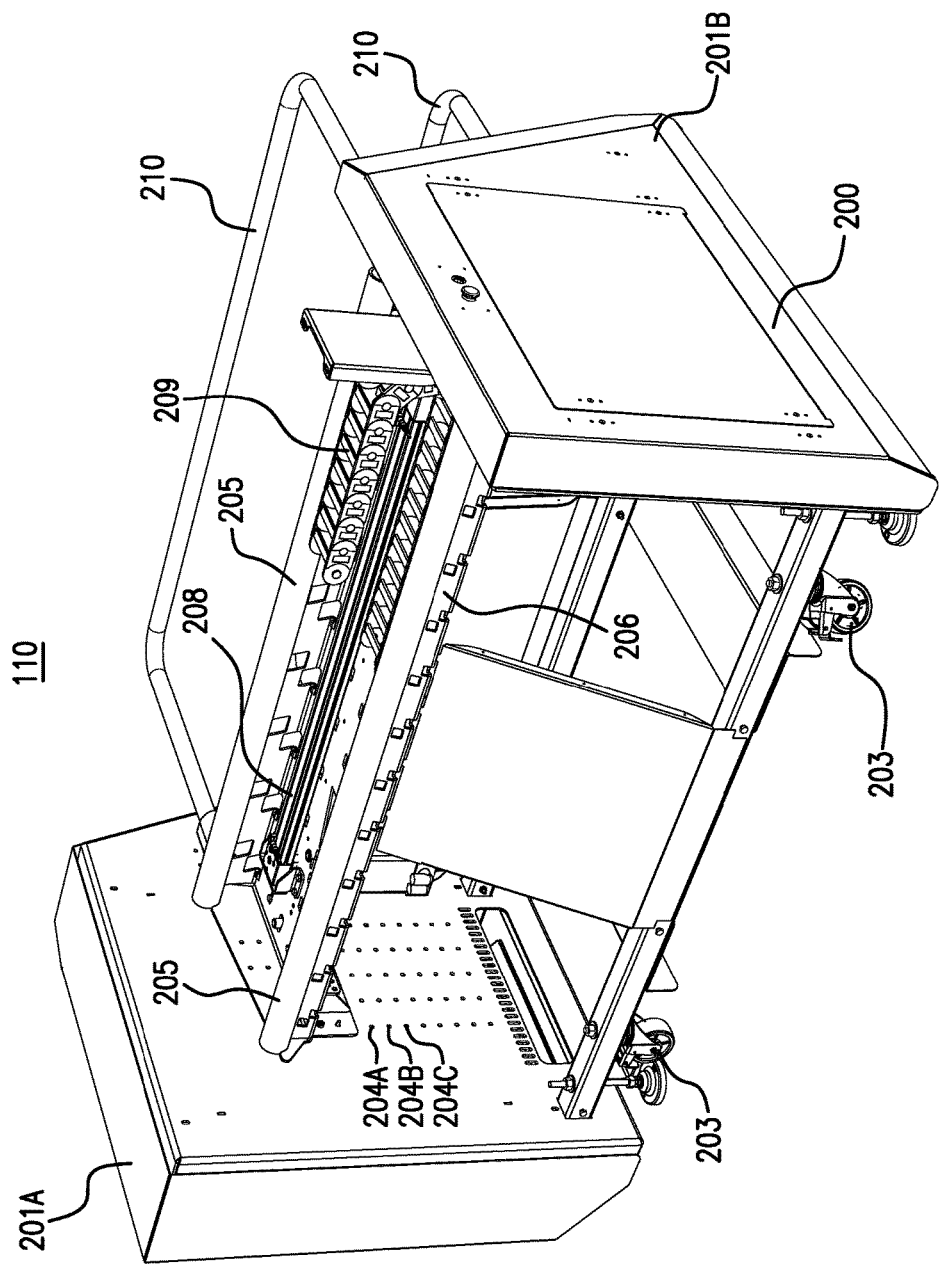

FIGS. 2F and 2G illustrate base 200 of robot 110. For clarity, various components of robot 110 that might otherwise obscure the view of certain components of base 200 have been removed from FIGS. 2F and 2G. Their removal, however, should not be interpreted as their removal from robot 110. In certain embodiments, base 200 provides a support structure for other components of robot 110.

FIG. 2F illustrates a top down view from the front of base 200. As shown in FIG. 2F, base 200 includes side members 201A and 201B, one or more wheels 203, one or more cavities 204, tracks 205, a platform 206, a lateral movement system 207 and one or more gates 210.

Side members 201A and 201B establish the lateral boundaries of robot 110. First side member 201A is larger than second member 201B to accommodate internal components such as, for example, controller 115. As shown in FIGS. 2C and 2D, first side member 201A includes a hatch 202 that can be opened to reveal controller 115. As shown in FIG. 2F, first side member 201A and second side member 201B are both block shaped components. It is understood, however, that first side member 201A and second side member 201B can be any suitable shape such as, for example, cylindrical, triangular, etc.

Cavities 204 are defined by first side member 201A and second side member 201B. Cavities 204 are formed on the inside surfaces of first side member 201A and second side member 201B—cavities 204 are positioned on the surfaces of first side member 201A and second side member 201B that face each other. Various components of robot 110 such as, for example, platform 206, tracks 205, and lateral movement system 207 couple to first side member 201A and second side member 201B using cavities 204.

Base 200 includes wheels 203 coupled to a bottom surface of base 200. Wheels 203 allow robot 110 to be moved without lifting robot 110. When robot 110 is in operation, brakes may be applied to wheels 203 to prevent robot 110 from shifting and/or moving. In some embodiments, base 200 includes pedestals that lift wheels 203 off the ground so that robot 110 is stationary during operation. The illustration of FIG. 2F includes pedestals between wheels 203 and first side member 201A and second side member 201B. In certain embodiments, by including wheels 203 robot 110 can be easily transported from one location to another by simply pushing robot 110.

Platform 206 mounts to first side member 201A and second side member 201B using cavities 204. Platform 206 is a surface that supports other components of robot 110 such as, for example, tracks 205 and lateral movement system 207. Platform 206 may be made of any material suitable for supporting the weight of certain components of robot 110. These materials include metal and/or plastic. Platform 206 includes cavities and/or holes through which other components of robot 110 are mounted to platform 206. For example, platform 206 includes spaces, cavities and/or holes that are used to mount tracks 205 and lateral movement system 207 to platform 206.

Tracks 205 couple to platform 206 and/or side members 201. As shown in FIG. 2F, tracks 205 are cylindrical bars made of metal and/or plastic. This disclosure contemplates tracks 205 being any suitable shape such as, for example, circular cylindrical, square cylindrical and/or triangular cylindrical. Tracks 205 span the width of platform 206 from first side member 201A to second side member 201B. Tracks 205 provide a surface on which other components of robot 110 such as, for example, carriage 215 can move laterally across robot 110 from first side member 201A to second side member 201B, and vice versa.

Lateral movement system 207 pushes and/or pulls components of robot 110 such as, for example, carriage 215 across tracks 205 from first side member 201A to second side member 201B. As shown in FIG. 2F, lateral movement system 207 includes a linear actuator 208 and a belt receiver 209. Linear actuator 208 is coupled to a top surface of platform 206 and arranged to run laterally across platform 206 between first side member 201A and second side member 201B. When linear actuator 208 pushes and/or pulls carriage 215, carriage 215 moves laterally across tracks 205 from first side member 201A to second side member 201B and vice versa.

Belt coupler 209 receives a belt coupled to carriage 215. Belt coupler 209 prevents the belt from being tangled or coming loose when linear actuator 208 moves carriage 215 and the accompanying belt across robot 110. As shown in FIG. 2F, belt coupler 209 may include links that define cavities through which the links of the belt of carriage 215 may engage with belt coupler 209. By using belt coupler 209, the lateral movement of carriage 215 across tracks 205 may be preserved.

Gates 210 couple to base 200 near a back surface of base 200. Gates 210 are made of any suitable material such as metal and/or plastic. In some embodiments, gates 210 are formed using metal and/or plastic bars. When robot 110 is in operation, gates 210 are deployed as shown in FIG. 2F. When deployed, gates 210 extend from a point of attachment on first side member 201A and second side member 201B towards the back surface of base 200. Gates 210 extend beyond the back surface of base 200 when deployed. As shown in FIG. 2F, gates 210 couple to opposing surfaces of first side member 201A and second side member 201B. These opposing surfaces are the same surfaces to which platform 206 coupled to first side member 201A and second side member 201B. In some embodiments, by installing and deploying gates 210, people and/or animals are deterred from approaching robot 110 from behind when robot 110 is in operation. For example, because gates 210 extend beyond the back surface of base 200 when deployed, gates 210 may hinder a person and/or animal from reaching the back surface of base 200. As a result, gates 210 prevent robot 110 from injuring animals or people.

FIG. 2G illustrates an isometric view of base 200. The components illustrated in FIG. 2G are the same components illustrated in FIG. 2F. As shown in FIG. 2G, base 200 includes first side member 201A and second side member 201B. Platform 206 couples to opposing surfaces of the side members 201. Tracks 205, linear actuator 208, and belt coupler 209 couple to a top surface of platform 206. Gates 210 couple to opposing surfaces of side members 201, and extend beyond a back surface of base 200 when deployed.

The cavity 204 through which platform 206 couples to base 200 is adjustable in some embodiments. As shown in FIG. 2G, base 200 includes a first cavity 204A, a second cavity 204B and a third cavity 204C. First cavity 204A is higher than second cavity 204B. Second cavity 204B is higher than third cavity 204C. Platform 206 can be lowered from its depicted position by detaching platform 206 from base 200 and then reattaching platform 206 to base 200 through first cavity 204A. Platform 206 can be further lowered by coupling platform 206 to base 200 through second cavity 204B or third cavity 204C. In this manner, base 200 allows the elevation of platform 206 to be adjustable. As a result, robot 110 can be quickly configured for any rotary height. For higher rotaries, platform 206 can be coupled to base 200 using a higher cavity 204 such as, for example, first cavity 204A. For rotaries that are lower to the ground, platform 206 can be coupled to base 200 through a lower cavity such as, for example, third cavity 204C. Thus, base 200 allows robot 110 to clean livestock 108 on rotaries of many different heights.

C. Carriage

Figure 2H:
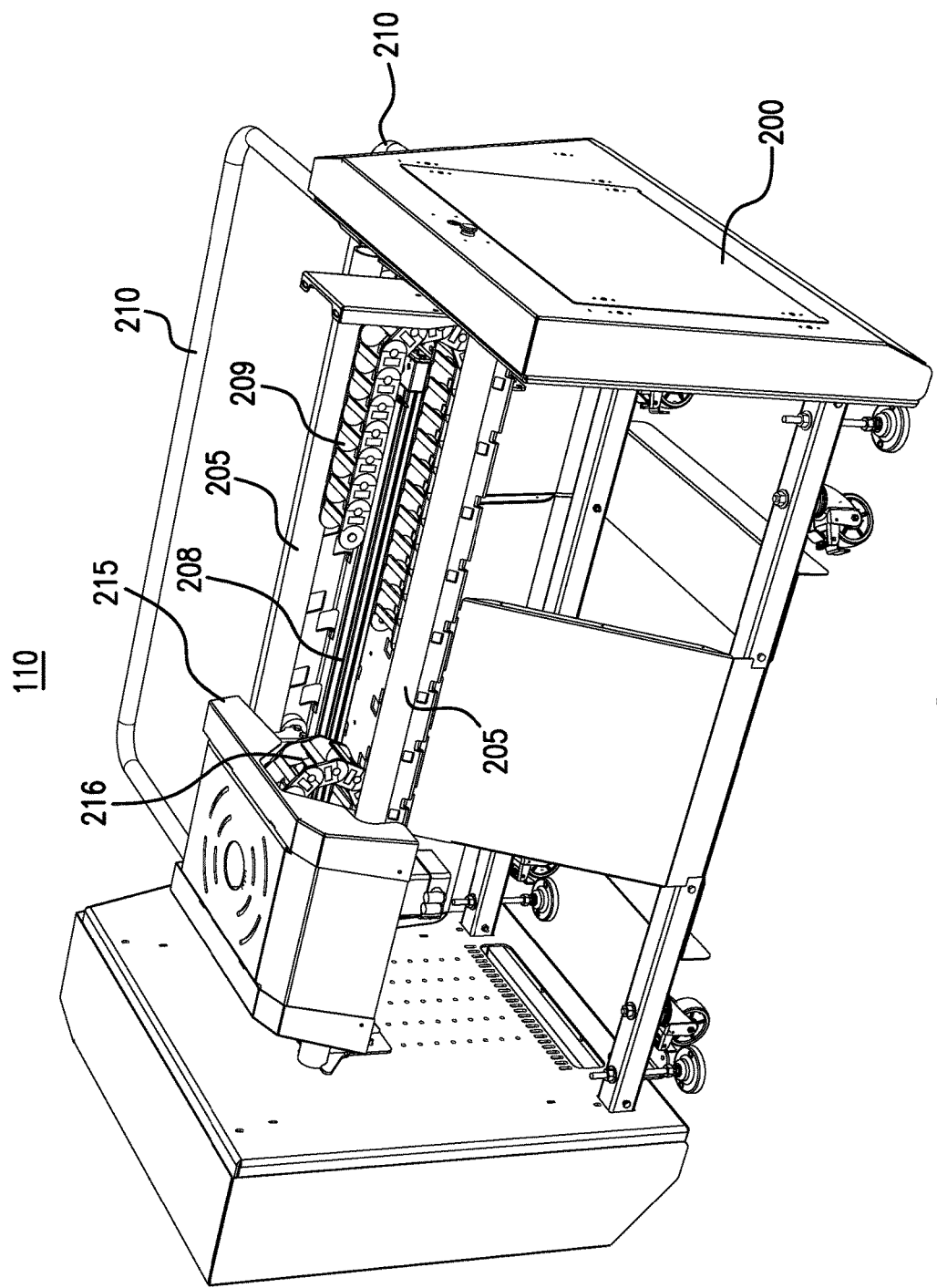
Figure 21:
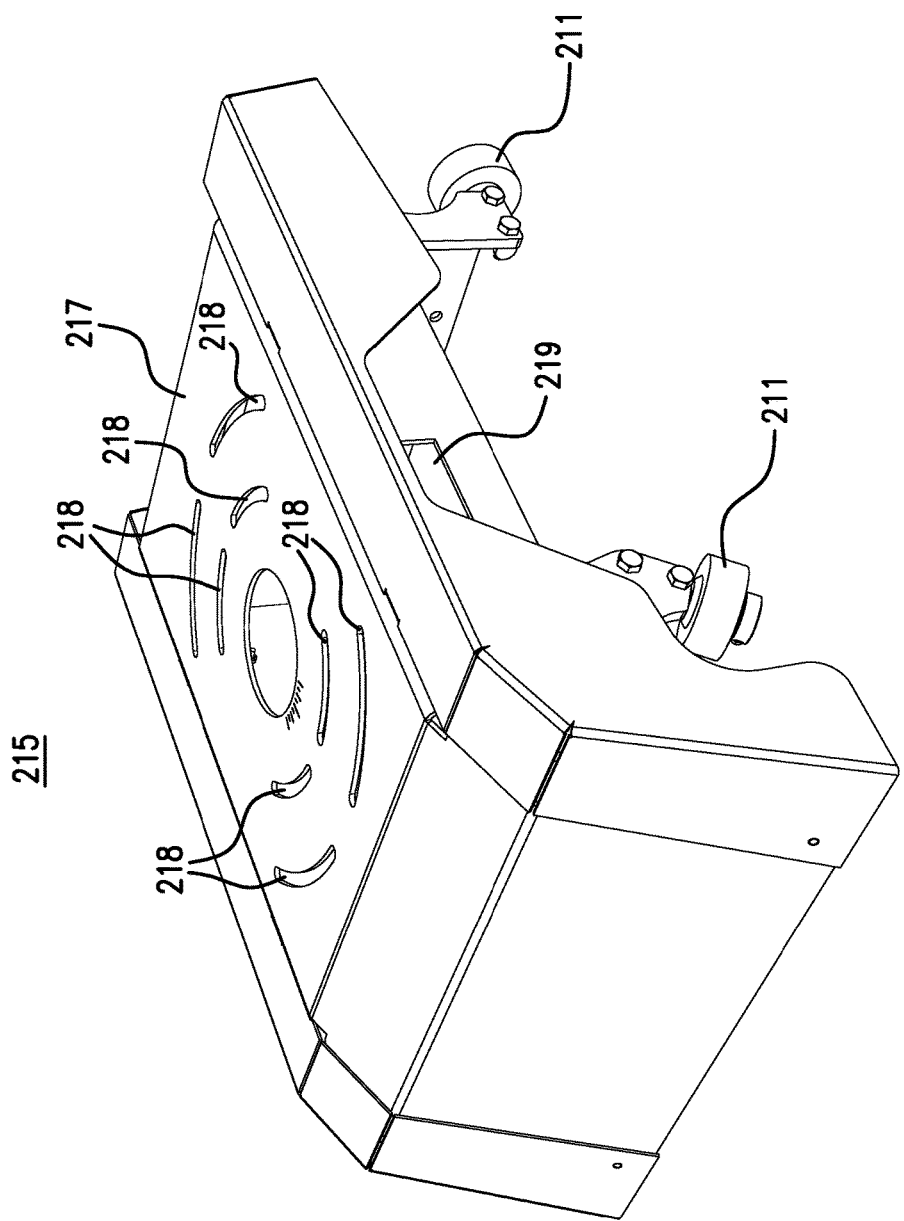
Figure 2J:
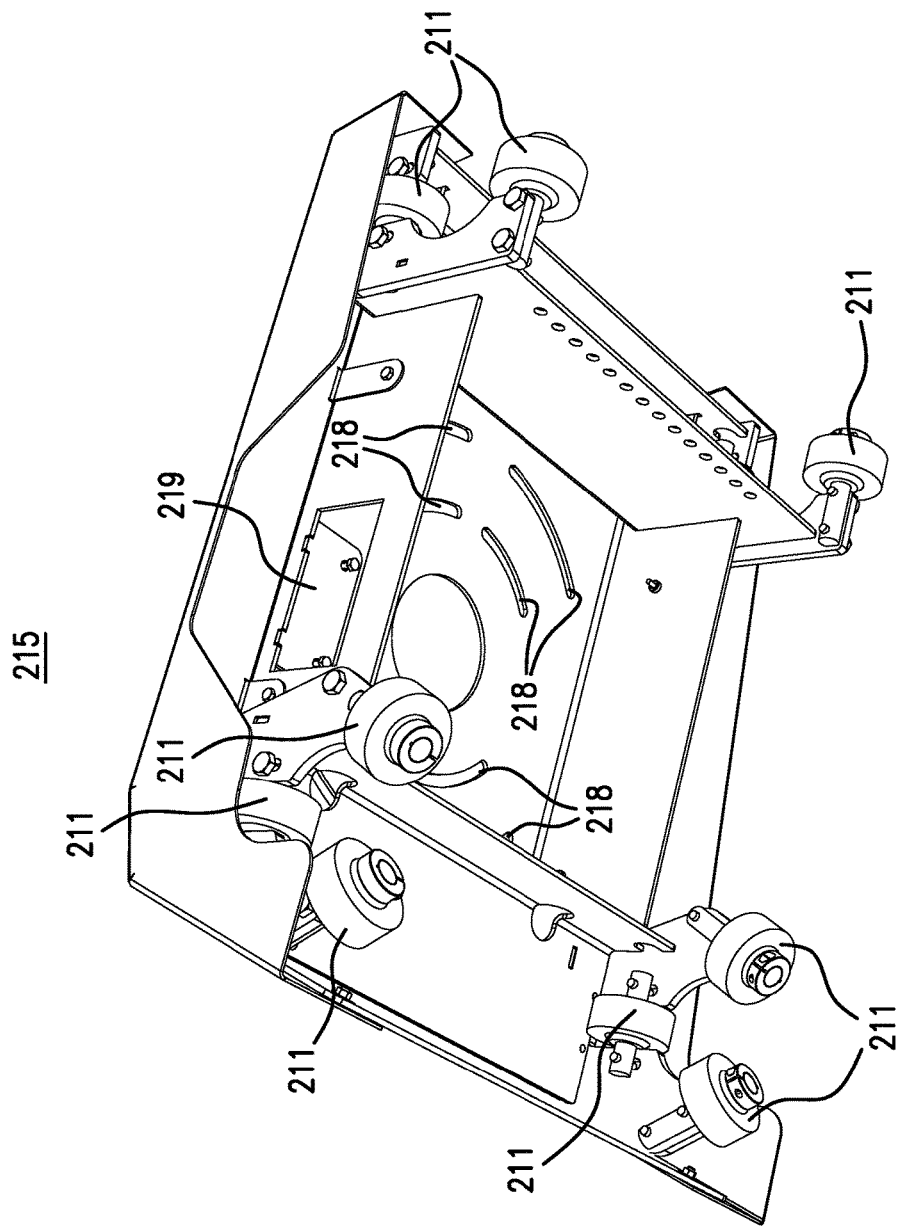

FIGS. 2H through 2J illustrate the carriage 215 of robot 110. For clarity, various components of robot 110 that might otherwise obscure the view of certain components of carriage 215 have been removed from FIGS. 2H through 2J. Their removal, however, should not be interpreted as their removal from robot 110. Additionally, certain illustrated components of robot 110 are not labeled or identified in FIGS. 2H through 2J to emphasize other components of carriage 215.

As shown in FIG. 2H, carriage 215 is designed to couple to tracks 205 along a bottom surface of carriage 215. Linear actuator 208 pushes and pulls carriage 215 along tracks 205. Carriage 215 then moves laterally across robot 110 on tracks 205. A belt 216 is coupled to carriage 215. Belt 216 guides carriage 215 as it is pushed and pulled by linear actuator 208. As carriage 215 moves towards belt coupler 209, belt 216 engages belt coupler 209. In this manner, belt 216 does not become tangled and/or loosened as carriage 215 moves across tracks 205.

As livestock 108 is rotated on rotary 105, carriage 215 moves across robot 110 on tracks 205. In this manner, carriage 215 tracks the lateral component of livestock's 108 motion as livestock 108 is rotated in rotary 105. Linear actuator 208 pushes and pulls carriage 215 at a speed that substantially matches the lateral speed of livestock 108 as it is rotated in rotary 105. In this manner, carriage 215 is able to stay aligned with the udder of livestock 108 as livestock 108 is rotated in rotary 105. In some embodiments, carriage 215 can move 1.25 meters or more along tracks 215. The subcomponents of carriage 215 will be described using FIGS. 2I and 2J.

FIG. 2I illustrates carriage 215. As shown in FIG. 2I, carriage 215 includes a plate 217. Plate 217 forms a top surface and a front surface of carriage 215. Plate 217 is made from any suitable materials such as, for example, metal and/or plastic. Plate 217 also defines one or more cavities 218 along the top surface of carriage 215. Cavities 218 allow other components of robot 110 such as foundation 220 and arm 230 to rotate and/or swivel relative to carriage 215. The length of each cavity 218 may determine the amount of rotation and/or swivel of a particular component coupled through that cavity 218.

As seen in FIG. 2I, cavities 218 are arranged along two concentric circles. Cavities 218 arranged on the external circle are larger than cavities 218 arranged along the inner circle. Components coupled through the external set of cavities 218 may have a greater degree of swivel and/or rotation than components coupled through the internal set of cavities 218.

Carriage 215 includes a cavity 219 in a side surface of carriage 215. Belt 216 can pass through cavity 219 and couple to an underside of carriage 215.

Carriage 215 includes one or more wheels 211 along an underside of carriage 215. Wheels 211 allow carriage 215 to couple to one or more tracks 205 of robot 110. Wheels 211 are circular in shape and can rotate. The rotation allows carriage 215 to move along tracks 205. Additionally, wheels 211 allow carriage 215 to stay on tracks 205 as carriage 215 moves laterally across tracks 205. In this manner, carriage 215 is prevented from falling off tracks 205 as it moves across tracks 205.

FIG. 2J illustrates an underside of carriage 215. As seen in FIG. 2J, cavities 218 extend from a top surface of carriage 215 through a bottom surface of carriage 215. Thus, screws and/or bolts can couple components to carriage 215 through cavities 218. Also, as shown in FIG. 2J, cavity 219 extends through a side surface of carriage 215. Belt 216 can couple to the underside of carriage 215 through cavity 219.

Additionally, as seen in FIG. 2J, wheels 211 are grouped in twos and threes to allow carriage 215 to hold onto tracks 205. Wheels 211 at the front of carriage 215 are grouped in threes. A track 205 is designed to fit in the semicircular space defined by the three wheels 211. Each corner at the front of carriage 215 has a set of three wheels 211 that hold onto a track 205.

Wheels 211 near the back of carriage 215 are grouped by twos. As seen in FIG. 2J, each corner along the backside of carriage 215 has a set of two wheels. Each set of wheels 211 has a top wheel 211 and a bottom wheel 211. A track 205 is configured to fit in the semicircular space defined by the top wheel 211 and the bottom wheel 211. In this manner, the backside of carriage 215 is configured to hold onto a track. Even though wheels 211 along the backside of carriage 215 will release track 205 if carriage 215 is moved forward towards the front side of carriage 215, that type of motion is prevented by the front side wheels 211 when they are coupled to track 205. In this manner, the backside wheels 211 can be grouped in twos instead of threes thereby reducing the number of wheels 211 on carriage 215. Each wheel 211 can rotate while carriage 215 is moving along tracks 205.

Carriage 215 allows for other components of robot 110 to track the lateral motion of livestock 108 as it is rotated in rotary 105. The components mounted to carriage 215 can then perform other operations to position a spray tool near the teats of livestock 108. After livestock 108 has been cleaned, carriage 215 can move in an opposite direction back towards a starting position to wait for another livestock 108 in rotary 105. Thus, carriage 215 is tied to the lateral motion performed by robot 110.

D. Foundation

FIGS. 2K through 2O show the structure and operation of foundation 220. For clarity, various components of robot 110 that might otherwise obscure the view of certain components of foundation 220 have been removed from FIGS. 2K through 2O. Their removal, however, should not be interpreted as their removal from robot 110. Additionally, certain illustrated components of robot 110 are not labeled or identified in FIGS. 2K through 2O to emphasize other components of foundation 220.

As shown in FIG. 2K, foundation 220 is coupled to a top surface of carriage 215. The top surface of carriage 215 is opposite a bottom surface of carriage 215 coupled to tracks 205. A camera 225 and a swivel plate 221 are coupled to foundation 220. Camera 225 is coupled to the front of foundation 220. Swivel plate 221 is coupled to a top surface of foundation 220. Generally, foundation 220 provides a surface upon which other components of robot 110 (e.g., arm 230) are coupled and/or mounted to robot 110. The subcomponents and operation of foundation 220 will be described using FIGS. 2L through 2O.

Figure 2L:
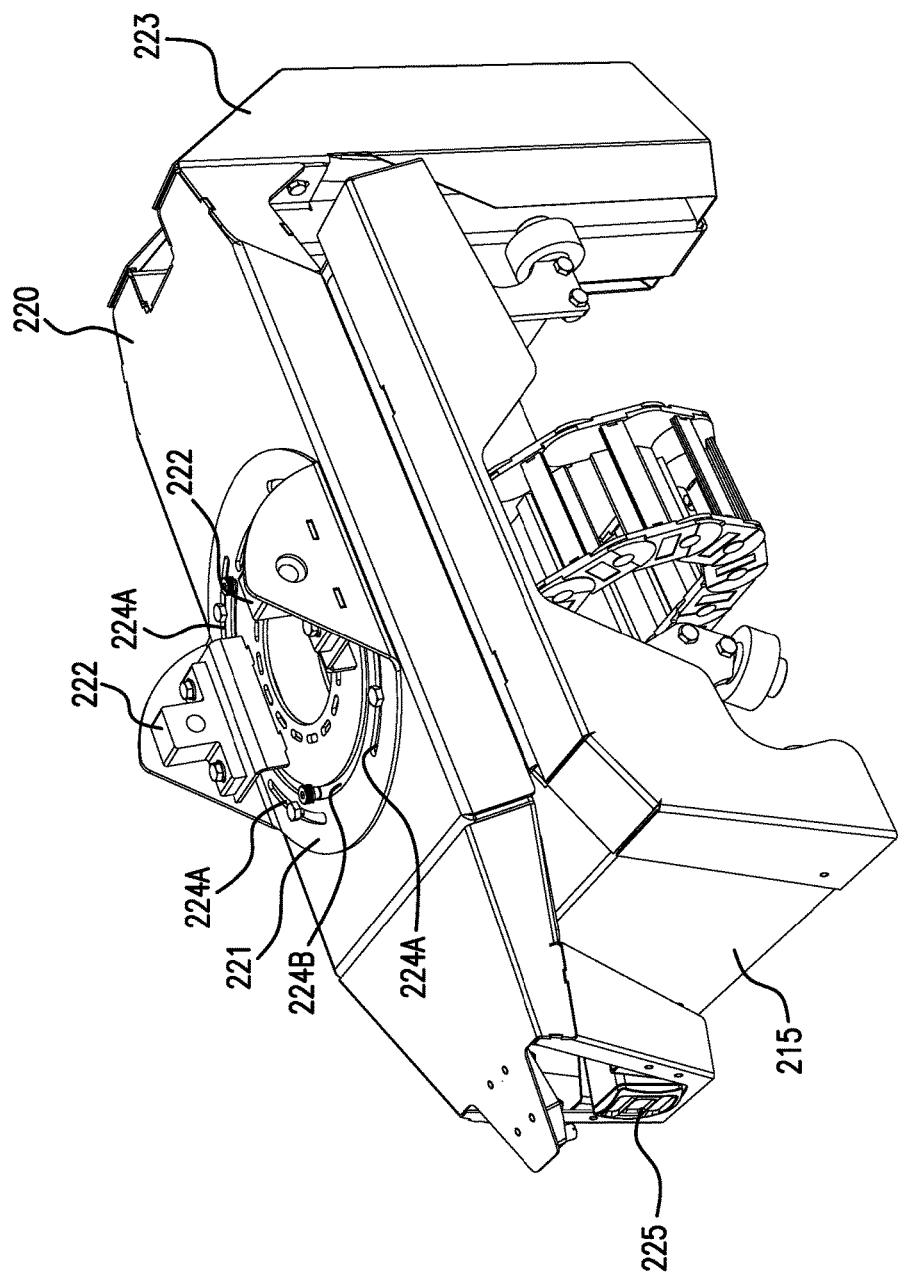

FIG. 2L illustrates an isometric view of foundation 220 coupled to carriage 215. As shown in FIG. 2L, foundation 220 resembles a platform coupled to a top surface of carriage 215. Foundation 220 is coupled to swivel plate 221, a camera 225, and a back housing 223. Swivel plate 221 is coupled to a top surface of foundation 220. Camera 225 is positioned on a front surface of foundation 220. Back housing 223 forms a portion of a back surface of foundation 220.

As shown in FIG. 2L, swivel plate 221 is coupled to a top surface of foundation 220. Swivel plate 221 is generally circular except near the side surfaces of foundation 220 where swivel plate 221 folds upwards to align with the side surface of foundation 220. Swivel plate 221 is made of any suitable material such as, for example, metal and/or plastic. This disclosure contemplates swivel plate 221 being any suitable shape such as, for example, a square.

In the example of FIG. 2L, swivel plate 221 has two pivot couplers 222 coupled to swivel plate 221, and thus coupled to foundation 220. Each pivot coupler 222 includes a cavity in which other components of robot 110 can couple. Each pivot coupler 222 is coupled near a side surface of swivel plate 221. In certain embodiments, these side surfaces of swivel plate 221 include cavities through or in which pivot coupler 222 can couple. Additionally, pivot coupler 222 can be coupled to swivel plate 221 by a fastener such as, for example, a screw or a bolt. In the example of FIG. 2L, each pivot coupler 222 is aligned with the other pivot coupler 222 on opposite side surfaces of swivel plate 221.

Swivel plate 221 defines several cavities 224. In the example of FIG. 2L, swivel plate 221 includes an outer set of cavities 224A and an inner set of cavities 224B. The inner cavities 224B are larger than the outer cavities 224A. One or more of cavities 224A and cavities 224B allow swivel plate 221 to couple to a top surface of foundation 220 and to a top surface of carriage 215. A fastener such as a screw or a bolt may be used to couple swivel plate 221, foundation 220, and carriage 215 through cavities 224. In certain embodiments, this coupling allows two types of rotation and/or swivel to occur. First, foundation 220 may rotate relative to carriage 215. In some embodiments, foundation 220 can rotate 15 degrees relative to carriage 215. This disclosure contemplates foundation 220 rotating any suitable number of degrees relative to carriage 215, such as for example, up to 20 degrees, 30 degrees, 40 degrees, and 50 degrees. Second, this coupling allows swivel plate 221 to rotate and/or swivel relative to foundation 220. In some embodiments, swivel plate 221 can rotate or swivel 90 degrees relative to foundation 220. This disclosure contemplates swivel plate 221 rotating or swiveling any suitable number of degrees relative to carriage 215, such as for example, up to 110 degrees.

Back housing 223 forms a portion of a back surface of foundation 220. In the example of FIG. 2L, back housing 223 extends from a back surface of platform 220 down past carriage 215. In some embodiments, back housing 223 includes a chamber through which other components of robot 110 are positioned. These components will be described using subsequent figures. Back housing 223 protects these components from damage and/or interference. Additionally, back housing 223 protects people and/or animals from contacting and/or potentially being injured by these components.

Camera 225 is positioned near a front surface of foundation 220. In the example of FIG. 2L, camera 225 is positioned on a front surface of foundation 220 in front of carriage 215. Camera 225 is configured to generate image signals and to communicate those signals to controller 115. These image signals can represent portions of livestock 108 in rotary 105. Based on these signals, controller 115 can determine the position of livestock 108 relative to robot 110.

Based on the determined location, controller 115 can determine how quickly carriage 215 should move along tracks 205 to align robot 110 with livestock 108. Controller 115 can also determine how to pivot an arm 230 of robot 110 and how far to extend a spray tool of robot 110 to position the spray tool near the teats of livestock 108. In some embodiments, camera 225 is a three-dimensional camera that can determine the length, width and depth of an object in front of camera 225. Using image signals captured by camera 225, controller 115 can determine how to position a spray tool of robot 110 near the teats of livestock 108.

Figure 2M:
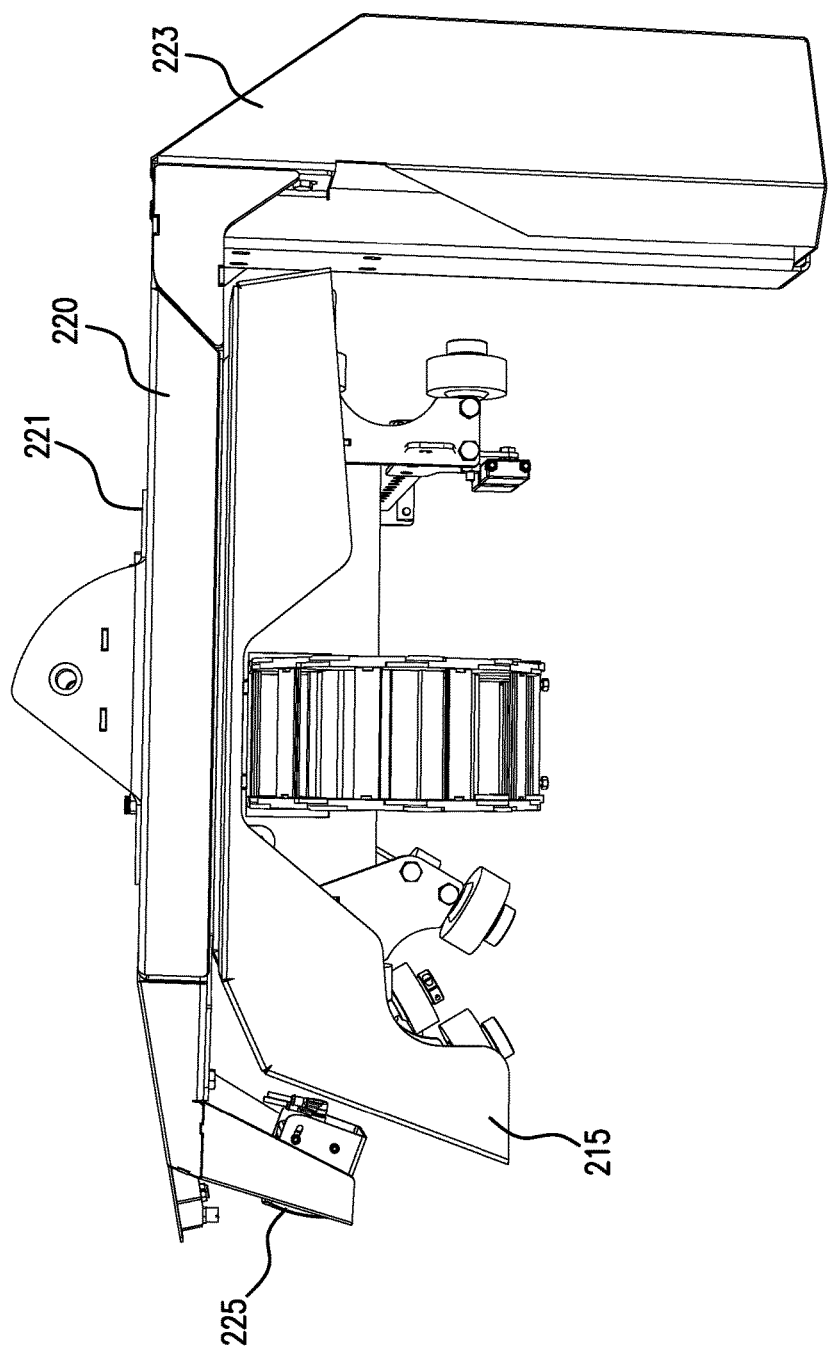

FIG. 2M illustrates a side view of foundation 220 coupled to carriage 215. As seen in FIG. 2M, foundation 220 is coupled to a top surface of carriage 215. Swivel plate 221 is coupled to a top surface of foundation 220. Back housing 223 forms a portion of a back surface of foundation 220. Back housing 223 extends below carriage 215. Camera 225 is positioned on a front surface of foundation 220. Additionally, camera 225 is positioned in front of carriage 215. Because camera 225 is mounted onto foundation 220 instead of arm 230, camera 225 is kept away from livestock 108 when robot 110 extends a spray tool towards livestock 108. As a result, camera 225 is protected from contacting livestock 108 and any resulting damage. Additionally, camera 225 is kept away from dirt and debris that could fall off livestock 108, which reduces the frequency at which camera 225 should be cleaned.

Figure 2N:
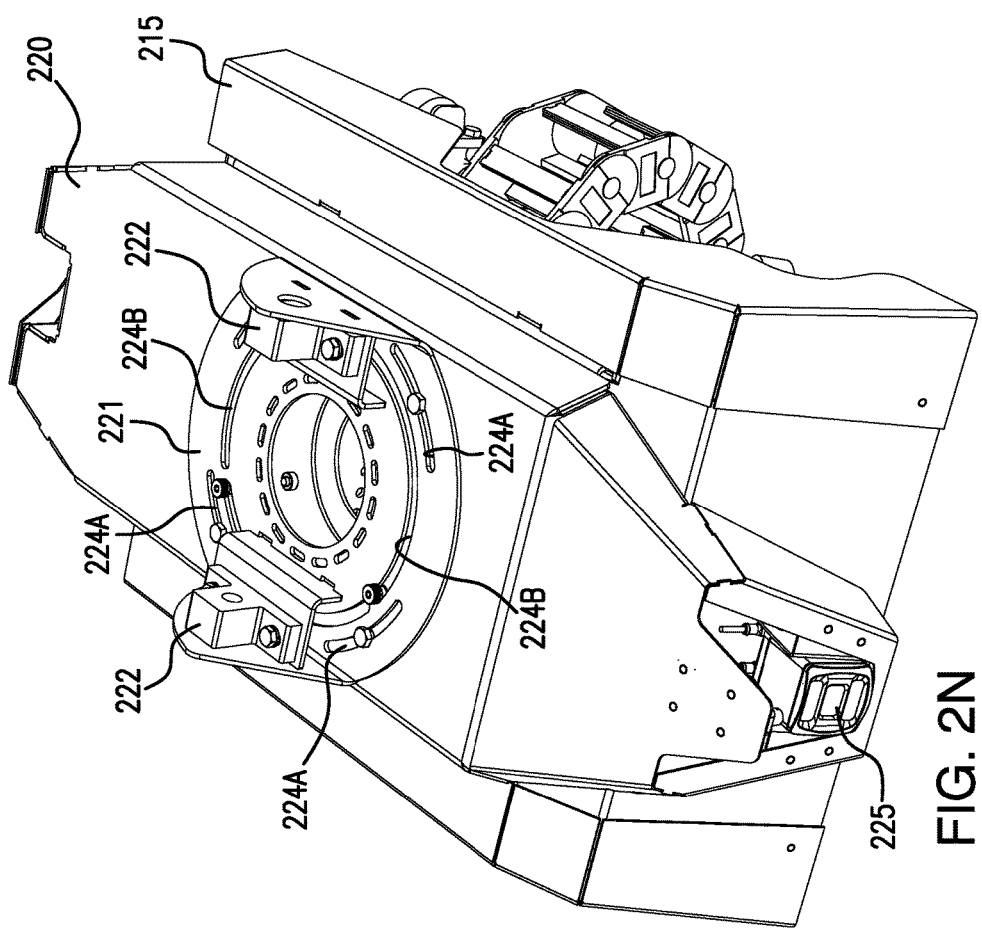

FIG. 2N shows another isometric view of foundation 220. In the example of FIG. 2N, foundation 220 is coupled to a top surface of carriage 215. Swivel plate 221 is coupled to a top surface of foundation 220. Swivel plate 221 has one or more pivot couplers 222 coupled to swivel plate 221. Swivel plate 221 also defines cavities 224. Swivel plate 221 couples to foundation 220 and carriage 215 through cavities 224. Also, as shown in FIG. 2N, camera 225 is positioned on a front surface of foundation 220.

Figure 2O:
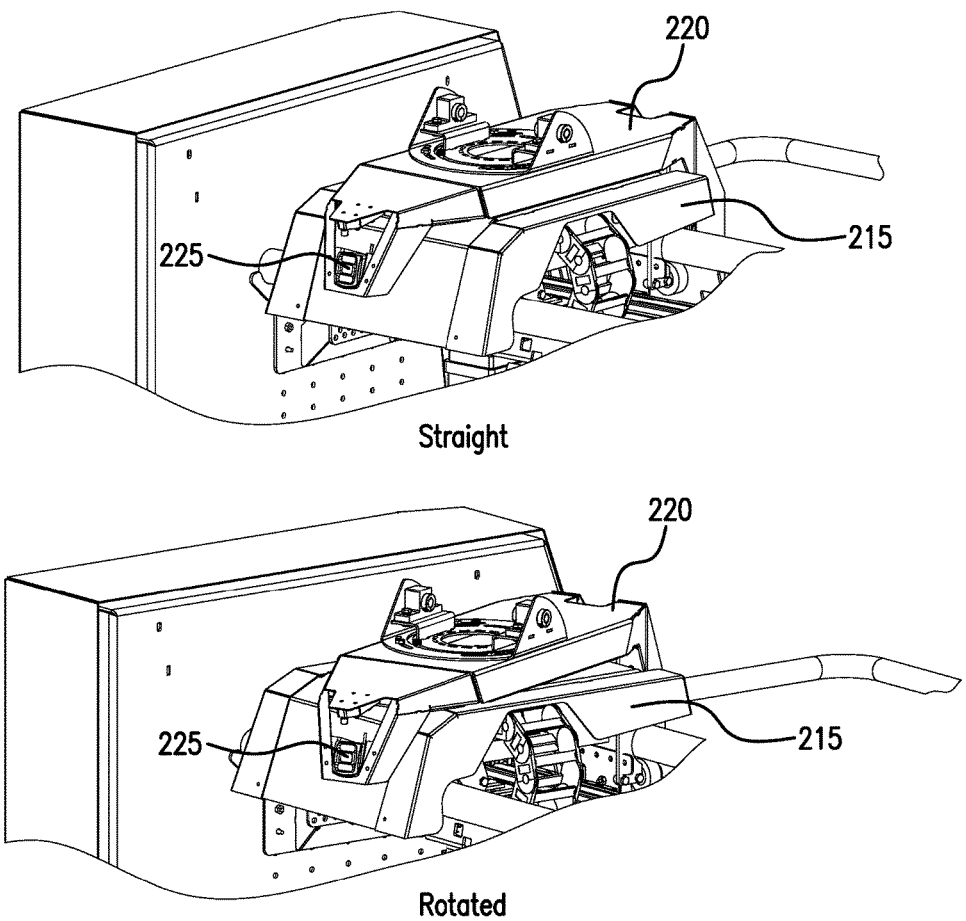

FIG. 2O shows one of the rotations and/or swivels provided by foundation 220 and/or swivel plate 221. As shown in FIG. 2O, foundation 220 can rotate and/or swivel relative to carriage 215. In the top figure of FIG. 2O, foundation 220 is straight or aligned with carriage 215. In the bottom figure of FIG. 2O, foundation 220 is rotated and/or swiveled relative to carriage 215. In certain embodiments, foundation 220 can rotate and/or swivel 15 degrees relative to carriage 215. Because foundation 220 can rotate and/or swivel relative to carriage 215, robot 110 is able to accommodate different types of rotaries 105. Specifically, certain rotaries 105 have stalls that are angled and not straight or aligned with carriage 215. Thus, to clean livestock 108 in these angled rotaries 105, it may be necessary for arm 230 to have an angled approach to rotary 105. Because foundation 220 can rotate and/or swivel relative to carriage 215, an arm 230 of robot 110 is able to take an angled approach to rotary 105. Thus, robot 110 can clean livestock 108 whether the livestock 108 is in an angled rotary 105 or a straight aligned rotary 105.

E. Platform

FIGS. 2P through 2U show the structure and operation of a platform 231. For clarity, various components of robot 110 that might otherwise obscure the view of certain components of platform 231 have been removed from FIGS. 2P through 2U. Their removal, however, should not be interpreted as their removal from robot 110. Additionally, certain illustrated components of robot 110 are not labeled or identified in FIGS. 2P through 2U to emphasize other components of platform 231.

Generally, platform 231 is a component of arm 230. Platform 231 provides a structure onto which other components of arm 230 are coupled and/or mounted. Platform 231 is made of any suitable material such as, for example, metal and/or plastic. Platform 231 is made of any suitable material such as, for example, metal and/or plastic. As shown in FIG. 2P, platform 231 is coupled to foundation 220. Platform 231 includes a coupler 232 that couples to pivot couplers 222 via a bar 233. This style of coupling allows platform 231 to pivot about the pivot couplers 222. When platform 231 pivots, an elevation of an end of platform 231 changes. In this manner, robot 110 can adjust an angle of approach towards livestock 108 and rotary 105. The various subcomponents of platform 231 will be described in more detail using FIGS. 2Q through 2U.

Figure 2Q:
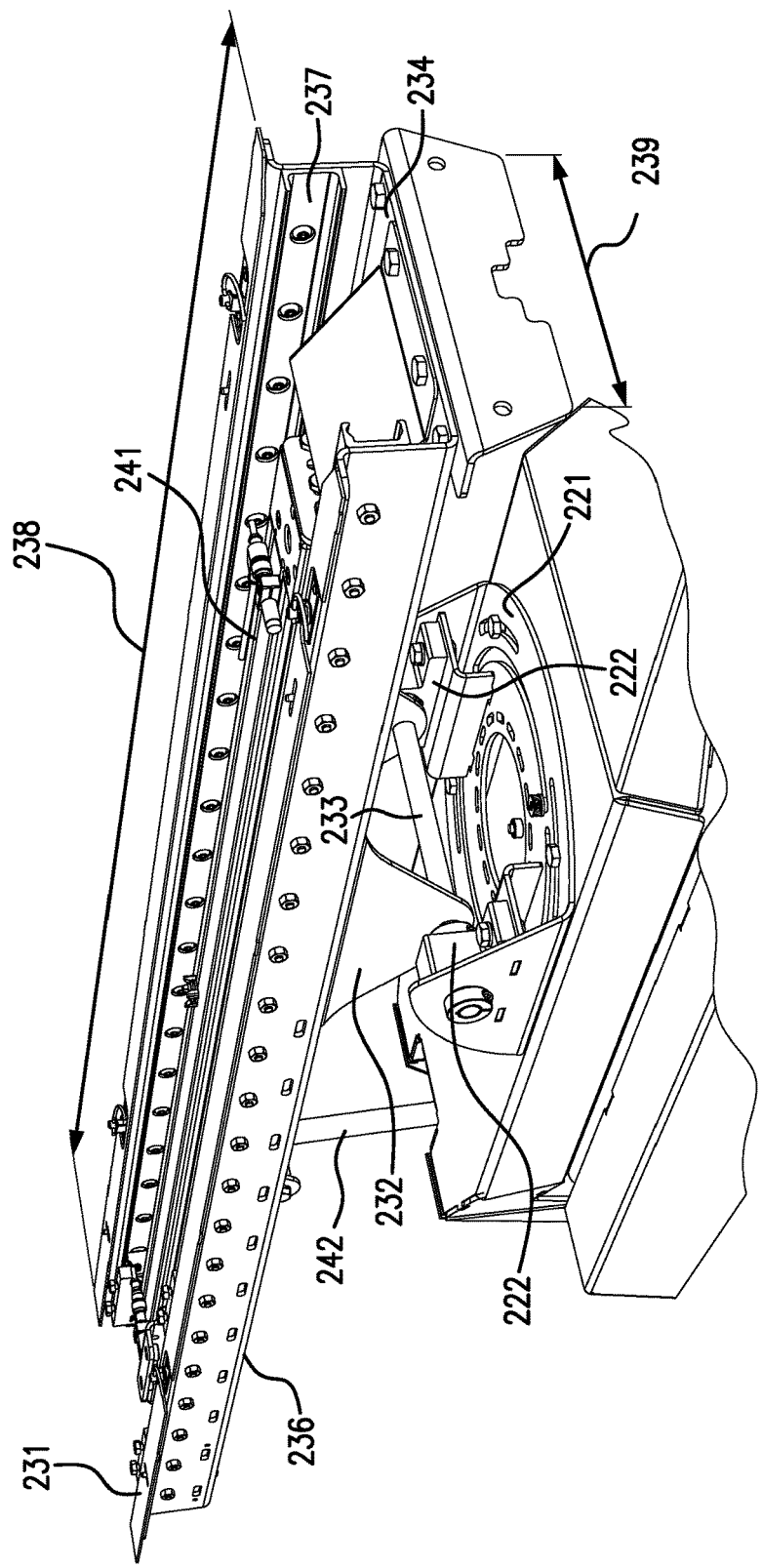

FIG. 2Q shows an isometric view of platform 231. Platform 231 has a length 238 and a width 239. Length 238 is greater than width 239. Additionally, length 238 is orthogonal to width 239. Length 238 is measured in a lengthwise direction from the back of platform 231 to the front of platform 231. The double-headed arrow labeled 238 indicates the lengthwise direction of platform 231. This disclosure contemplates platform 231 having any suitable length 238 and width 239. Generally, subcomponents of platform 231 will move towards livestock 108 in the lengthwise direction.

Platform 231 includes a top surface 234 and a bottom surface 236. Top surface 234 and bottom surface 236 are opposing surfaces. Top surface 234 faces the remaining components of arm 230. Bottom surface 236 faces swivel plate 221, foundation 220, carriage 215, and base 200.

Coupler 232 is coupled to bottom surface 236 of platform 231. In the example of FIG. 2Q, coupler 232 is triangular shaped and may be made of any suitable material such as, for example, metal and/or plastic. Coupler 232 includes a cavity through which bar 233 is inserted. Platform 231 includes a first coupler 232 near a first side surface of platform 231 and a second coupler 232 near a second side surface of platform 231. Bar 233 extends through the cavities defined by the first and second couplers 232 and extends between the first and second couplers 232. In the example of FIG. 2Q, bar 233 also extends into pivot couplers 222. In this manner, platform 231 is coupled to the pivot couplers 222 coupled to swivel plate 221. As a result, platform 231 is coupled to foundation 220.

Because platform 231 is coupled to foundation 220 through pivot couplers 222, platform 231 can pivot about pivot couplers 222. When platform 231 pivots about pivot couplers 222, an elevation of a front end of platform 231 is increased and/or decreased. By pivoting platform 231, an angle of approach towards livestock 108 in rotary 105 is adjusted. Robot 110 includes an actuator 242 that pushes and/or pulls on platform 231. In the example of FIG. 2Q, actuator 242 is coupled to bottom surface 236 of platform 231 behind couplers 232. When actuator 242 pushes on bottom surfaces 236, platform 231 pivots and a front end of platform 231 pivots downward. When actuator 242 pulls on bottom surface 236, a front end of platform 231 pivots upwards. Actuator 242 extends into a chamber defined by back housing 223. Back housing 223 protects actuator 242 from contact and/or damage by animals and/or users.

By pivoting platform 231, robot 110 can accommodate various rotary 105 heights and livestock 108 heights. For example, if rotary 105 or the teats of livestock 108 are higher than robot 110, platform 231 can be pivoted upwards so that a spray tool extending along platform 231 is directed upwards towards rotary 105 and the teats of livestock 108.

If rotary 105 or the teats of livestock 108 are lower than robot 110, platform 231 can be pivoted downwards so that a spray tool extending along platform 231 is directed downwards towards rotary 105 and the teats of livestock 108.

A linear actuator 241 is coupled to top surface 234 of platform 231. Linear actuator 241 pushes and/or pulls in the lengthwise direction. Guiderail 237 is coupled to an interior side surface of platform 231. Guiderail 237 guides components as linear actuator 241 pushes and/or pulls those components in the lengthwise direction.

Figure 2R:
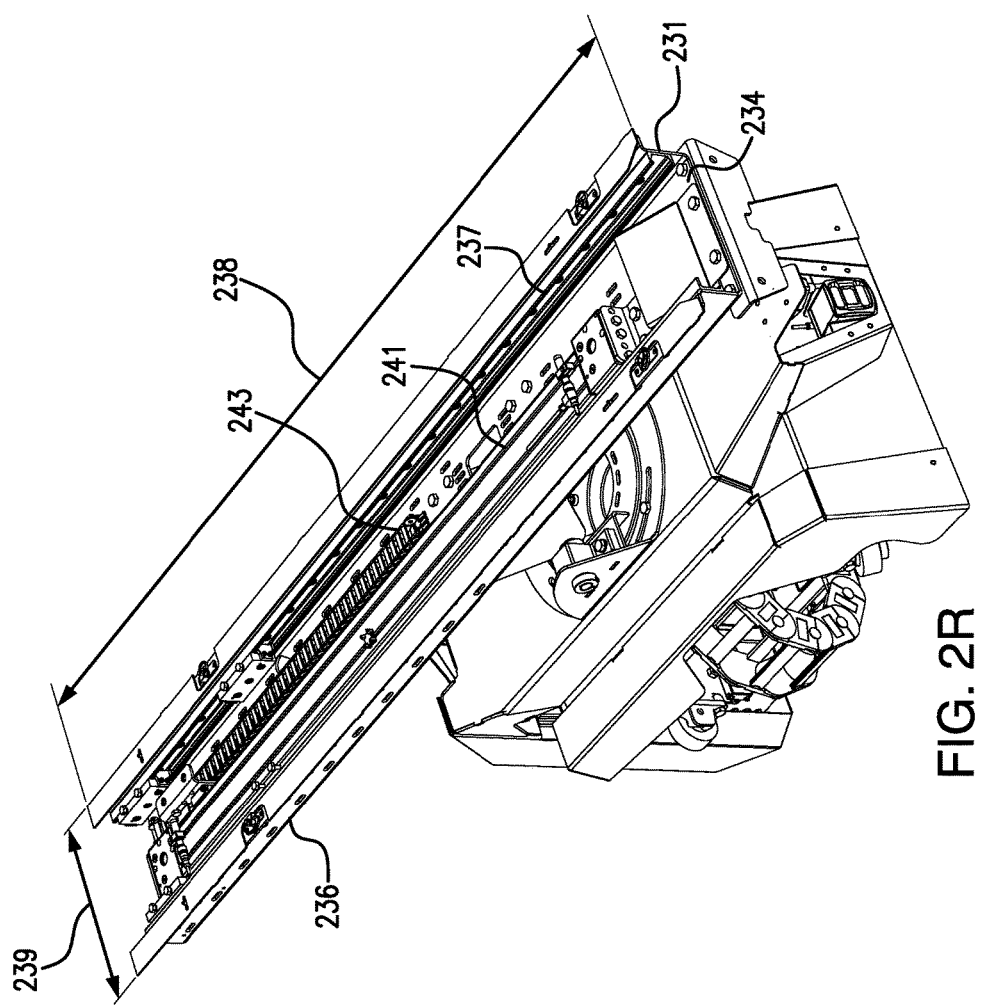

FIG. 2R illustrates another isometric view of platform 231. As shown in FIG. 2R, platform 231 includes a top surface 234 and a bottom surface 236. Platform 231 also includes a length 238 that is greater than and orthogonal to a width 239. Linear actuator 241 is coupled to top surface 234 and guiderail 237 is coupled to an interior side surface of platform 231.

A belt receiver 243 is coupled to top surface 234 of platform 231. Similar to belt receiver 209, belt receiver 243 is designed to engage a belt that guides a component as it is pushed and/or pulled by linear actuator 241. Belt receiver 243 engages the belt so that the belt does not come loose and/or tangled as the component is pushed and/or pulled by linear actuator 241.

Figure 2S:
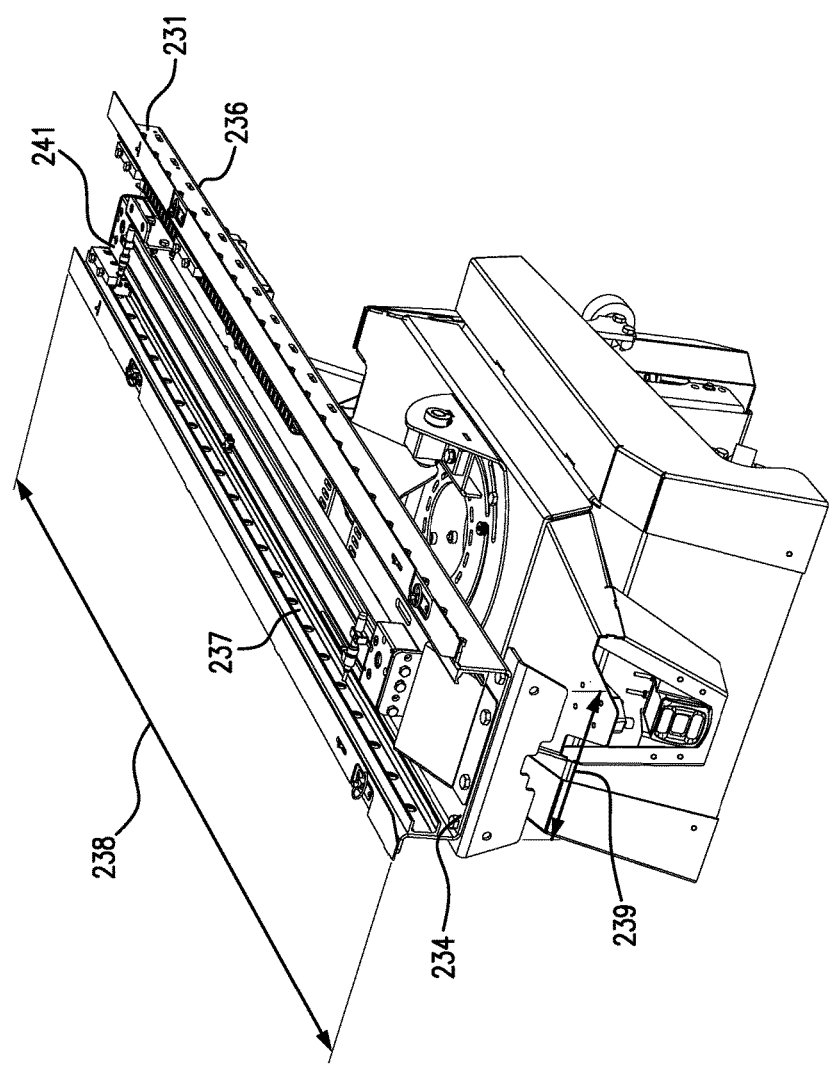

FIG. 2S shows another isometric view of platform 231. As shown in FIG. 2S, platform 231 includes top surface 234 and bottom surface 236. Platform 231 has a length 238 in a lengthwise direction. Length 238 is greater than and orthogonal to a width 239 of platform 231. Linear actuator 241 is coupled to top surface 234 of platform 231.

A second guiderail 237 is coupled to an interior side surface of platform 231. This second guiderail 237 is coupled to platform 231 such that it opposes the first guiderail 237. As a result, both interior side surfaces of platform 231 have a guiderail 237 coupled to them. Guiderails 237 guide a component as it is pushed and/or pulled by linear actuator 241 in the lengthwise direction.

FIG. 2T shows platform 231 being pivoted upwards and downwards. As seen in the left figure, platform 231 is pivoted such that a front end of platform 231 is pivoted upwards. As shown in the right figure, platform 231 is pivoted such that the front end of platform 231 is pivoted downwards. In certain embodiments, platform 231 can pivot at least 35 degrees about pivot coupler 222. For example, platform 231 pivots downwards 16 degrees and upwards 19 degrees. As another example, platform 231 pivots downwards 19 degrees and upwards 16 degrees. This disclosure contemplates platform 231 pivoting about pivot coupler 222 to any suitable degree.

FIG. 2U shows a side view of robot 110 as platform 231 is pivoted. As shown in FIG. 2U, platform 231 can be pushed and/or pulled by actuator 242 to pivot platform 231 upwards and downwards. The left figure shows platform 231 being pushed by actuator 242 so that the front end of platform 231 is pivoting downwards. The right figure shows actuator 242 pulling on platform 231 such that the front end of platform 231 pivots upwards. As described previously, this disclosure contemplates platform 231 pivoting at least 35 degrees about pivot coupler 222. This disclosure also contemplates platform 231 pivoting less than 35 degrees in certain embodiments. By pivoting platform 231, an angle of approach towards livestock 108 in rotary 105 is adjusted.

F. Extension Member and Spray Tool Member

Figure 2V:
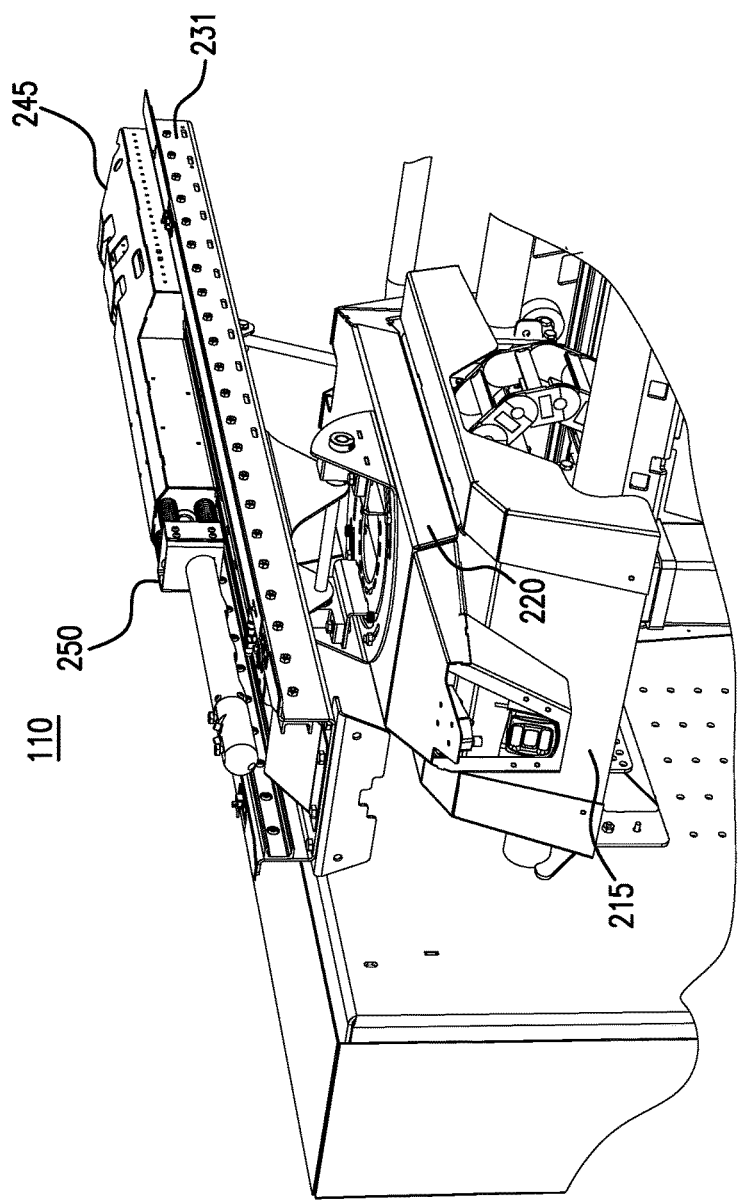

FIGS. 2V through 2AF illustrate an extension member 245 and a spray tool member 250 of robot 110. For clarity, various components of robot 110 that might otherwise obscure the view of certain components of extension member 245 and spray tool member 250 have been removed from FIGS. 2V through 2AF. Their removal, however, should not be interpreted as their removal from robot 110. Additionally, certain illustrated components of robot 110 are not labeled or identified in FIGS. 2V through 2AF to emphasize other components of extension member 245 and spray tool member 250.

As shown in FIG. 2V, extension member 245 is coupled to platform 231 and spray tool member 250 is coupled to extension member 245. Generally, linear actuator 241 pushes and/or pulls extension member 245 so that extension member 245 and spray tool member 250 move towards and away from livestock 108 in rotary 105. When extension member 245 is moved towards livestock 108, extension member 245 is being moved away from carriage 215. The various subcomponents of extension member 245 and spray tool member 250 will be described using FIGS. 2W through 2AF.

FIG. 2W shows an isometric view of extension member 245 and spray tool member 250. As shown in FIG. 2W, extension member 245 is coupled to linear actuator 241 and spray tool member 250 is coupled to extension member 245. Extension member 245 is coupled to linear actuator 241 such that linear actuator 241 moves extension member 245 along platform 231 in the lengthwise direction indicated by the double arrow labeled for length 238. Linear actuator 241 can move extension member 245 forwards towards a front surface of platform 231. Linear actuator 241 can also move extension member 245 backwards towards a back surface of platform 231. In this manner, linear actuator 241 can move extension member 245 towards and away from livestock 108 in rotary 105. In certain embodiments, extension member 245 can be moved 1.2 meters along platform 231 in the lengthwise direction. This disclosure contemplates extension member 245 being moved over 1.2 meters along platform 231. For example, extension member 245 may move up to two, three or four meters along platform 231 in the lengthwise direction.

Certain components of extension member 245 can be positioned within guiderails 237 coupled to an interior side surface of platform 231. These components may be any suitable component that allows extension member 245 to slide and/or move within guiderails 237. For example, these components may be wheels and/or lubricated grips. Guiderails 237 guide these components and extension member 245 as linear actuator 241 moves extension member 245 forwards and backwards in the lengthwise direction. Guiderails 237 reduce the chances that extension member 245 will veer off course when being moved by linear actuator 241.

Extension member 245 is made of any suitable material such as, for example, metal and/or plastic. In the illustrated example of FIG. 2W, extension member 245 includes a housing made of metal and/or plastic. The interior of extension member 245 may include a hollow space. Thus, the housing of extension member 245 protects the various components of extension member 245 from being damaged. These components may be components used to couple extension member 245 to linear actuator 241.

Spray tool member 250 is coupled to extension member 245. When extension member 245 moves along platform 231 in the lengthwise direction, spray tool member 250 also moves in the lengthwise direction. In the illustrated example of FIG. 2W, spray tool member 250 is coupled to a front surface of extension member 245. Thus, when extension member 245 moves forward towards livestock 108, spray tool member 250 also moves forward towards livestock 108.

When extension member 245 moves backwards away from livestock 108, spray tool member 250 also moves away from livestock 108.

Spray tool 255 is coupled to spray tool member 250. In the illustrated example of FIG. 2W, spray tool 255 is coupled to a front end of spray tool member 250. Generally, spray tool 255 is designed to discharge (e.g., spray) a disinfectant solution. Spray tool member 250 can be moved towards livestock 108 to position spray tool 255 near livestock 108. When spray tool 255 is positioned near the teats of livestock 108, spray tool 255 sprays and/or discharges the disinfectant solution onto the teats of livestock 108. In this manner, livestock 108 is cleaned which reduces the possibility of disease and/or infection.

As seen in FIG. 2W, spray tool member 250 includes a rectangular piece that couples to extension member 245. A cylindrical piece extends from the rectangular piece towards the front of platform 231. Spray tool 255 couples to a front end of the cylindrical piece. Spray tool 255 is also shown as a cylindrical component. One or more spray nozzles are located on a top surface of spray tool 255.

When linear actuator 241 moves extension member 245 towards a front surface of platform 231, spray tool member 250 and extension member 245 also move towards the front surface and extend beyond the front surface of platform 231. In this manner, spray tool 255 is moved towards livestock 108 in rotary 105. Robot 110 moves carriage 215 along tracks 205, pivots platform 231, and moves extension member 245 to position spray tool 255 at a spray position from which spray tool 255 can discharge a solution to a teat of livestock 108. Carriage 215 moves along tracks 205 to track the lateral movement of livestock 108 in rotary 105. Platform 231 pivots to adjust an angle of approach towards livestock 108. Extension member 245 is moved to move spray tool 255 towards livestock 108 at the angle of approach set by pivoting platform 231. When spray tool 255 is positioned near the teats of livestock 108, spray tool 255 discharges and/or sprays the disinfectant solution. For example, when spray tool 255 is positioned underneath the teats of livestock 108, spray tool 255 discharges the disinfectant solution upwards to clean the teats of livestock 108.

Figure 2X:
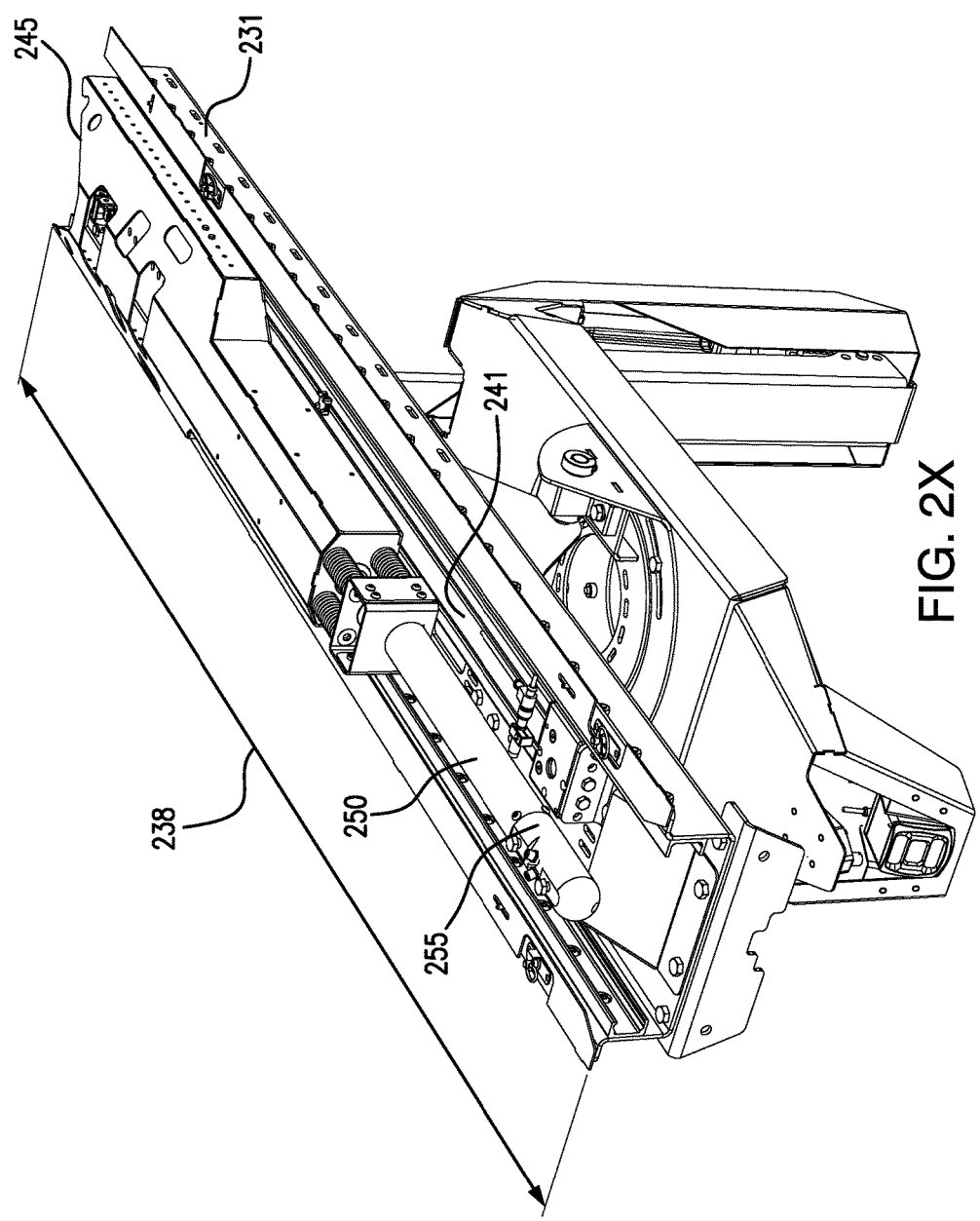

FIG. 2X shows an isometric view of extension member 245 and spray tool member 250. As seen in FIG. 2X, extension member 245 is coupled to linear actuator 241. Spray tool member 250 is coupled to a front surface of extension member 245. Spray tool 255 is coupled to a front surface of extension member 250. When linear actuator 241 moves extension member 245 towards and/or away from livestock 108, spray tool member 250 and spray tool 255 are also moved towards and/or away from livestock 108. Linear actuator 241 moves extension member 245 along platform 231 in the lengthwise direction indicated by the double arrow labeled 238.

Figure 2Y:
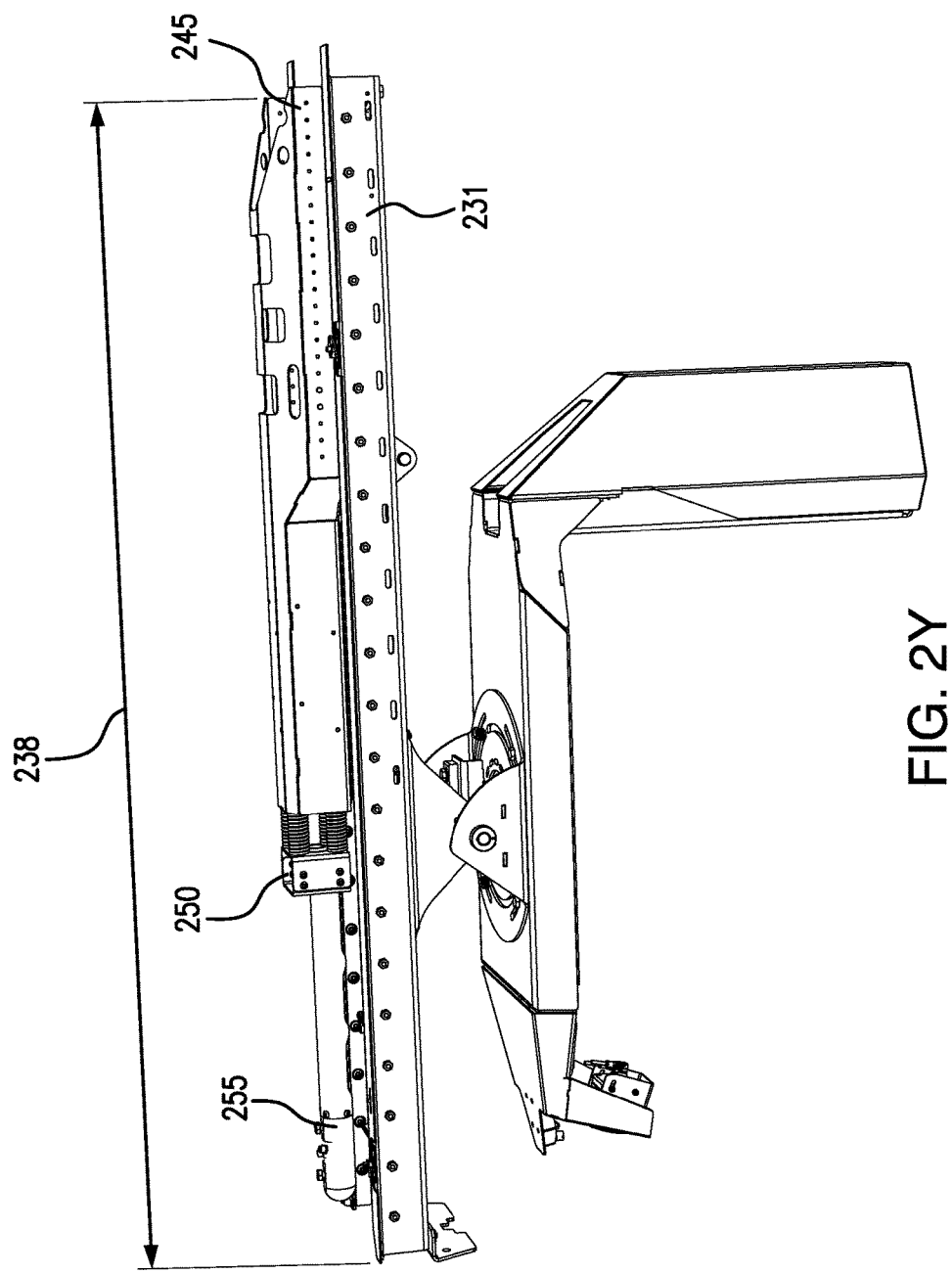

FIG. 2Y illustrates a side view of extension member 245 and spray tool member 250. As seen in FIG. 2Y, portions of extension member 245 and spray tool member 250 are positioned above platform 231. Extension member 245 and spray tool member 250 can move forwards and/or backwards along platform 231 in the lengthwise direction indicated by the double arrow labeled 238.

Figure 2Z:
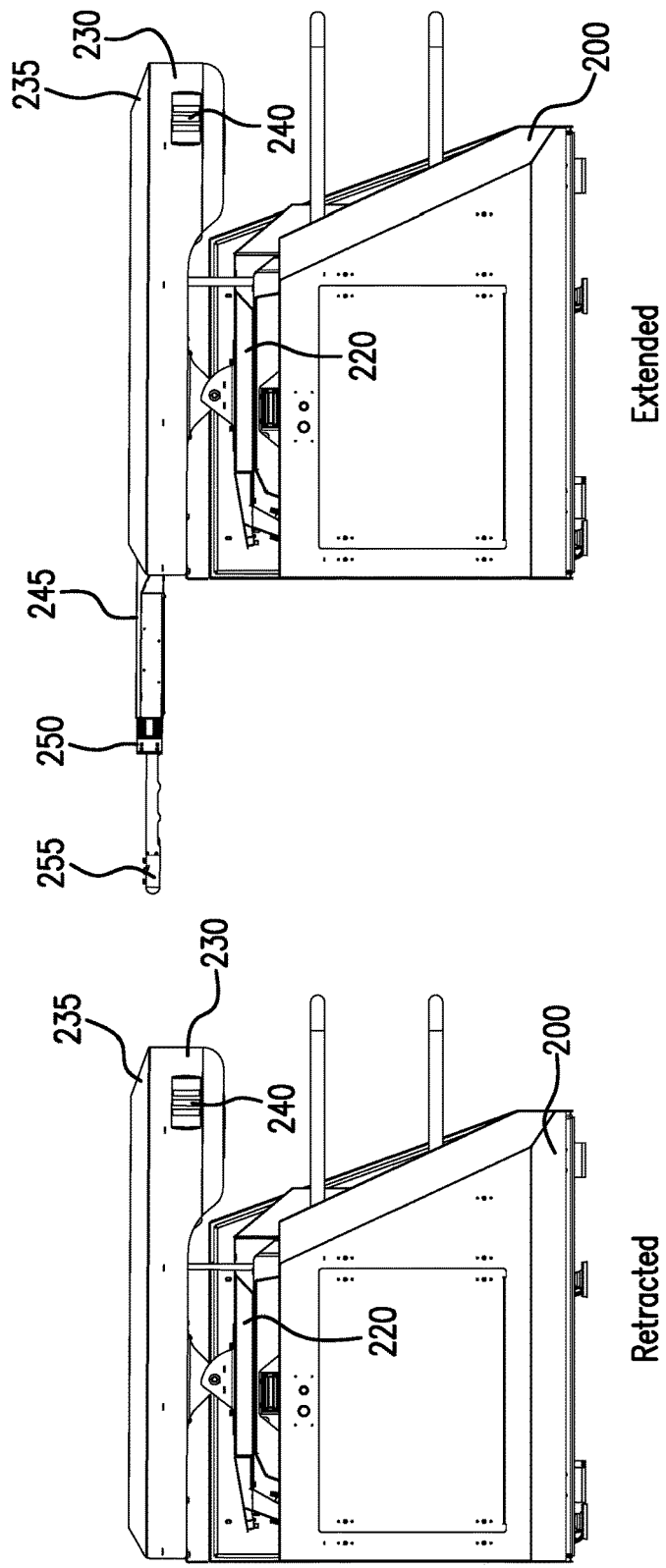
Figure 2A:
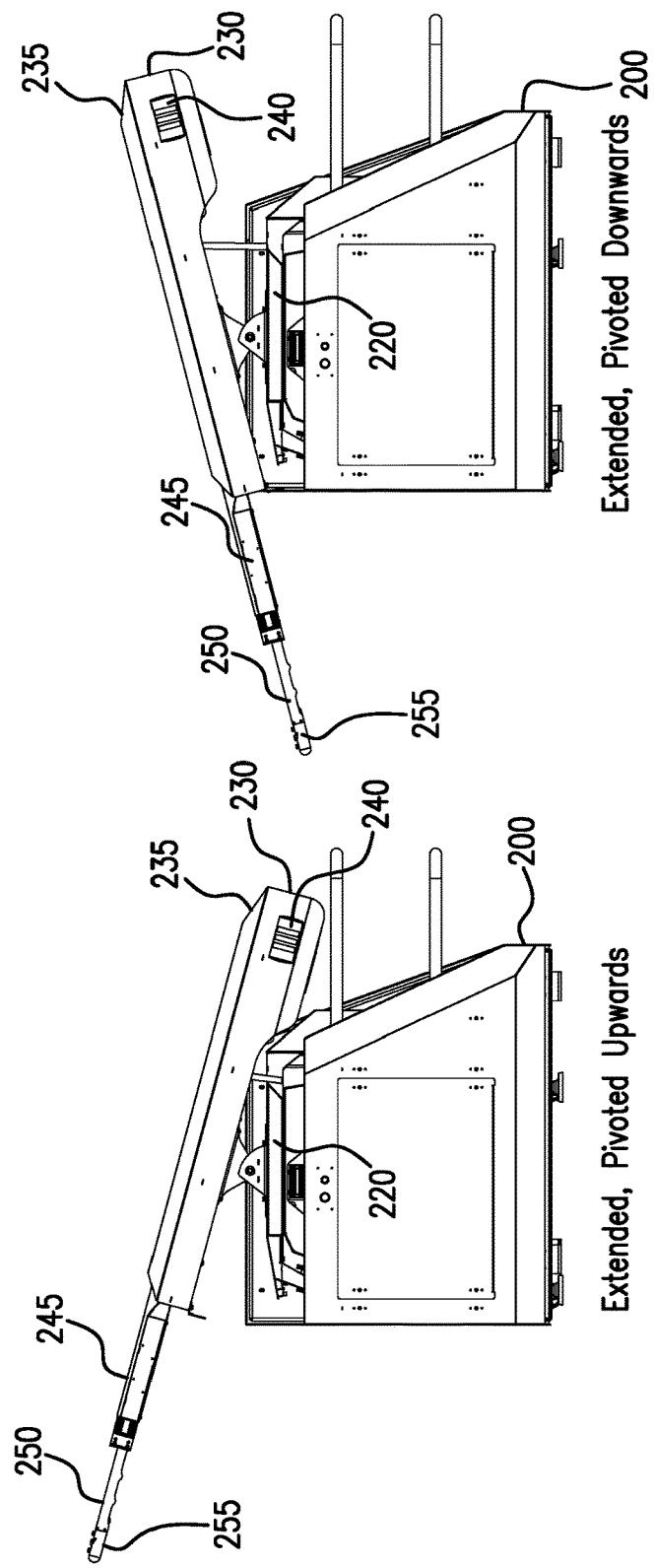
Figure 2A:
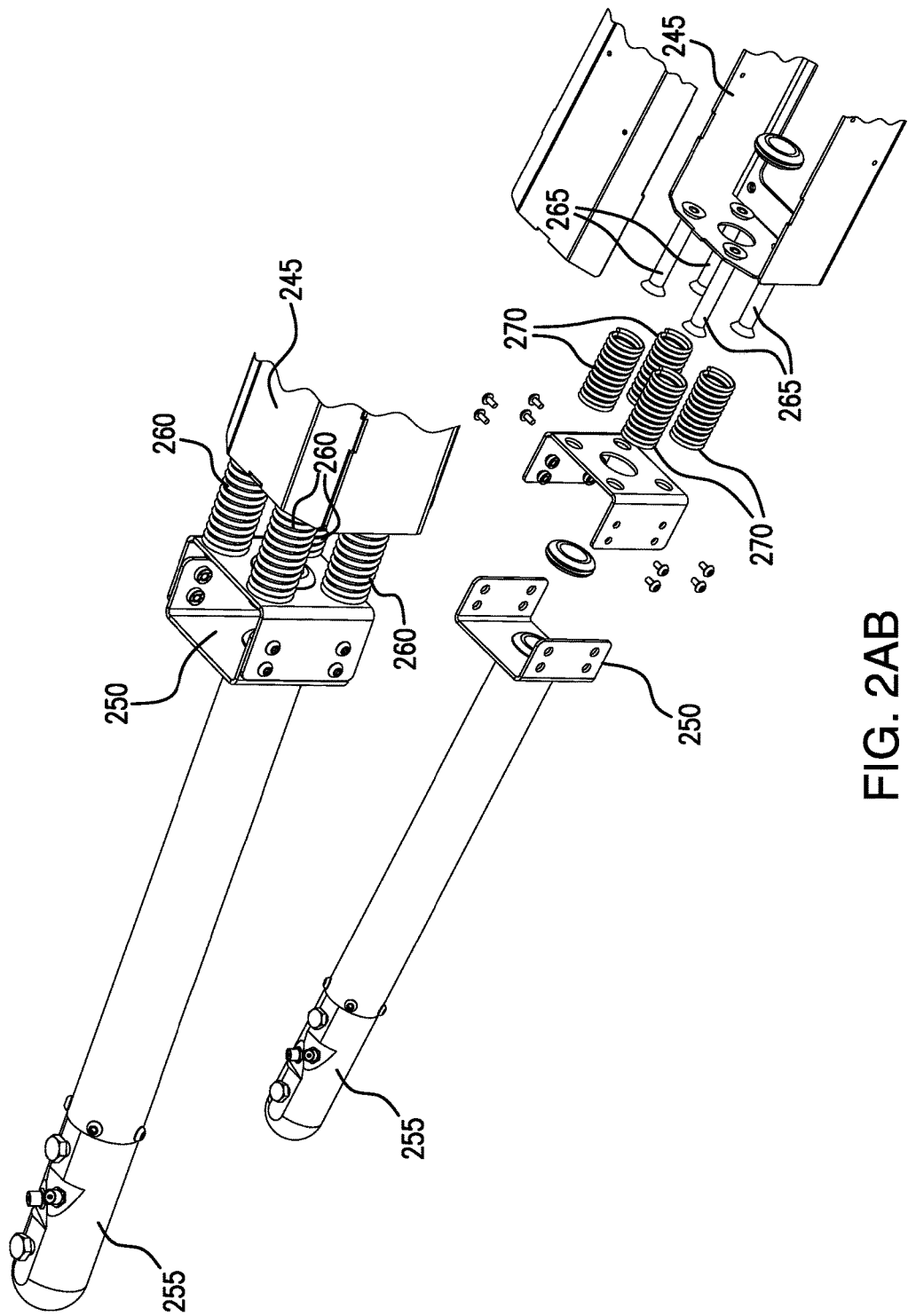
Figure 2A:
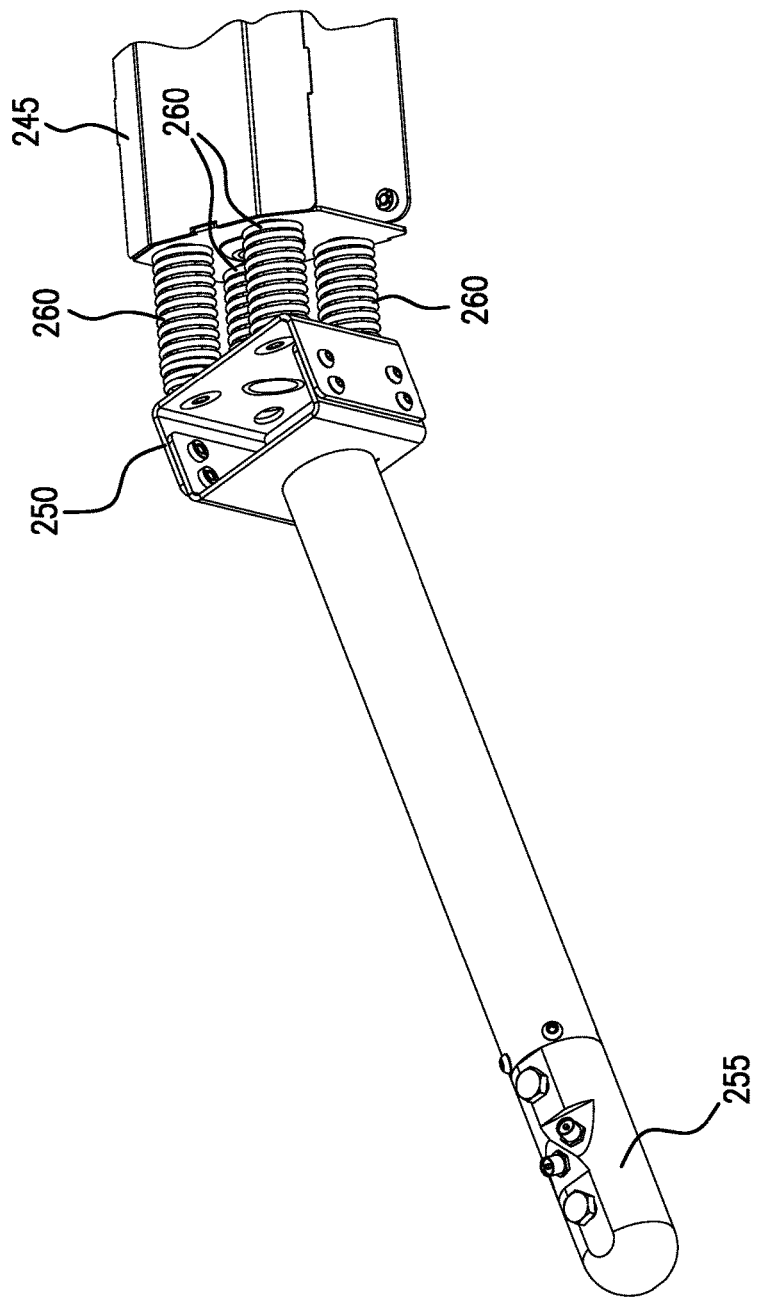
Figure 2A:
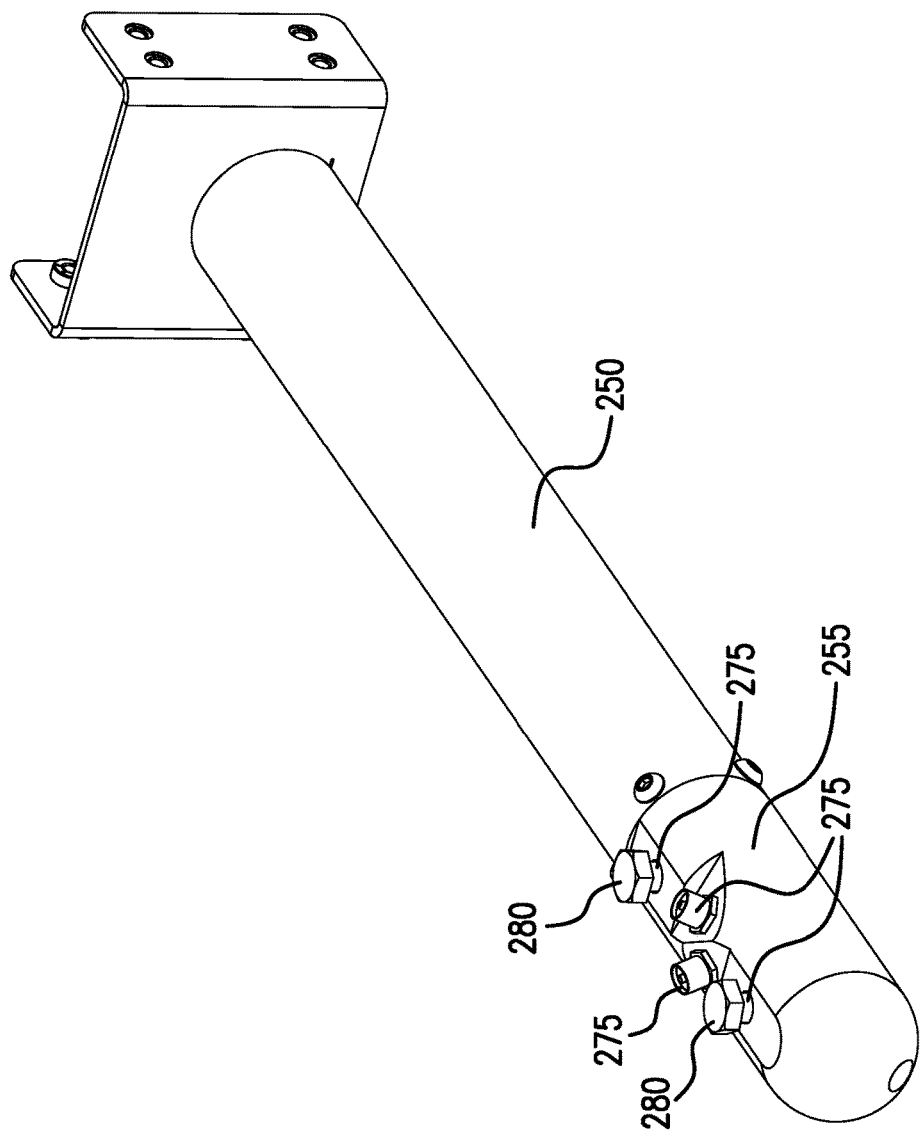
Figure 2A:
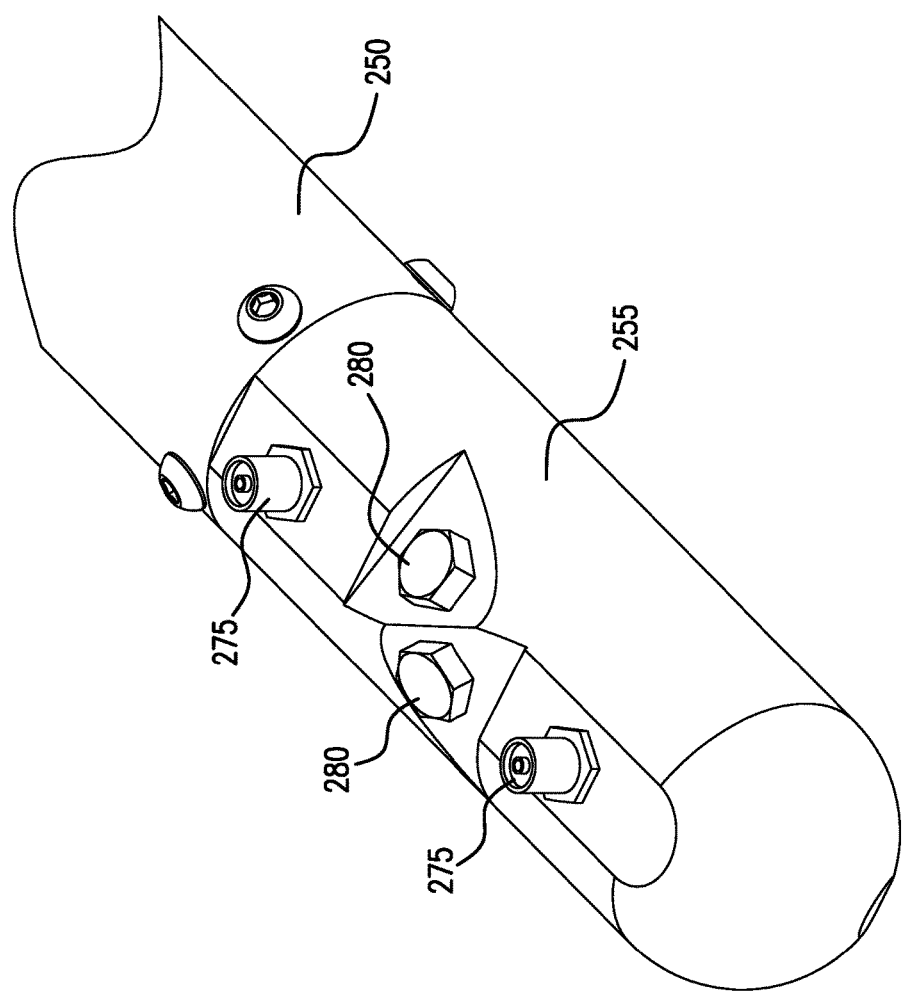
Figure 2A:
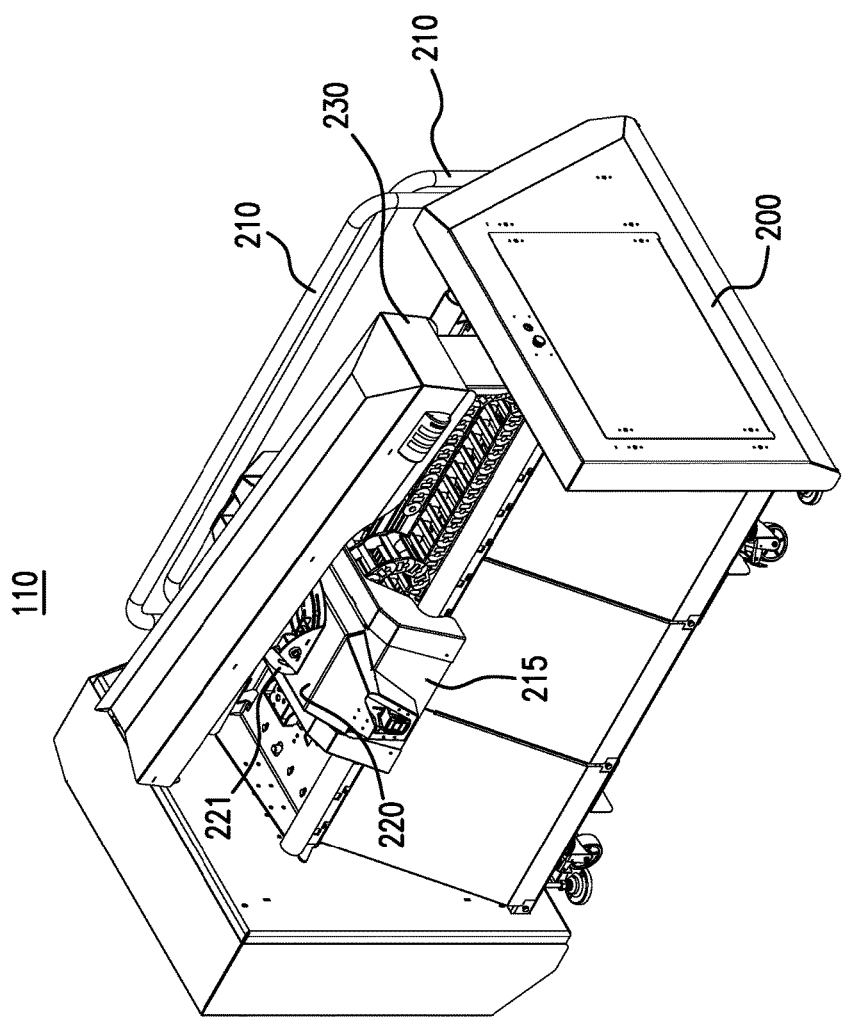
Figure 2A:
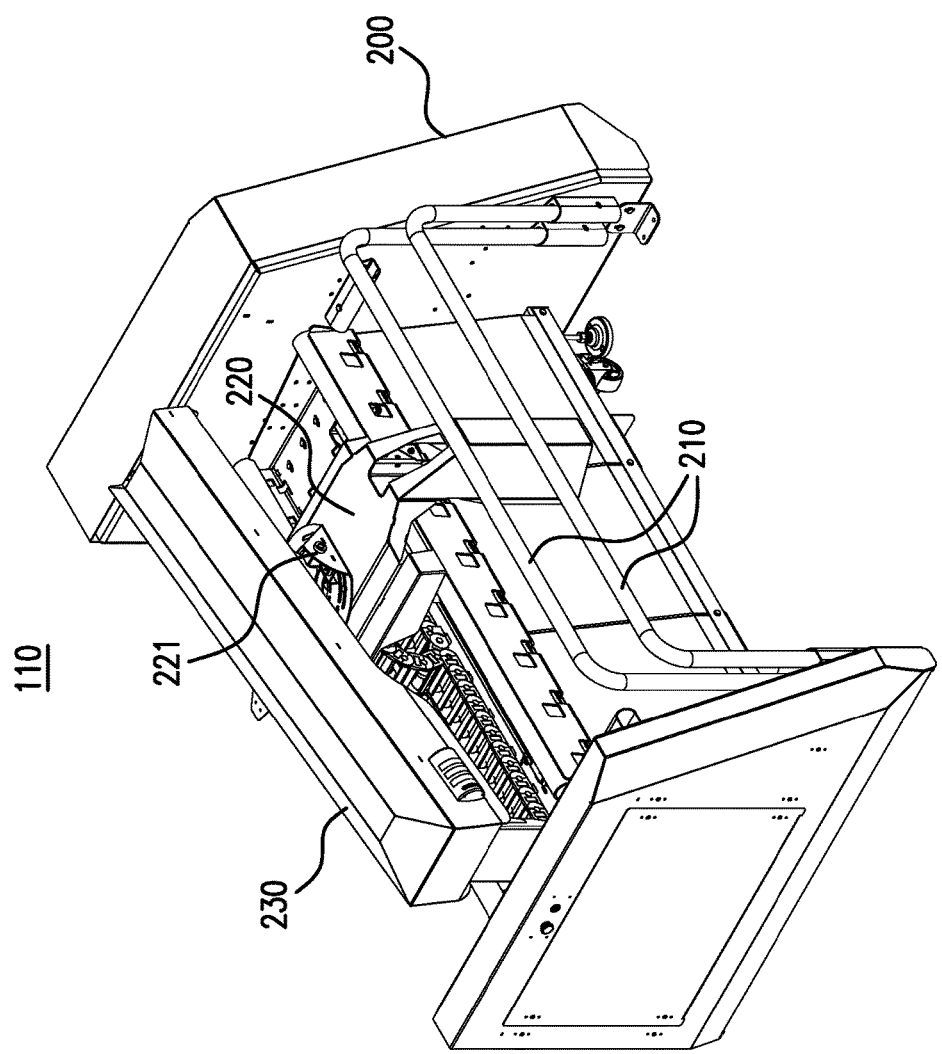
Figure 2A:
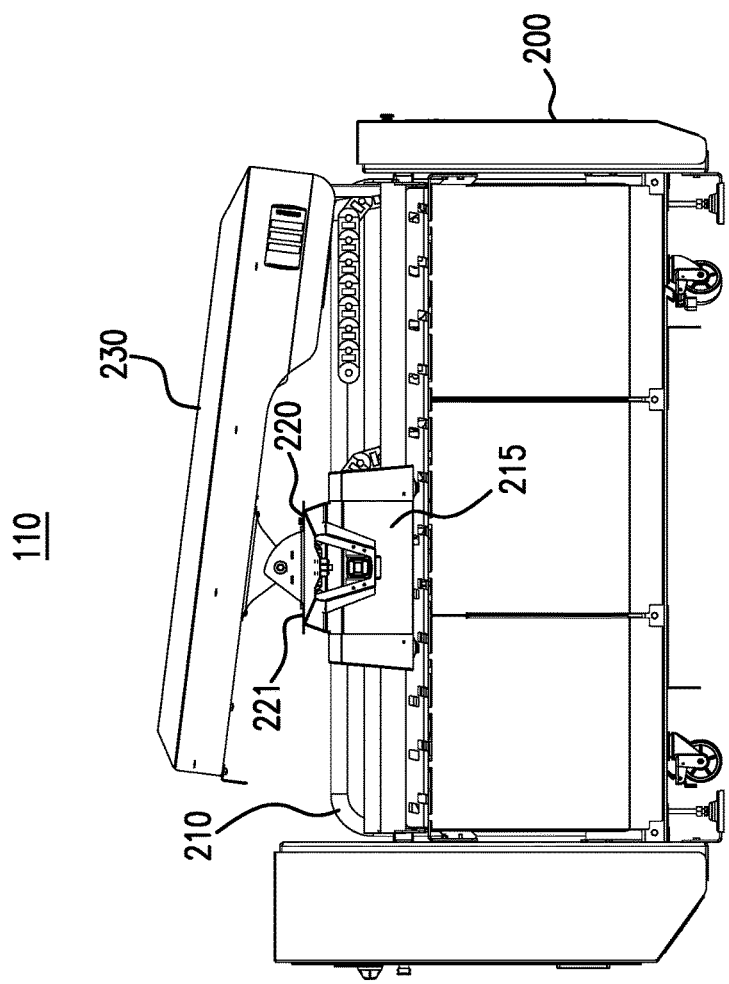

FIG. 2Z shows the retraction and extension of extension member 245 and spray tool member 250. In the figure on the left, extension member 245 and spray tool member 250 are retracted. When extension member 245 and spray tool member 250 are retracted, they may be positioned beneath housing 235 of arm 230. In this manner, extension member 245, spray tool member 250, and spray tool 255 are protected by housing 235 from contact and/or damage.

As seen in the figure on the right, extension member 245 and spray tool member 250 are extended. Linear actuator 241 moves extension member 245 to extend extension member 245 and spray tool member 250 beyond a front surface of platform 231. As seen in the figure, when extended, portions of extension member 245 and spray tool member 250 extend beyond a front surface of housing 235. When extended, spray tool 255 is moved closer to livestock 108 in rotary 105. In certain embodiments, extension member 245 and spray tool member 250 can be moved or extended up to 1.2 meters from a starting position. This disclosure contemplates extension member 245 and spray tool member 250 being moved or extended beyond 1.2 meters such as, for example, two, three or four meters.

FIG. 2AA shows extension member 245 and spray tool member 250 being extended at various pivot positions. In the figure on the left, extension member 245 and spray tool member 250 are extended and arm 230 is pivoted upwards. In the figure on the right, extension member 245 and spray tool member 250 are extended and arm 230 is pivoted downwards. As can be seen in FIG. 2AA, by adjusting the pivot of arm 230, an angle of approach of spray tool 255 changes. By controlling the pivot and the extension of extension member 245, spray tool 255 can be positioned at a spray position from which spray tool 255 can discharge a disinfectant solution to the teats of livestock 108. For example, spray tool 255 can be positioned beneath the teats of livestock 108 so that spray tool 255 can spray the disinfectant solution upwards to the teats of livestock 108.

FIG. 2AB shows the coupling between spray tool member 250 and extension member 245. As seen in FIG. 2AB, spray tool member 250 is coupled to extension member 245 using one or more flex couplers 260. In the example of FIG. 2AB, four flex couplers 260 are used to couple spray tool member 250 to extension member 245. As seen in the bottom figure, each flex coupler 260 includes a post 265 and a spring 270. Each spring 270 is designed to fit over a post 265. An end of a post is then used to couple to spray tool member 250.

In certain embodiments, flex coupler 260 protects spray tool member 250 from damage when spray tool member 250 and/or spray tool 255 are kicked by livestock 108. As seen in FIG. 2AC, flex coupler 260 allows spray tool member 250 to flex about spring coupler 260 but remain coupled to flex coupler 260. In other words, flex coupler 260 allows spray tool member 250 to experience a certain amount of motion without breaking and/or decoupling from extension member 245. This allowed motion is what prevents spray tool member 250 from snapping and/or breaking off of extension member 245 when kicked by livestock 108.

FIG. 2AD illustrates spray tool 255. As seen in FIG. 2AD, spray tool 255 is coupled to a front surface of spray tool member 250. Spray tool 255 is a cylindrical component that includes one or more spray nozzles 275 positioned on a top surface of spray tool 255. In the illustrated example of FIG. 2AD, spray tool 255 includes four spray nozzles 275. This disclosure contemplates spray tool 255 including any suitable number of spray nozzles 275. Additionally, spray tool 255 includes caps 280. Each cap 280 is designed to cap a spray nozzle 275 so that the capped spray nozzle 275 does not spray the disinfectant solution when the other nozzles 275 spray the disinfect solution. In this manner, the amount and/or the direction of the spray is controlled.

As seen in the illustrated example of FIG. 2AD, spray tool 255 includes a front spray nozzle 275 configured to spray the disinfectant solution upwards. Spray tool 255 also includes a back spray nozzle 275 designed to spray the disinfectant solution upwards. Between the front and back spray nozzles 275 are two additional spray nozzles 275 designed to spray disinfectant solution at an angle. One or more of these spray nozzles 275 can be capped during operation. By including spray nozzles 275 that spray in different directions, spray tool 255 better covers the various surfaces of the teats of livestock 108 with disinfectant solution in certain embodiments.

FIG. 2AE illustrates spray tool 255. In the illustrated example of FIG. 2AE, the front nozzle 275 and the back nozzle 275 are uncapped and the two angled nozzles 275 are capped using caps 280. In this example, when spray tool 255 discharges the disinfectant solution, only the front and back spray nozzles 275 will spray the disinfectant solution. In this manner, the disinfectant solution will only spray upwards.

FIG. 2AF shows spray tool 255. In the illustrated example of FIG. 2AF, front and back nozzles 275 are capped using caps 280. The angled spray nozzles 275 are uncapped. In this manner, when spray tool 255 discharges the disinfectant solution the uncapped nozzles 275 will spray the disinfectant solution at an angle.

By moving extension member 245 towards livestock 108, spray tool 155 can be positioned at a spray position from which spray tool 255 can discharge a disinfectant solution to the teats of livestock 108. In this manner, livestock 108 is cleaned which prevents the spread of disease and/or infection.

G. Storage

FIGS. 2AG through 2AI illustrate robot 110 in a stored configuration. As seen in FIG. 2AG, robot 110 can be configured for storage so that it takes up less space. Generally, to convert robot 110 to a storage configuration, carriage 215 is moved towards the middle of tracks 205, arm 230 is rotated and/or swiveled to be generally aligned with tracks 205, and gates 210 are decoupled from base 200 and folded upwards. In this manner, robot 110 has a smaller footprint when stored. Additionally, when robot 110 is in the storage configuration, robot 110 can be shipped without being placed within a crate. For example, because arm 230 is rotated and does not extend beyond a front or back surface of robot 110, a fork lift can get close enough to robot 110 to pick up robot 110.

To configure arm 230 for storage, carriage 215 is first moved towards the middle of tracks 205. When carriage 215 is positioned near the middle of tracks 205, arm 230 can swivel and/or rotate such that arm 230 is generally aligned with tracks 205. As described previously, swivel plate 221 can rotate and/or swivel relative to foundation 220. When swivel plate 221 swivels and/or rotates relative to foundation 220, arm 230 also rotates and/or swivels relative to foundation 220. In some embodiments, arm 230 and swivel plate 221 swivel and/or rotate up to 90 degrees relative to foundation 220. When arm 230 is swiveled and/or rotated, it becomes more aligned with tracks 205 such that arm 230 does not extend beyond a front or back surface of robot 110 or base 200. When arm 230 is rotated and/or swiveled, it becomes easier to store robot 110 because arm 230 does not extend beyond a front surface or a back surface of base 200.

As seen in FIG. 2AG, gates 210 are decoupled from base 200 and folded so that gates 210 are substantially vertical. In this manner, gates 210 no longer extend backwards, thus reducing the footprint of robot 110 and making it easier to store robot 110.

FIG. 2AH illustrates a backside view of robot 110 in the stored configuration. As seen in FIG. 2AH, arm 230 is swiveled and/or rotated such that arm 230 does not extend beyond a front or back surface of base 200. Additionally, gates 210 have been decoupled from base 200 and folded into separate coupling spaces such that gates 210 are substantially vertical. As a result, gates 210 do not extend beyond the back surface of base 200, thus reducing the footprint of robot 110 making it easier to store robot 110.

FIG. 2AI shows a front view of robot 110 in the stored configuration. As seen in FIG. 2AI, arm 230 is rotated and/or swiveled such that it aligns substantially with tracks 205. In this manner, arm 230 does not extend beyond a front or back surface of base 200 making it easier to store robot 110.

H. Example Operation

FIG. 4 illustrates an example method 400 of operating robot 110. In certain embodiments, controller 115 performs the steps of method 400. Generally, controller 115 operates various components of robot 110 to position a spray tool at a spray position from which the spray tool can spray the teats of a livestock with a disinfectant solution. In this manner, the livestock is cleaned which reduces the chances of disease and/or infection.

Controller 115 receives an image signal from a camera in step 405. As discussed previously, the camera is mounted to a foundation of the robot. The camera is pointed forwards towards the livestock. The camera captures images (e.g., images of the livestock) and transmits an image signal representing those images to controller 115. In certain embodiments, by positioning the camera at the front surface of a foundation of the robot 110, livestock are not able to kick and/or dislodge the camera. Additionally, it is more difficult for debris and/or dirt from the livestock to hit and dirty the camera.

After controller 115 receives the image signal from the camera, controller 115 processes the image signal to determine whether livestock is detected in step 410. Controller 115 performs any suitable signal analysis and/or image analysis to locate the post of a stall on a rotary. Controller 115 uses those posts as boundaries between which the livestock should be located. Controller 115 then processes the portion of the image between the two posts to determine whether a livestock is present in the stall. If controller 115 determines that no livestock is present in the stall, controller 115 returns to step 405 to receive another image signal from the camera.

If controller 115 determines that a livestock is present in the stall, controller 115 then processes the image further to locate the two hind legs of the livestock. Generally, the teats of the livestock will be located between the two hind legs. After controller 115 locates the hind legs and the teats of the livestock, controller 115 can process the image further to determine a distance to the teats of the livestock. Controller 115 can determine the distance because in certain embodiments the camera that generated the image signal is a three-dimensional camera that sends length, width, and depth information to controller 115.

After controller 115 determines the location of the teats of a livestock in the rotary, controller 115 begins to move various components of the robot to position a spray tool near the teats of a livestock. Controller 115 begins by moving a carriage along tracks in a first direction from a starting position in step 415. Controller 115 moves the carriage along the tracks at a speed that substantially matches the lateral speed of the livestock in the rotary. In this manner, the robot and/or the spray tool remain laterally aligned with a livestock as it rotates in the rotary. In some embodiments, the carriage is already moving when controller 115 determines the location of the teats of the livestock. In these instances, controller 115 adjusts the velocity of the carriage to align the carriage with the livestock in the rotary. Controller 115 then adjusts the velocity of the carriage to track the lateral movement of the livestock in the rotary.

As the carriage tracks the livestock in the rotary, controller 115 pivots a platform to adjust an elevation of an end of the platform, which adjusts an angle of approach to the livestock, in step 420. For example, if the teats of the livestock are higher than the spray tool, controller 115 pivots the platform upwards such that the spray tool approaches the livestock in an upward direction. In this manner, the spray tool will be elevated higher up near the teats of the livestock. As another example, if the teats of the livestock are lower than the robot and/or the spray tool, controller 115 pivots the platform downward such that the spray tool approaches the livestock at a downward angle. In this manner, the spray tool can be positioned beneath the teats of the livestock.

Controller 115 extends an extension member in step 421. By extending the extension member, controller 115 moves the extension member, a spray tool member, and the spray tool towards the livestock in the rotary. Controller 115 can determine how far to extend the extension member and the spray tool member by determining the distance to the teats of the livestock. Controller 115 can extend the extension member and the spray tool member to position the spray tool beneath the teats of the livestock. From that position, the spray tool can discharge and/or spray the teats of the livestock with a disinfectant solution. When the spray tool is in the proper position, controller 115 uses the spray tool to discharge a solution to the teats of the livestock in step 422.

In step 425, controller 415 determines whether it has finished cleaning the livestock. Livestock may not be finished being cleaned if there are more teats that should be sprayed. If the robot has not finished cleaning the livestock, controller 115 can return to step 420 to reposition the spray tool near another teat of the livestock. For example, controller 115 can further pivot the platform or extend the extension member and spray tool member even further to spray another teat of the livestock.

When controller 115 determines that the teats of the livestock have been cleaned, controller 115 continues to step 430 to retract the extension member. Controller 115 retracts the extension member by moving the extension member in a direction opposite the direction that the extension member moves when it is being extended in step 420. By retracting the extension member, the extension member, spray tool member, and the spray tool are moved back towards the robot.

Controller 115 then continues to a portion of the process where controller 115 moves certain components of the robot back to a starting position. In step 435, controller 115 moves the carriage along the tracks in a second direction towards the starting position. The second direction is opposite the first direction of the carriage in step 415. As the carriage moves back to the starting position, if controller 115 detects another livestock, controller 115 can begin the cleaning process for the newly detected livestock before the carriage returns to the starting position. For example, in step 440, controller 115 receives an image signal from the camera as the carriage is moving in the second direction. Controller 115 processes the image signal and determines whether another livestock is detected in step 445. If another livestock is detected, controller 115 proceeds to step 450 to move the carriage along the tracks back into first direction. Essentially, controller 115 reverses the movement of the carriage to begin tracking the newly detected livestock. When the carriage is aligned with the livestock and is tracking the lateral movement of the livestock in the rotary, controller 115 proceeds to step 420 to again pivot the platform and extend the extension member and the spray tool member to position the spray tool between the hind legs of the newly detected livestock. The spray tool can then spray the teats of the newly detected livestock with the disinfectant solution.

If no new livestock is detected before the carriage reaches the starting position, then controller 115 can conclude method 400. In step 455, controller 115 determines whether the carriage has reached the starting position. If the carriage has not reached the starting position, controller 115 returns to step 435 and continues moving the carriage in the second direction towards the starting position if the carriage has reached the starting position, controller 115 and method 400.

III. Brush Robot Embodiments

FIGS. 3A through 3S illustrate embodiments of a robot 110 that cleans livestock 108 by brushing the teats of livestock 108. The components of robot 110 are mostly the same as those illustrated in FIGS. 2A through 2AI. Further details concerning those components may be found in the discussion of FIGS. 2A-2AI.

In certain embodiments, by brushing the teats of livestock 108, dirt and debris are removed from the teats of livestock 108. Additionally, brushing the teats of livestock 108 stimulates the teats which could lead to a milk letdown. The milk letdown makes it easier to subsequently milk the cow. FIGS. 3A through 3D show the structure and operation of a single-armed brush embodiment. FIGS. 3E through 3S show the structure and operation of a double-armed brush embodiment.

A. Single-Armed Brush

FIGS. 3A through 3D show an embodiment of robot 110 with a single-armed brush. Generally, the differences between the embodiments of FIGS. 3A through 3D and the embodiments of FIGS. 2A through 2AI are that (1) the spray tool 255 is replaced with a brush tool with which to clean livestock 108 and (2) robot 110 includes a hood that includes nozzles to spray and/or clean brushes of the brush tool. Otherwise, the structure and operation of robot 110 generally remains the same as the embodiments shown in FIGS. 2A through 2AI. Further details about the structure and operation may be found in the discussion for FIGS. 2A through 2AI.

As shown in FIG. 3A, robot 110 has extended extension member 245 towards livestock 108. A brush tool member 305 is coupled to extension member 245. Brush tool member 305 is similar to spray tool member 250 in that brush tool member 305 includes a rectangular component that couples to extension member 245 by flex couplers 260. Brush tool member 305 extends towards livestock 108 when extension member 245 extends towards livestock 108.

Brush tool 310 is coupled to a front end of brush tool member 305. Brush tool 310 differs from spray tool 255 in that brush tool 310 does not include spray nozzles. Instead, brush tool 310 includes an interface onto which various brush heads can be attached. In some embodiments, brush tool 310 has a profile that is eight inches high. In certain embodiments, spray tool 255 can be removed from spray tool member 250. Then, brush tool 310 can be coupled to spray tool member 250 where spray tool 255 used to be. In this manner, robot 110 is quickly customizable to be a spray robot or a brush robot.

In some embodiments, spray tool member 250 can be decoupled from extension member 245 and flex couplers 260. Brush tool member 305 and brush tool 310 can then be coupled to extension member 245 and flex couplers 260. In this manner, robot 110 can be quickly customizable to be a brush robot or a spray robot.

A coupler 315 is coupled to brush tool 310. Coupler 315 serves to couple one or more brush heads to brush tool 310. In some embodiments, coupler 315 can rotate relative to brush tool 310. In this manner, brush heads that are coupled to coupler 315 can share that same rotation.

Platform 320 is coupled to a top surface of coupler 315. Platform 320 offers a surface onto which one or more brush heads can be coupled to brush tool 310. In some embodiments, platform 320 can rotate about coupler 315. In this manner, brush heads coupled to platform 320 can rotate about coupler 315. In some embodiments, coupler 315 rotates to rotate platform 320. As seen in the example of FIG. 3A, two brushes 330 and two brush couplers 325 are coupled to platform 320.

Brush couplers 325 couple brush heads to platform 320. In some embodiments, brush coupler 325 rotates. When brush coupler 325 rotates, brush heads attached to brush coupler 325 also rotate and/or spin. By rotating and/or spinning, brush coupler 325, brushes coupled to brush coupler 325 can spin to clean the teat of livestock 108.

Brushes 330 are coupled to brush coupler 325. Brushes 330 may be made of any suitable material such as animal, fibers and/or synthetic fibers. When brushes 330 rotate and/or move along the surface of teat of livestock 108, brushes 330 remove dirt and debris from the teat of livestock 108. In this manner, the teats of livestock 108 are cleaned which reduces the chances of disease and/or infection. In some embodiments, a brush 330 has a height of 120 millimeters. The brush 330 is 150 millimeters wide at the top and 95 millimeters wide at the bottom.

In some embodiments, brushes 330 are moved over the surface of the teats of livestock 108 by rotating coupler 315. When coupler 315 rotates, platform 320 also rotates. The rotation of platforms 320 rotates brushes 330 and moves the brushes 330 over the surface of the teats of livestock 108.

In certain embodiments, brush couplers 325 rotate to spin brushes 330. When brushes 330 spin, brushes 330 move along the surface of the teats of livestock 108 and remove dirt and debris from the teats of livestock 108. In some embodiments, platform 320 rotates about coupler 315. When platform 320 rotates about coupler 315, brushes 330 rotate about coupler 315 and clean dirt and debris from the teats of livestock 108.

In certain embodiments, brush tool 310 includes a brush 330 on a top surface of platform 320 and a brush 330 on a bottom surface of platform 320. The brush 330 on the top surface of platform 320 is used to brush livestock 108 on rotary 105. Each stall on rotary 105 includes a nozzle that sprays upwards towards brush tool 310 when brush tool 310 is cleaning livestock 108. In this manner, the brush 330 on the bottom surface of platform 320 is cleaned while the brush 330 on the top surface of platform 320 brushes livestock 108. After the livestock 108 is finished being cleaned, one or more of brush tool 310, coupler 315, platform 320, and brush coupler 325 rotate to switch the positions of the two brushes. The brush 330 that was on the top surface of platform 320 is now on the bottom surface of platform 320, and the brush that was on the bottom surface of platform 320 is on the top surface of platform 320. Thus, robot 110 alternates between the two brushes 330 in cleaning livestock 108. This process reduces downtime between livestock 108 because one brush 330 can be cleaned while the other brush is cleaning a livestock 108.

In the previously described embodiment, the brush 330 on the bottom surface of platform 320 was cleaned by a spray from the rotary 105. In other embodiments, hood 335 is coupled to brush tool 310 such that hood 335 sprays upwards towards brush 330 on the bottom surface of platform 320. In this manner, hood 335 cleans brush 330 on the bottom surface of platform 320 while the brush 330 on the top surface of platform 320 brushes livestock 108. As such, hood 335 travels with brush tool 310.

In certain embodiments, brush tool member 305 is coupled to more than one brush tool 310. While the brushes on one brush tool 310 are being used to clean livestock 108, the brushes on other brush tools 310 are being cleaned. For example, brush tools 310 can be flipped back towards hood 335 to be cleaned and flipped forwards after being cleaned. In this manner, when one brush tool 310 is flipped forward and extended to clean livestock 108, another brush tool 310 is flipped backward so as to be under hood 335 for cleaning.

After livestock 108 has been brushed, the brushes 330 may accumulate dirt and/or debris. To remove the dirt and debris from brushes 330, robot 110 retracts extension member 245 and brush tool member 305 such that brushes 330 are positioned underneath nozzles 340 and hood 335. Hood 335 is coupled to a top surface of arm 230 such as, for example, housing 235. Nozzles 340 are positioned on an underside of hood 335.

Figure 3B:
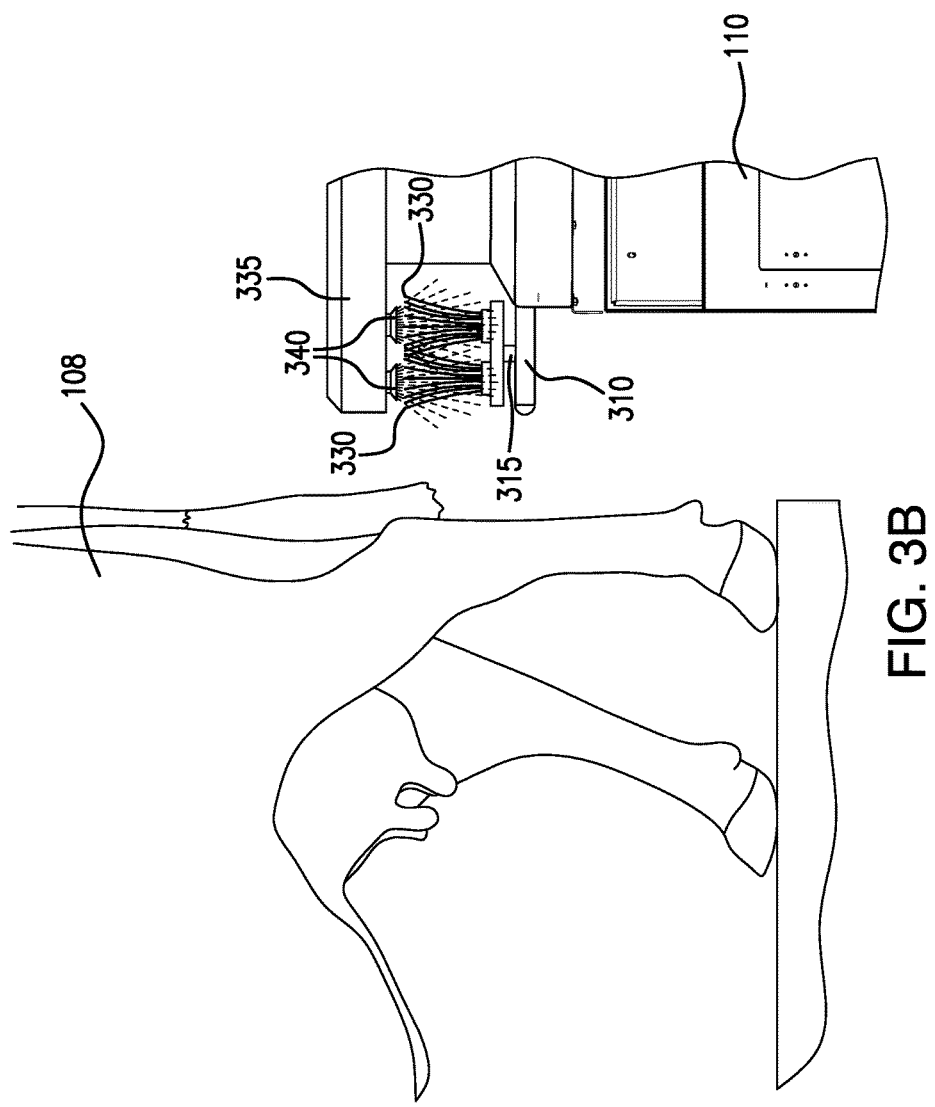

FIG. 3B shows robot 110 cleaning brushes 330. As seen in the example of FIG. 3B, robot 110 has retracted extension member 245 such that brushes 330 are located under nozzles 340. Nozzles 340 discharge a cleaning solution such as, for example, water and/or soap onto brushes 330. By spraying brushes 330 with the cleaning solution, dirt and debris are removed from brushes 330. After brushes 330 are cleaned, brushes 330 can be used again on another livestock 108 to clean the teats of the new livestock 108.

Figure 3C:
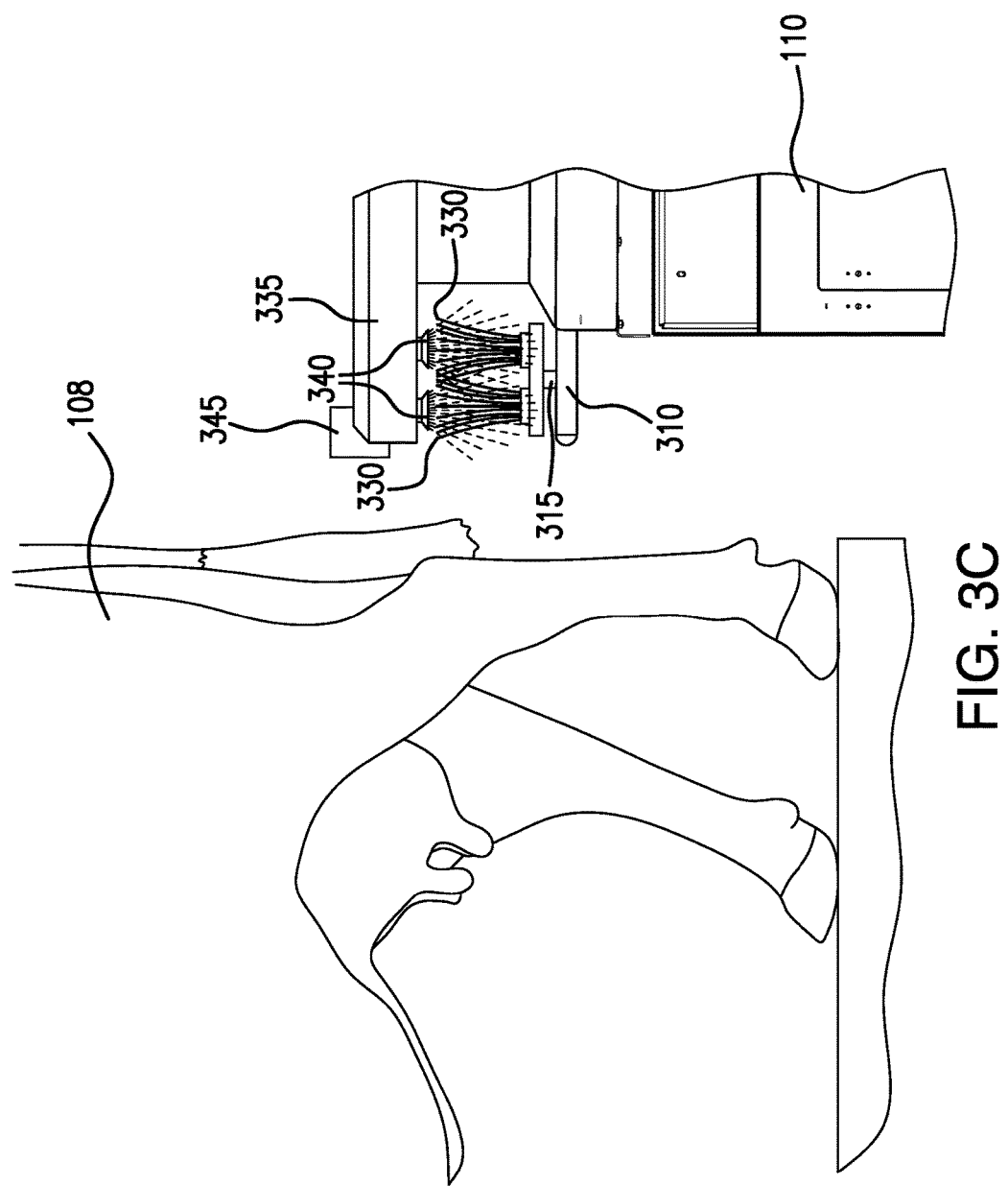

FIG. 3C illustrates an example embodiment of robot 110 that includes a camera 345 on hood 335. In these embodiments, camera 345 captures images of livestock 108 and communicates image signals to controller 115. Controller 115 uses these image signals to locate the teats of livestock 108. In some embodiments, camera 345 replaces camera 225 on the foundation of robot 110.

Figure 3D:
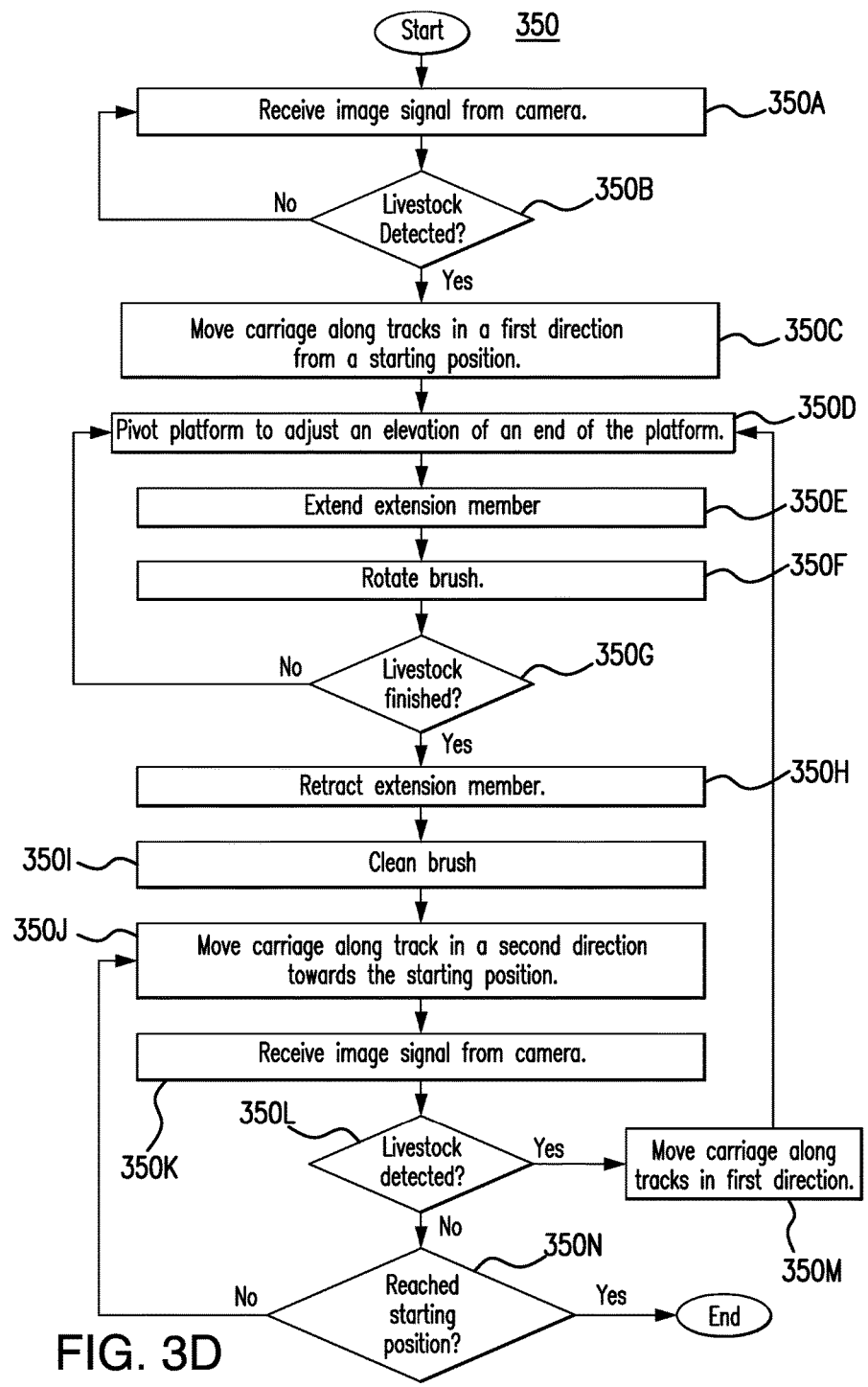
Figure 3E:
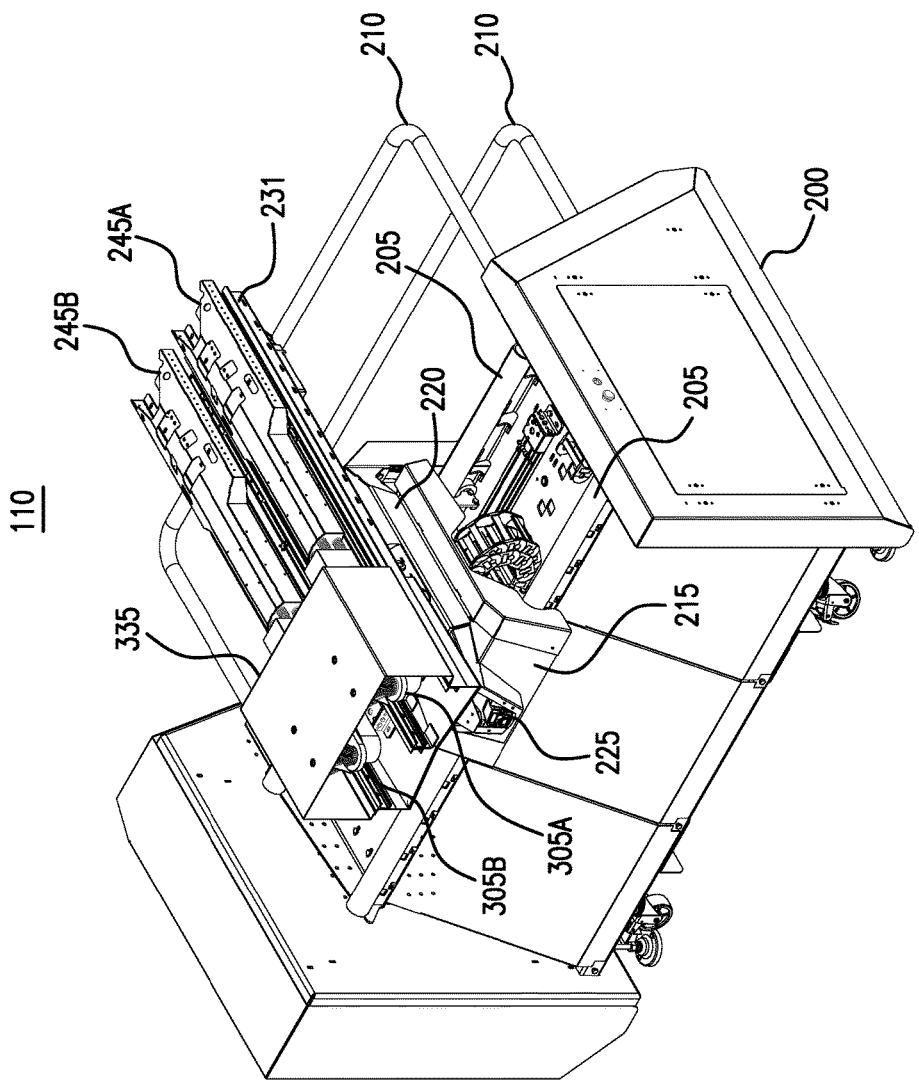

FIG. 3D illustrates a method 350 of operating robot 110. In particular embodiments, controller 115 performs method 350 to clean livestock 108 and to stimulate milk letdowns.

Controller 115 receives an image signal from a camera in step 350A. As discussed previously, the camera is mounted to a foundation of the robot or to hood 335. The camera is pointed forwards towards the livestock. The camera captures images (e.g., images of the livestock) and transmits an image signal representing those images to controller 115. In certain embodiments, by positioning the camera at the front surface of a foundation of the robot 110 or on top of hood 335, livestock are not able to kick and/or dislodge the camera. Additionally, it is more difficult for debris and/or dirt from the livestock to hit and dirty the camera.

After controller 115 receives the image signal from the camera, controller 115 processes the image signal to determine whether livestock is detected in step 350B. Controller 115 performs any suitable signal analysis and/or image analysis to locate the post of a stall on a rotary. Controller 115 uses those posts as boundaries between which the livestock should be located. Controller 115 then processes the portion of the image between the two posts to determine whether a livestock is present in the stall. If controller 115 determines that no livestock is present in the stall, controller 115 returns to step 350A to receive another image signal from the camera.

If controller 115 determines that a livestock is present in the stall, controller 115 then processes the image further to locate the two hind legs of the livestock. Generally, the teats of the livestock will be located between the two hind legs. After controller 115 locates the hind legs and the teats of the livestock, controller 115 can process the image further to determine a distance to the teats of the livestock. Controller 115 can determine the distance because in certain embodiments the camera that generated the image signal is a three-dimensional camera that sends length, width, and depth information to controller 115.

After controller 115 determines the location of the teats of a livestock in the rotary, controller 115 begins to move various components of the robot to position a brush tool near the teats of a livestock. Controller 115 begins by moving a carriage along tracks in a first direction from a starting position in step 350C. Controller 115 moves the carriage along the tracks at a speed that substantially matches the lateral speed of the livestock in the rotary. In this manner, the robot and/or the brush tool remain laterally aligned with a livestock as it rotates in the rotary. In some embodiments, the carriage is already moving when controller 115 determines the location of the teats of the livestock. In these instances, controller 115 adjusts the velocity of the carriage to align the carriage with the livestock in the rotary. Controller 115 then adjusts the velocity of the carriage to track the lateral movement of the livestock in the rotary.

As the carriage tracks the livestock in the rotary, controller 115 pivots a platform to adjust an elevation of an end of the platform, which adjusts an angle of approach to the livestock in step 350D. For example, if the teats of the livestock are higher than the brush tool, controller 115 pivots the platform upwards such that the brush tool approaches the livestock in an upward direction. In this manner, the brush tool will be elevated higher up near the teats of the livestock. As another example, if the teats of the livestock are lower than the robot and/or the brush tool, controller 115 pivots the platform downward such that the brush tool approaches the livestock at a downward angle. In this manner, the brush tool can be positioned beneath the teats of the livestock.

Controller 115 extends an extension member in step 350E. By extending the extension member, controller 115 moves the extension member, a brush tool member or spray tool member, and the brush tool towards the livestock in the rotary. Controller 115 can determine how far to extend the extension member and the brush tool member or brush tool member by determining the distance to the teats of the livestock. Controller 115 can extend the extension member and the spray tool member or brush tool member to position the brush tool beneath the teats of the livestock. From that position, the brush tool can rotate to clean the teats of the livestock. When the brush tool is in the proper position, controller 115 rotates the brush tool to clean the teats of the livestock in step 350F.

In step 350G, controller 415 determines whether it has finished cleaning the livestock. Livestock may not be finished being cleaned if there are more teats that should be brushed. If the robot has not finished cleaning the livestock, controller 115 can return to step 350D to reposition the brush tool near another teat of the livestock. For example, controller 115 can further pivot the platform or extend the extension member and brush tool member or spray tool member even further to brush another teat of the livestock.

When controller 115 determines that the teats of the livestock have been cleaned, controller 115 continues to step 350H to retract the extension member. Controller 115 retracts the extension member by moving the extension member in a direction opposite the direction that the extension member moved when it was being extended in step 350D. By retracting the extension member, the extension member, spray tool member or brush tool member, and the brush tool are moved back towards the robot.

Controller 115 then continues to a portion of the process where controller 115 moves certain components of the robot back to a starting position. In step 350J, controller 115 moves the carriage along the tracks in a second direction towards the starting position. The second direction is opposite the first direction of the carriage in step 350C. As the carriage moves back to the starting position, if controller 115 detects another livestock, controller 115 can begin the cleaning process for the newly detected livestock before the carriage returns to the starting position. For example, in step 350K, controller 115 receives an image signal from the camera as the carriage is moving in the second direction. Controller 115 processes the image signal and determines whether another livestock is detected in step 350L. If another livestock is detected, controller 115 proceeds to step 350M to move the carriage along the tracks back into first direction. Essentially, controller 115 reverses the movement of the carriage to begin tracking the newly detected livestock. When the carriage is aligned with the livestock and is tracking the lateral movement of the livestock in the rotary, controller 115 proceeds to step 350D to again pivot the platform and extend the extension member and the brush tool member to position the brush tool between the hind legs of the newly detected livestock. The brush tool can then be rotated to clean the teats of the newly detected livestock.

If no new livestock is detected before the carriage reaches the starting position, then controller 115 can conclude method 350. In step 350L, controller 115 determines whether the carriage has reached the starting position. If the carriage has not reached the starting position, controller 115 returns to step 350J and continues moving the carriage in the second direction towards the starting position if the carriage has reached the starting position, controller 115 and method 350.

In certain embodiments, by brushing the teats of the livestock using robot 110, dirt and debris are removed from the teats of the livestock, thus reducing the possibility of disease and infection. Additionally, brushing the teats of the livestock stimulates milk letdowns, which increases the rate at which milk is pumped from the cow.

B. Doubled-Armed Brush

FIGS. 3E through 3S show embodiments of robot 110 with a double-armed brush. Generally, the differences between the embodiments of FIGS. 3E through 3S and the embodiments of FIGS. 3A through 3D are that (1) robot 110 includes an additional arm used to clean the livestock and (2) robot 110 alternates between the two arms such that one arm's brushes can be cleaned under the hood while the other arm is extended to clean a livestock. Otherwise, the structure and operation of robot 110 generally remains the same as the embodiments shown in FIGS. 3A through 3D. When a component of the double-armed brush robot (e.g., base 200, carriage 215, foundation 225, etc.) is generally the same in the embodiments of FIGS. 2A-2AI, then discussion of those components may be found in the discussion for FIGS. 2A-2AI.

FIG. 3E shows an embodiment of robot 110 with a double-armed brush. As shown in FIG. 3E, the structures of robot 110 remain the same as robot 110 shown in FIGS. 2A through 2AI with the exception of platform 231, the double arm, and the brush tool members. For example, robot 110 includes a base 200. Gates 210 are coupled to base 200 and extend beyond a back surface of robot 110. Carriage 215 is coupled to tracks 205 such that carriage 215 can move laterally on tracks 205 across base 200. Foundation 220 is coupled to a top surface of carriage 215. In some embodiments, foundation 220 can swivel and/or rotate relative to carriage 215 to accommodate rotaries that have slanted stalls. Platform 231 is coupled to foundation 220. Platform 231 can pivot about pivot couplers to adjust an elevation of an end of platform 231. In some embodiments, platform 231 is able to rotate and/or swivel relative to foundation 220 to convert robot 110 into a storage mode.

As shown in FIG. 3E, platform 231 is sufficiently wide to accommodate two arms. For example, platform 231 can accommodate a first extension member 245A and a second extension member 245B. Extension members 245A and 245B are positioned parallel to each other across the width of platform 231. Each of extension members 245A and 245B are coupled to a brush tool 310. Extension member 245A is coupled to brush tool 310A at a front surface of extension member 245A. Extension member 245B is coupled to brush tool 310B at a front surface of extension member 245B.

Robot 110 extends an extension member 245 to position a brush tool 310 near the teats of livestock 108. Brush tool 310 then brushes and/or cleans the teats of livestock 108. In certain embodiments, robot 110 alternates which arm is used to brush livestock 108. For example, robot 110 uses extension member 245A and brush tool 310A to clean a first livestock 108. Then, robot 110 uses extension member 245B and brush tool 310B to clean a second livestock 108. While extension member 245A and brush tool 310A are cleaning livestock 108, robot 110 can clean brush tool 310B. Alternatively, when extension member 245B and brush tool 310B are cleaning livestock 108, robot 110 can clean brush tool 310A. In this manner, robot 110 is able to reduce downtime between brushing of livestock 108 because livestock 108 does not need to wait in rotary 105 while brush tool 310 is being cleaned. Instead, another brush tool 310 is available to clean livestock 108.

Robot 110 includes a hood 335 coupled to platform 231. Hood 335 extends upwards from platform 231 and then across platform 231. Hood 335 provides a space underneath hood 335 where brush tools 310 can be cleaned. In this manner, hood 335 is positioned such that it covers brush tool 310A and brush tool 310B. Hood 335 includes nozzles and/or sprayers that clean and/or disinfect brush tools 310A and 310B by spraying a solution (e.g., water, soap, disinfectant, etc.) onto brush tools 310A and 310B. By including hood 335, robot 110 allows for one, stationary structure to clean both sets of brushes.

Figure 3F:
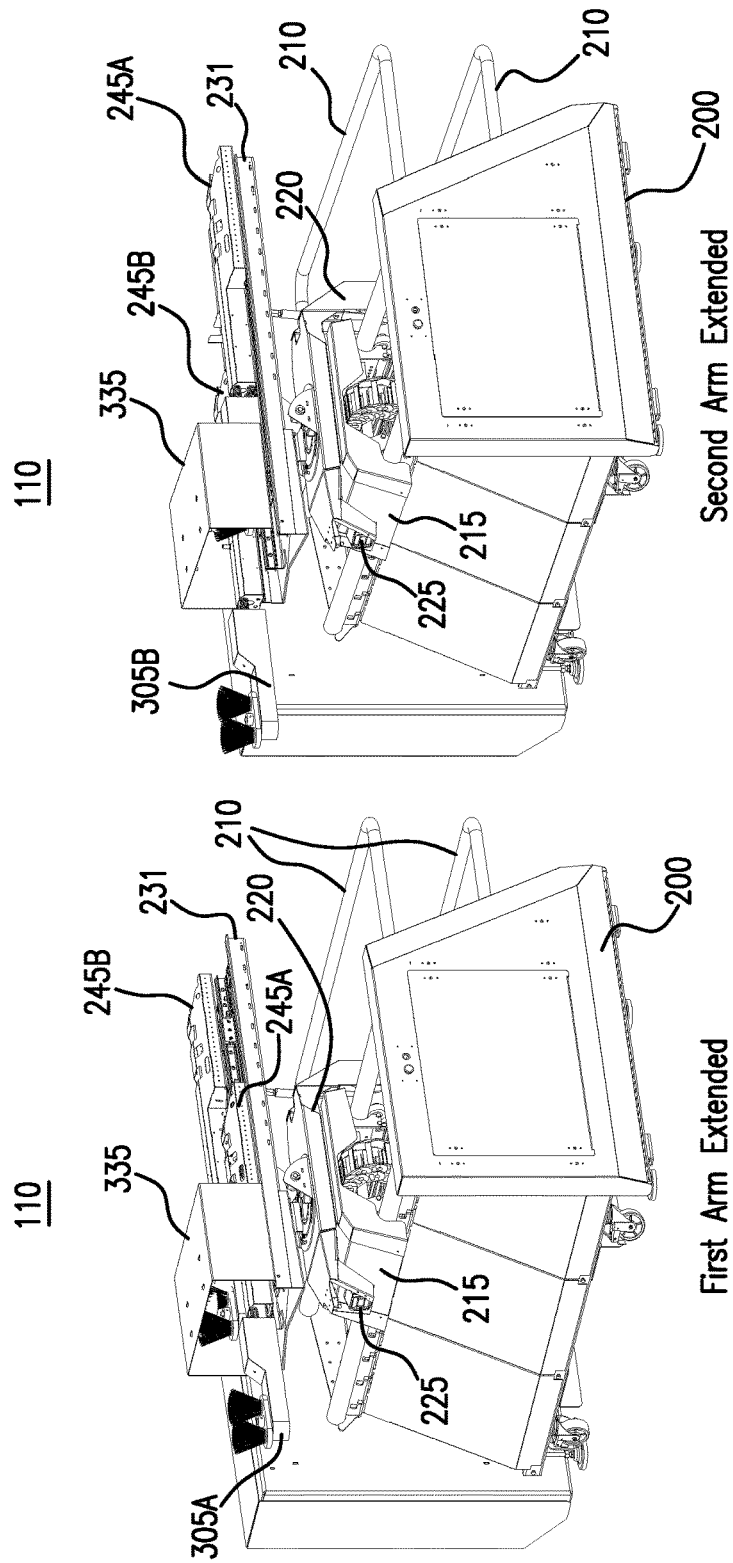

FIG. 3F shows the alternative extensions of the arms of robot 110. As described above, robot 110 alternates which arm is extended and/or used to clean livestock 108 to reduce downtime between brushings of livestock 108. When one arm is extended and cleaning livestock 108, the other arm is retracted and being cleaned. When another livestock 108 approaches robot 110, the freshly cleaned arm is extended and used to clean the new livestock 108. Meanwhile, the first arm and/or brush are cleaned under hood 335. As seen in the figure on the left, the first arm of robot 110 is extended and the second arm is being cleaned. Extension member 245A and brush tool 310A are extended into a brushing position. Meanwhile, extension member 245B and brush tool 310B are retracted and being cleaned under hood 335. As seen in the figure on the right, the second arm of robot 110 is extended in the cleaning position and the first arm is retracted and being cleaned. Extension member 245A and brush tool 310A are retracted and being cleaned under hood 335. Meanwhile, extension member 245B and brush tool 310B are extended to clean livestock 108. As discussed previously, by alternating which arm is used to clean livestock 108, robot 110 reduces the downtime between brushings of livestock 108.

Figure 3G:
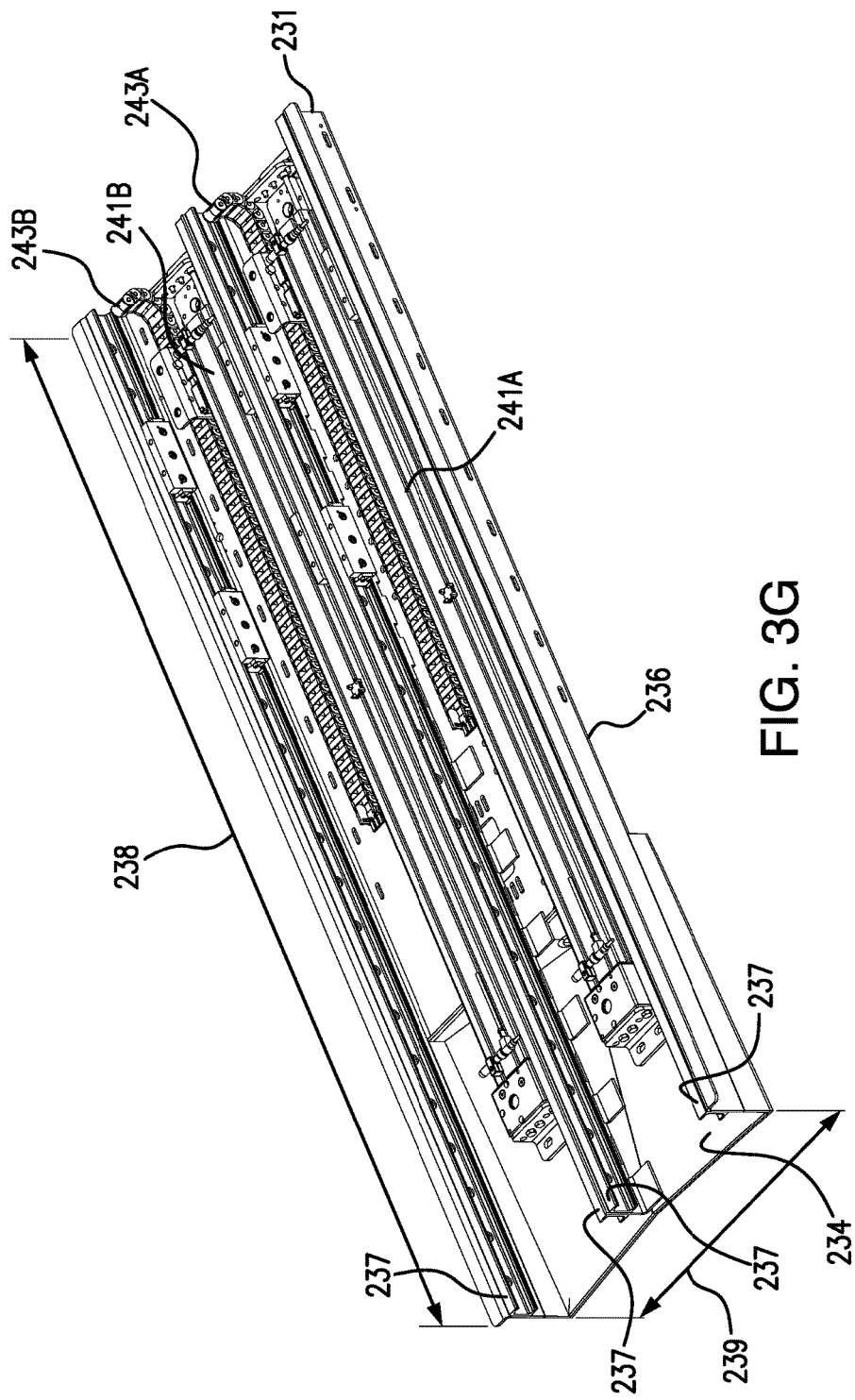

FIG. 3G shows the platform 231 of robot 110. As explained previously, platform 231 is expanded to accommodate two arms. As seen in FIG. 3G, platform 231 has a length 238 in a lengthwise direction and a width 239 that is orthogonal to the length 238. Length 238 is greater than width 239, but width 239 has been expanded such that platform 231 can accommodate two arms. In some embodiments, width 239 is at least doubled from the embodiments of FIGS. 2A through 2AI such that platform 231 can accommodate two arms. Platform 231 includes a top surface 234 and a bottom surface 236. The top surface 234 and the bottom surface 236 are opposing surfaces. Top surface 234 faces the arms and hood 335 of robot 110. Bottom surface 236 faces foundation 220, carriage 215 and base 200 of robot 110.

As seen in FIG. 3G, two linear actuators 241 are coupled to the top surface 234 of platform 231. Linear actuator 241A and linear actuator 241B are arranged parallel to each other. Linear actuator 241A is configured to couple to extension member 245A. Linear actuator 241B is configured to couple to extension member 245B. Each linear actuator 241 can push and/or pull the extension member coupled to the linear actuator 241 such that the extension member 245 moves in the lengthwise direction. When linear actuator 241 pushes extension member 245, a brush tool 310 coupled to the extension member 245 is extended towards livestock 108.

Additionally, belt couplers 243A and 243B are coupled to the top surface 234 of platform 231. Like the embodiments of FIGS. 2A-2AI, each belt coupler 243 is positioned adjacent to a linear actuator 241. Each belt coupler 243 is configured to engage a belt that guides an extension member 245 as it is pushed and/or pulled by linear actuator 241. In this manner, belt coupler 243 prevents the belt from becoming loose or tangled while extension member 245 is being moved by the linear actuator 241.

As shown in FIG. 3G, guiderails 237 are coupled to platform 231. Because platform 231 accommodates two separate arms, a separate set of guiderails 237 are coupled to platform 231. A first set of guiderails 237 are coupled to platform 231 such that the two guiderails 237 are on opposite sides of linear actuator 241A. Similar to the guiderails 237 of FIGS. 2A through 2AI, the first set of guiderails 237 guide extension member 245A as it is pushed and/or pulled by linear actuator 241A. Also as seen in FIG. 3G, a second set of guiderails 237 is coupled to platform 231 such that the two guiderails 237 are on opposite sides of linear actuator 241B. Similar to the guiderails 237 of FIGS. 2A through 2AI, the second set of guiderails 237 guide extension member 245B as it is pushed and/or pulled by linear actuator 241B. In this manner, guiderails 237 prevent extension members 245 from falling off platform 231 and/or veering off course when pushed and/or pulled by linear actuators 241.

Figure 3H:
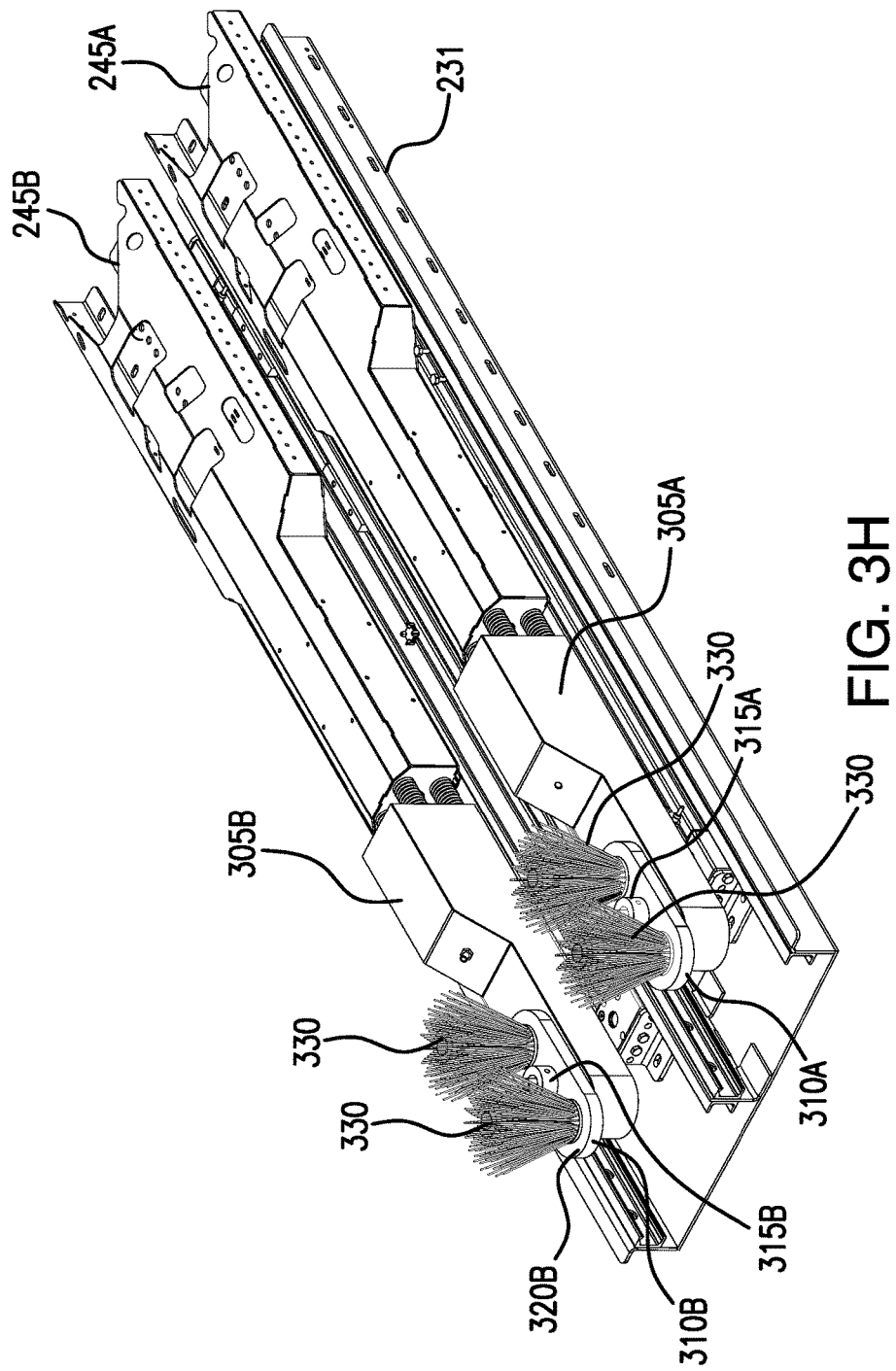

FIG. 3H illustrates the extension members 245 coupled to platform 231. As seen in FIG. 3H, extension member 245A and extension member 245B are coupled to platform 231 along the top surface 234 of platform 231. Linear actuators 241A and 241B are coupled to extension members 245A and 245B such that linear actuators 241A and 241B can push and/or pull extension members 245A and extension members 245B in the lengthwise direction.

Brush tool members 305A and 305B are coupled to extension members 245A and 245B, respectively. As seen in FIG. 3H, brush tool member 305A is coupled to a front surface of extension member 245A. Brush tool member 305B is coupled to a front surface of extension member 245B. Each brush tool member 305 includes a brush tool 310. When extension member 245A is extended by linear actuator 241A, brush tool member 305A is extended towards livestock 108. When extension member 245B is extended by linear actuator 241B, brush tool member 305B is extended towards livestock 108. In the example of FIG. 3H, robot 110 includes two couplers 315, two platforms 320, and four brushes 330.

Each brush tool member 305 includes a brush tool 310. Brush tool member 305A includes brush tool 310A. Brush tool member 305B includes brush tool 310B. Each brush tool 310 includes a coupler 315, a platform 320, and one or more brushes 330. Coupler 315 couples platform 320 to brush tool member 305. One or more brushes 330 are coupled to platform 320. In operation, one or more of platform 320 and/or brushes 330 rotate to clean the teats of livestock 108. In some embodiments, brush tool 310 has a profile that is eight inches high.

Figure 3I:
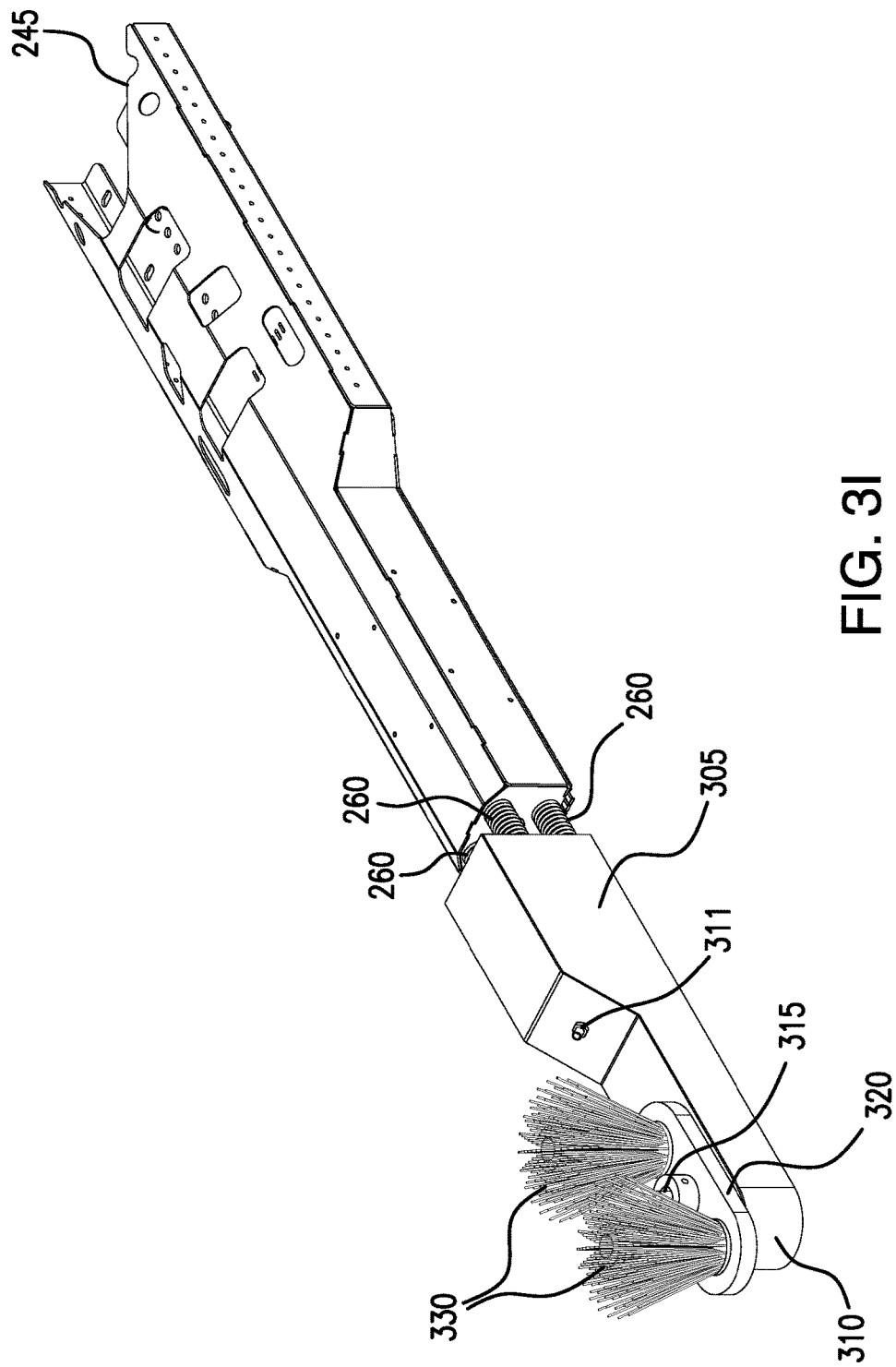

FIG. 3I illustrates an extension member 245 and a brush tool member 305 of robot 110. As seen in FIG. 3I, brush tool member 305 is coupled to extension member 245 by one or more flex couplers 260. As described previously, flex couplers 260 allow brush tool member 305 to flex about flex couplers 260 when brush tool member 305 is kicked or pushed by livestock 108. In this manner, brush tool member 305 is prevented from snapping and/or breaking off from extension member 245 when kicked, in certain embodiments.

Brush tool member 305 includes a nozzle 311 directed towards brushes 330. In certain embodiments, nozzle 311 discharges a solution onto brushes 330 when brushes 330 are cleaning livestock 108. In some embodiments, nozzle 311 discharges a solution onto brushes 330 when brushes 330 are being cleaned under hood 335. These solutions discharged by nozzle 311 include water and/or disinfectant solution.

As seen in FIG. 3I, coupler 315 couples platform 320 and brushes 330 to brush tool member 305. Coupler 315 rotates to rotate platform 320 and brushes 330 relative to brush tool member 305 in certain embodiments. In some embodiments, platform 320 rotates about coupler 315 to rotate brushes 330. Additionally, in certain embodiments, brushes 330 rotate on platform 320. By rotating one or more of coupler 315, platform 320, and brushes 330, the surface of the teats of livestock 108 can be cleaned.

Figure 3J:
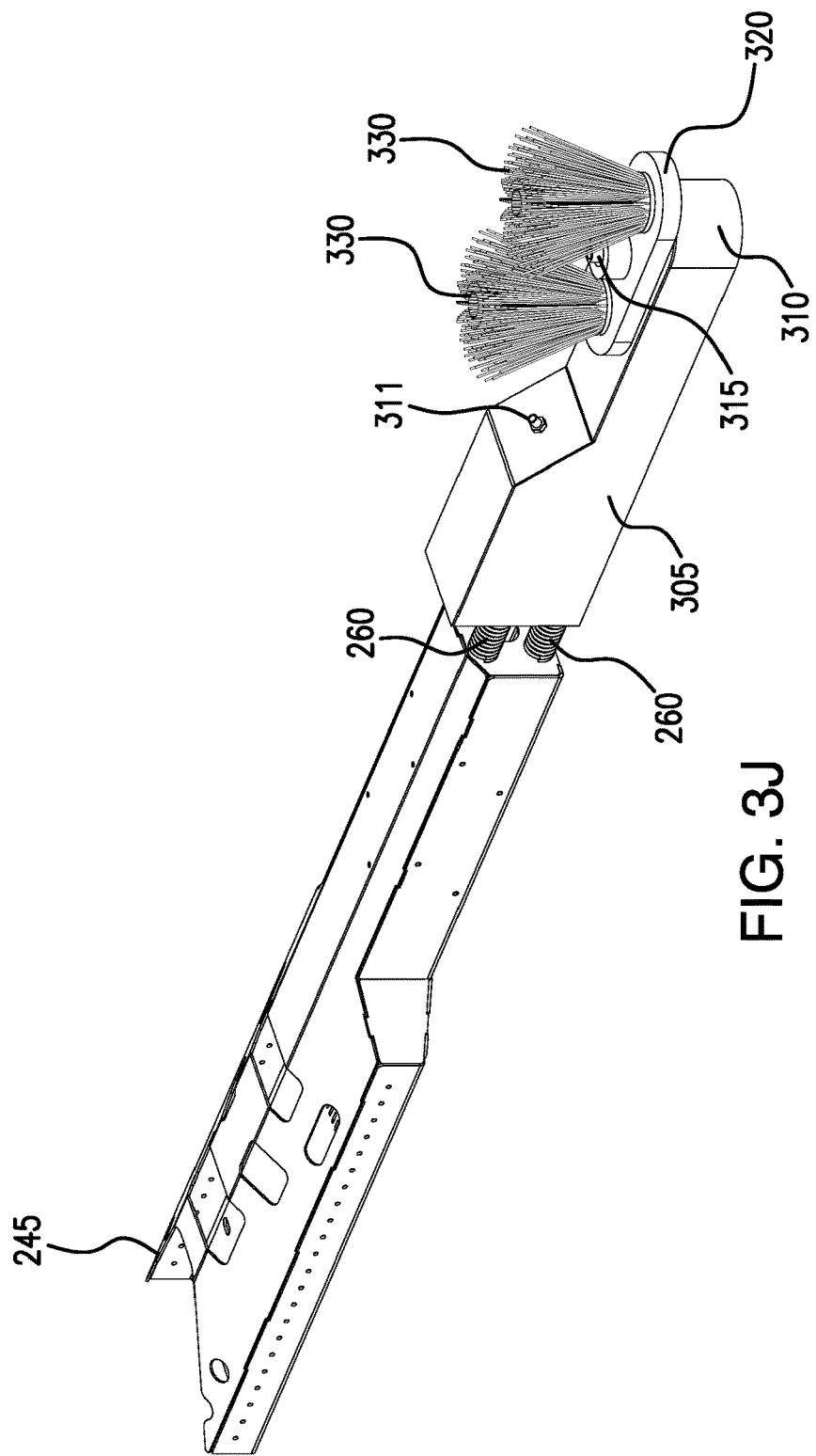

FIG. 3J illustrates another perspective of extension member 245 and brush tool member 305. As seen in FIG. 3J, brush tool member 305 couples to extension member 245 by one or more flex couplers 260. Additionally, brush tool 310 is positioned at a front end of brush tool member 305. One or more of coupler 315, platform 320, and brushes 330 are rotated to clean the surface of the teats of livestock 108.

Figure 3K:
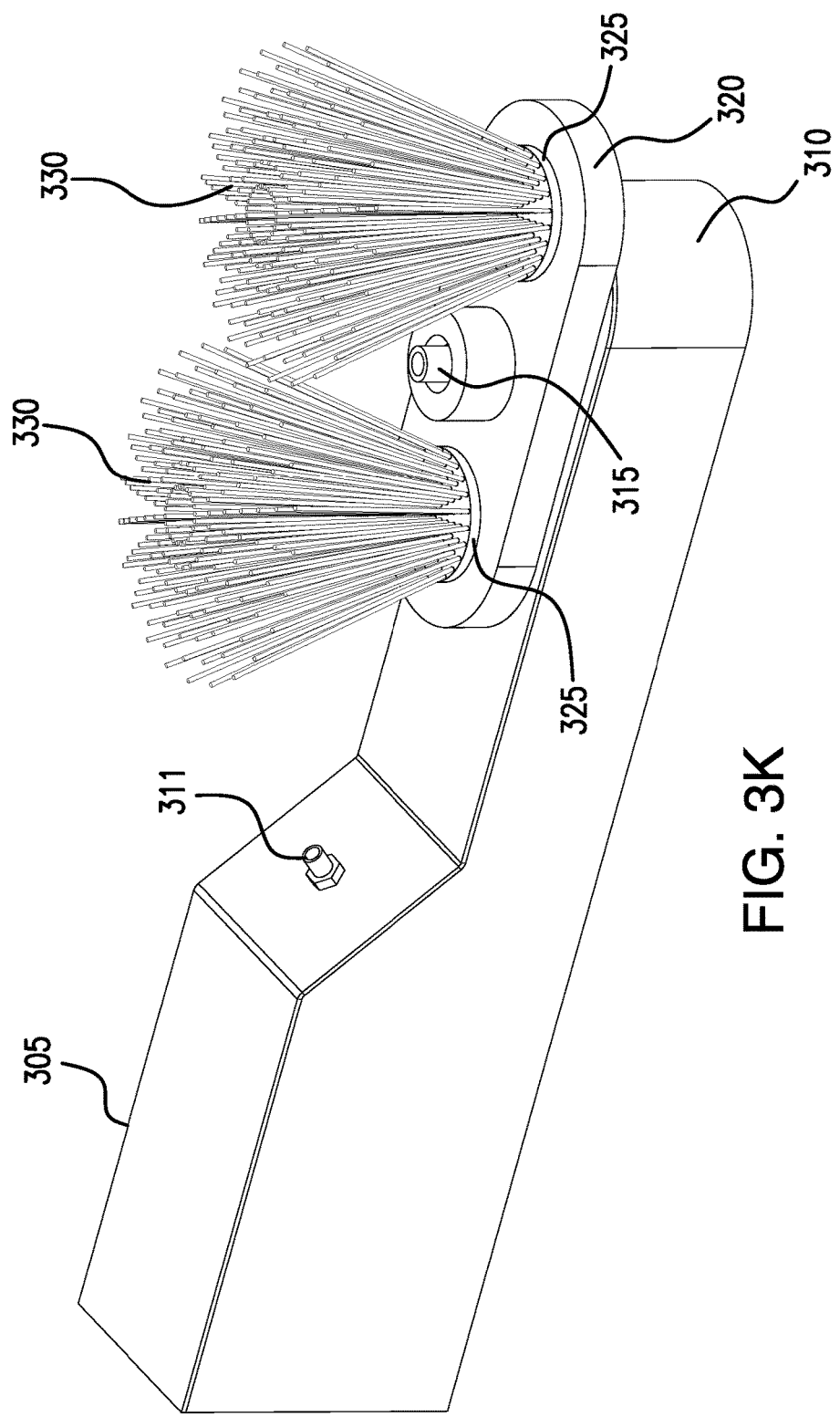

FIG. 3K illustrates brush tool member 305. As seen in FIG. 3K, brush tool member 305 includes a brush tool 310 and a nozzle 311. Brush tool 310 is positioned in front of nozzle 311. Nozzle 311 is directed towards brushes 330 of brush tool 310. Coupler 315 couples platform 320 to brush tool member 305. Coupler 315 is coupled to platform 320 along the midline of platform 320. In certain embodiments, coupler 315 includes a rod that extends through platform 320.

Brushes 330 are coupled to platform 320 by brush couplers 325. Brush couplers 325 and brushes 330 are positioned on a top surface of platform 320 on either side of coupler 315. In some embodiments, brush couplers 325 rotate upon platform 320 to rotate the brushes 330 coupled to the brush couplers 325. By rotating brushes 330, the surface of the teats of livestock 108 are cleaned. In some embodiments, coupler 315 and/or platform 320 rotate to rotate brushes 330 relative to brush tool member 305 and/or about coupler 315. In that manner, brushes 330 clean the surface of the teats and livestock 108. When one or more of coupler 315, platform 320, and brushes 330 are being rotated to clean livestock 108, nozzle 311 can discharge a solution towards brushes 330 that aid in cleaning livestock 108. FIG. 3L illustrates a second perspective of brush tool member 305. As seen in FIG. 3L, brush tool member 305 includes a brush tool 310 and a nozzle 311. Nozzle 311 discharges a solution towards brush tool 310 when cleaning livestock 108 and/or when brushes 330 are being cleaned. One or more of coupler 315, platform 320, brush couplers 325, and/or brushes 330 are rotated to clean the surface of the teats of livestock 108.

Figure 3M:
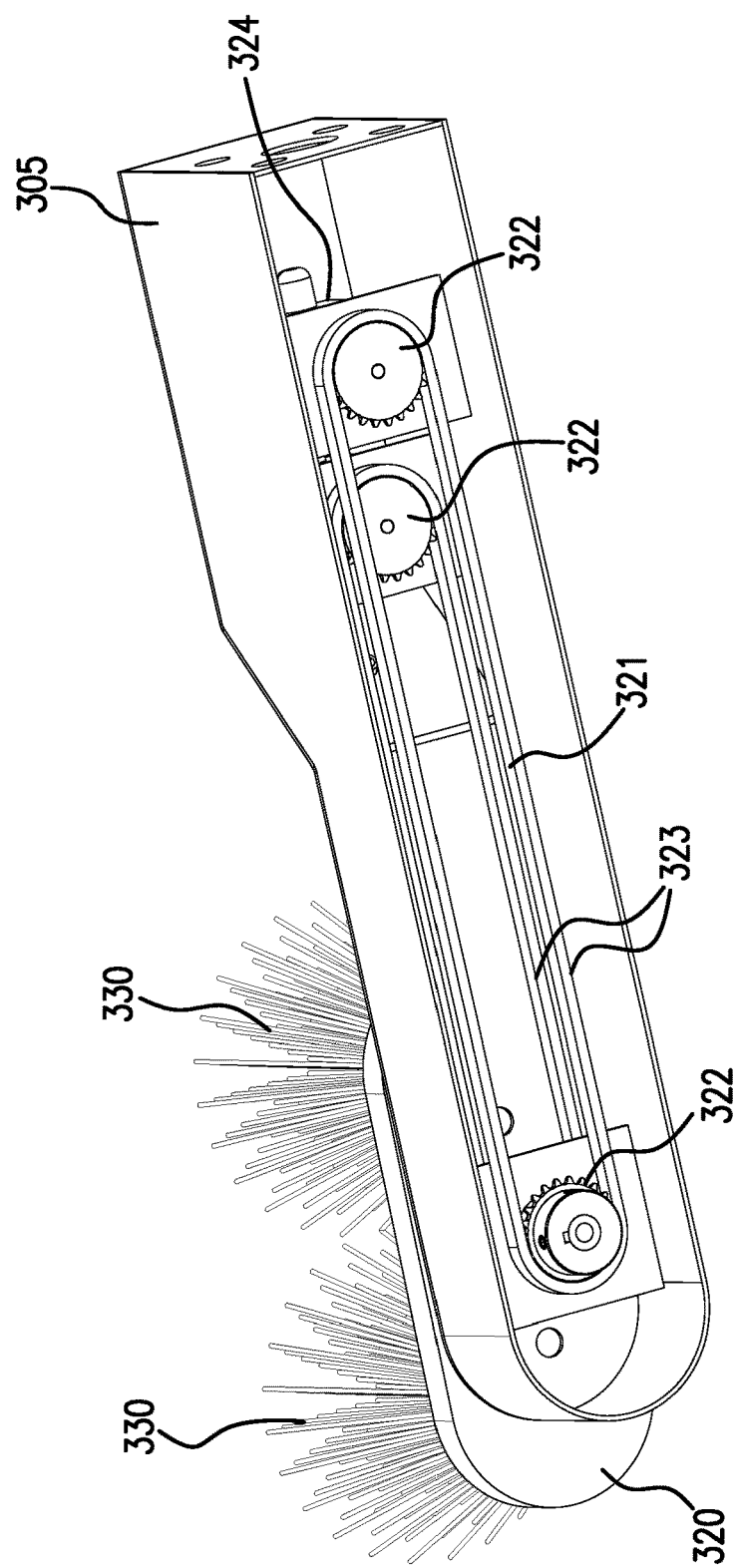

FIG. 3M illustrates the underside of brush tool member 305. As seen in FIG. 3M, brush tool member 305 includes a gear and band system 321 that rotates one or more of coupler 315, platform 320, and/or brushes 330. Gear and band system 321 includes one or more gears 322 coupled to a motor 324. In the example of FIG. 3M, two gears 322 are coupled to motor 324 near the back surface of brush tool member 305. Each of these gears 322 is coupled by a band 323 to a gear 322 near the front surface of brush tool member 305. When motor 324 rotates the two gears 322 near the back of brush tool member 305, those gears 322 rotate to cycle bands 323. When bands 323 are cycled, gear 322 at the front of brush tool member 305 is rotated. Rotation of the gear 322 at the front surface of brush tool member 305 causes one or more of coupler 315, platform 320, and/or brushes 330 to rotate to clean the surface of the teats of livestock 105.

FIG. 3N illustrates the hood 335 of robot 110. As shown in FIG. 3N, hood 335 is coupled to platform 231 such that hood 335 extends upward from platform 231 and then across platform 231. Each of brush tool member 305A and 305B fit underneath hood 335.

Hood 335 includes one or more nozzles 340 that discharge a solution onto brush tools 305A and 305B. By spraying brush tools 305A and 305B with a solution through nozzles 340, brush tools 305A and 305B are cleaned. In certain embodiments, brush tools 305A and 305B are cleaned after they are used to clean livestock 108. Nozzles 340 spray brushes tools 305A and 305B to remove dirt and debris from brush tools 305A and 305B and to disinfect brush tools 305A and 305B. In some embodiments, nozzles 311A and 311B also discharge a solution onto brush tools 305A and 305B to clean and/or disinfect brush tools 305A and 305B. In the example of FIG. 3N, hood 335 includes four nozzles 340, one for each brush 330 of brush tools 305A and 305B. Each nozzle is positioned above a brush 330, when the brush 330 is positioned beneath the hood 335.

In certain embodiments, a brush tool member 305 can be decoupled from extension member 245 and flex couplers 2260 and can be replaced by a spray tool member described using FIGS. 2A through 2AI. In this manner, a brush robot can be converted into a spray robot.

Figure 3O:
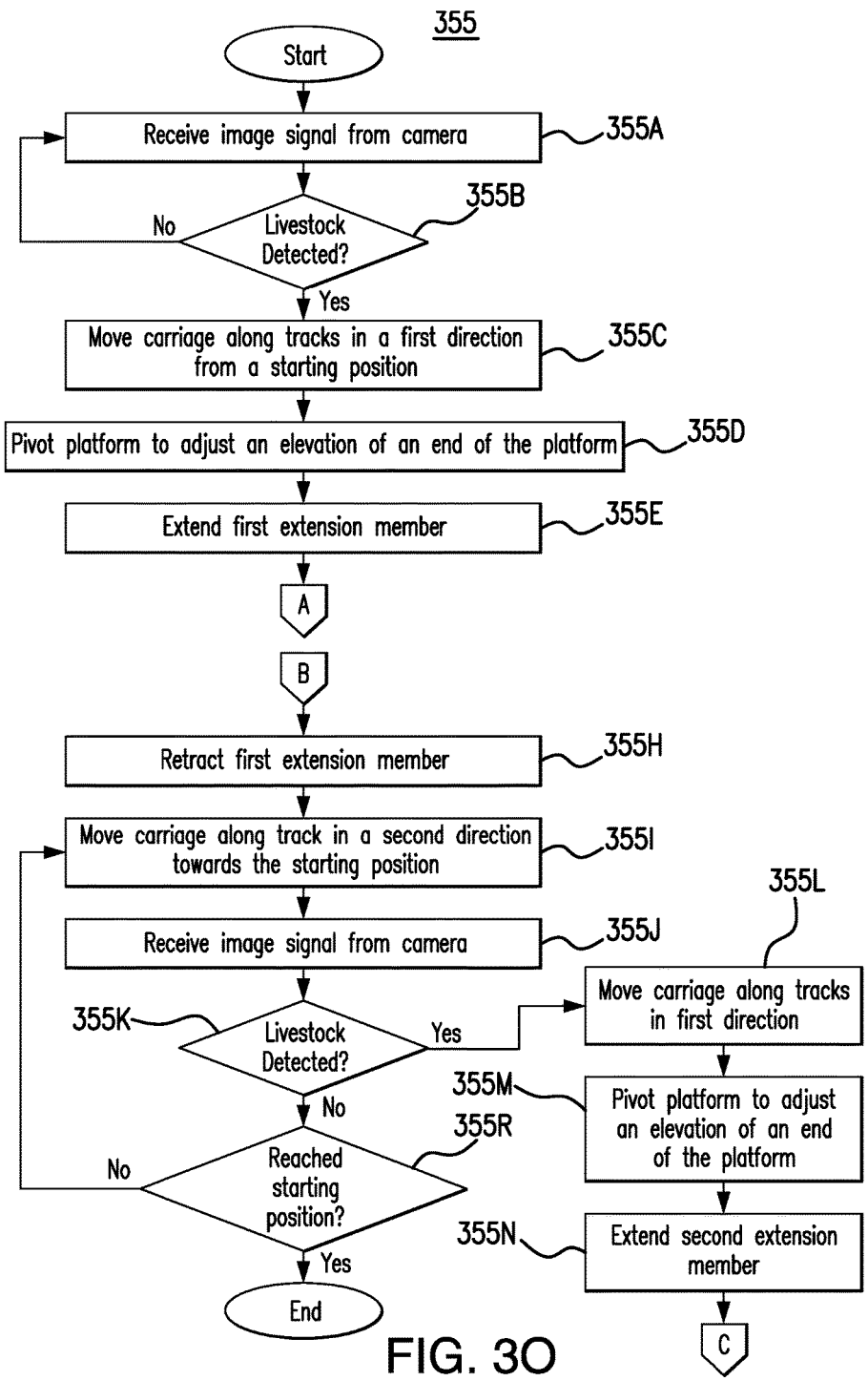
Figure 3P:
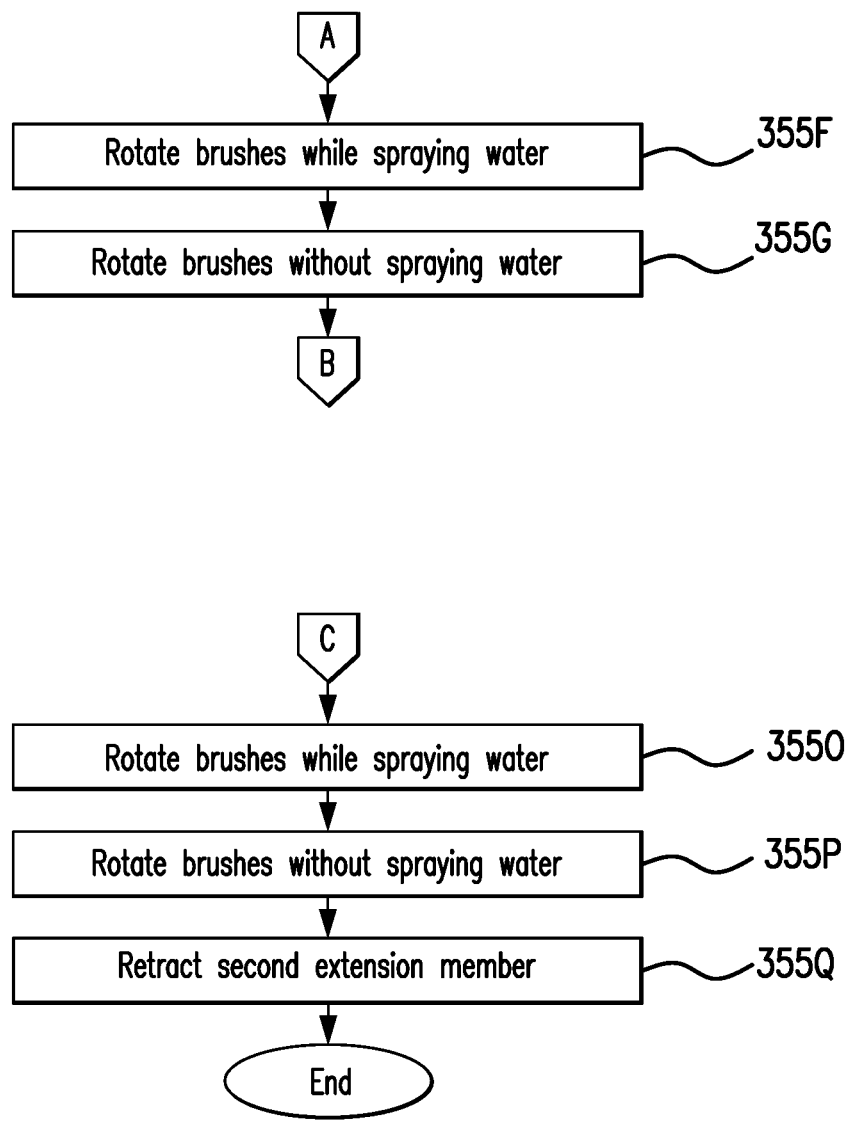

FIGS. 3O and 3P illustrate a method 355 of operating the robot 110 of FIGS. 3E through 3N. In certain embodiments, controller 115 performs method 355. By performing method 355, robot 110 cleans the surface of the teats of livestock 108 and stimulates a milk letdown in livestock 108. Several steps of method 355 are the same as certain steps in method 400 of FIG. 4 used to control the robot 110 of FIGS. 2A through 2AI. Further details concerning those steps may be found in the discussion of FIG. 4.

Controller 115 begins by receiving an image signal from a camera in step 355A. The image signal may represent a livestock. In step 355B, controller 115 determines from the image signal whether a livestock is detected. If a livestock is detected, controller 115 proceeds to clean the livestock. If a livestock is not detected, then controller 115 returns to step 355A to await another image signal from the camera.

If livestock is detected, controller 115 begins moving a carriage along tracks in a first direction from a starting position in step 355C. By moving the carriage along the tracks, the carriage is moved laterally across robot 110 such that the carriage tracks the lateral movement of the livestock in the rotary. Controller 115 then pivots a platform to adjust an elevation of an end of the platform in step 355D. By pivoting the platform, an angle of approach towards the livestock is adjusted. For example, if the livestock is higher than robot 110, then the platform is pivoted upwards. If the livestock is lower than robot 110, the platform is pivoted downwards. After the carriage is tracking the lateral movement of the livestock in the rotary and the platform is properly pivoted, controller 115 extends a first extension member in step 355E. By extending the first extension member towards the livestock, a brush tool is moved closer to the livestock.

After the brush tool is positioned near the teats of the livestock, controller 115 proceeds into a brushing routine. In step 355F, controller 115 rotates brushes of the brush tool while spraying water. The brushes are rotated over the surface of the teats of the livestock while water is sprayed at the brushes and at the teats of the livestock. As a result, dirty and debris are removed and/or dissolved from the teats of the livestock. In certain embodiments, a nozzle 311 near the brushes sprays the brushes and the teats with water while the brushes rotate.

In step 355G, controller 115 rotates the brushes without spraying water. In this step, the brushes are rotated over the surface of the teats of the livestock without discharging water at the brushes or at the livestock. In this manner, dirt, debris, and water are removed from the teats of the livestock. In certain embodiments, the period of time that brushes are rotated in steps 355F and 355G are controlled and/or adjusted by a user of robot 110. The time that the brushes are rotated can be adjusted separately for each step to accommodate particular types of livestock. After the brushing routine is complete, controller 115 proceeds with method 355.

In step 355H, controller 115 retracts the first extension member. By retracting the first extension member, the first extension member is brought back towards the robot and away from the livestock. In step 355I, controller 115 moves the carriage along the track in a second direction towards the starting position. In other words, the carriage begins moving back towards the starting position. As the carriage moves back towards the starting position, controller 115 receives an image signal from the camera in step 355J. The image signal may represent a new livestock in the rotary that has rotated near the robot.

In step 355K, controller 115 determines from the image signal whether a new livestock is detected. If the new livestock is detected, controller 115 begins tracking the livestock and proceeding to clean the livestock. In step 355L, controller 115 moves the carriage along the tracks in the first direction. In other words, controller 115 reverses the direction of the carriage such that the carriage tracks the lateral movement of the new livestock in the rotary. Controller 115 then pivots the platform in step 355M to adjust an elevation of an end of the platform. By pivoting the platform, controller 115 adjusts the angle of approach towards the new livestock. In step 355N, controller 115 extends a second extension member towards the livestock. The second extension member includes a second brush tool that can be used to clean the new livestock. Controller 115 then proceeds to a brushing routine using the second extension member.

In step 355O, controller 115 rotates the brushes while spraying water. The brushes are coupled to the second extension member and the water is discharged by a nozzle near the brushes and directed towards the brushes. In step 355P, controller 115 rotates the brushes without spraying water. Similar to steps 355F and 355G involving the first extension member, steps 355O and 355P are performed to clean the surface of the teats of the livestock. The time for which the brushes are rotated can be controlled and/or adjusted depending on the livestock. In certain embodiments, steps 355O and 355P are identical to steps 355F and 355G except steps 355O and 355P involve brushes on a second extension member and not on a first extension member. After the brushing routine is completed, controller 115 retracts the second extension member in step 355Q.

In step 355K, if livestock is not detected, controller 115 then proceeds to step 355R to determine whether the carriage has reached the starting position. If the carriage has reached the starting position, then method 355 concludes. If the carriage has not reached the starting position, then controller 115 continues moving the carriage in the second direction towards the starting position in step 355I. In particular embodiments, by performing method 355, controller 115 cleans the surface of the teats of the livestock and stimulates a milk letdown in the livestock.

Figure 3Q:
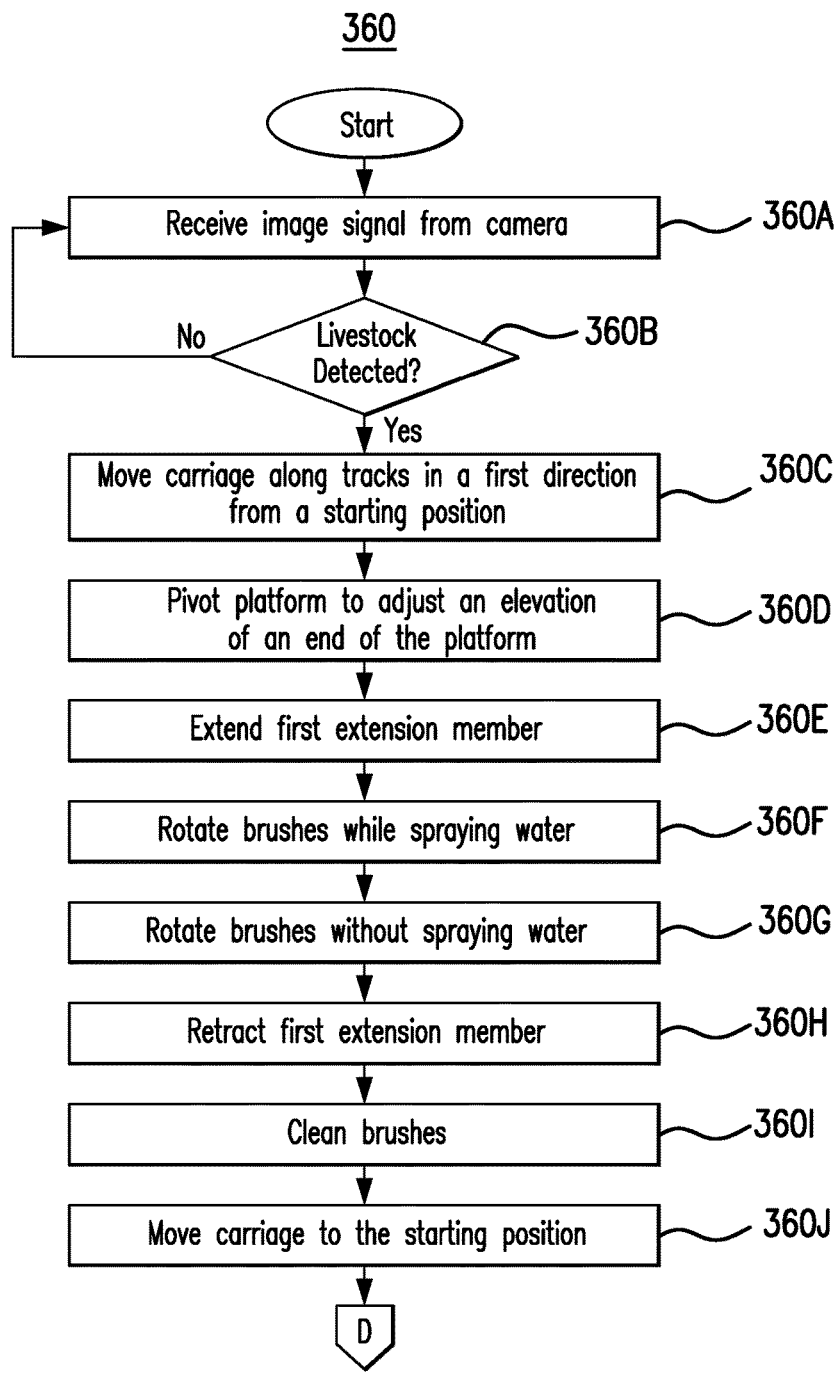
Figure 3R:
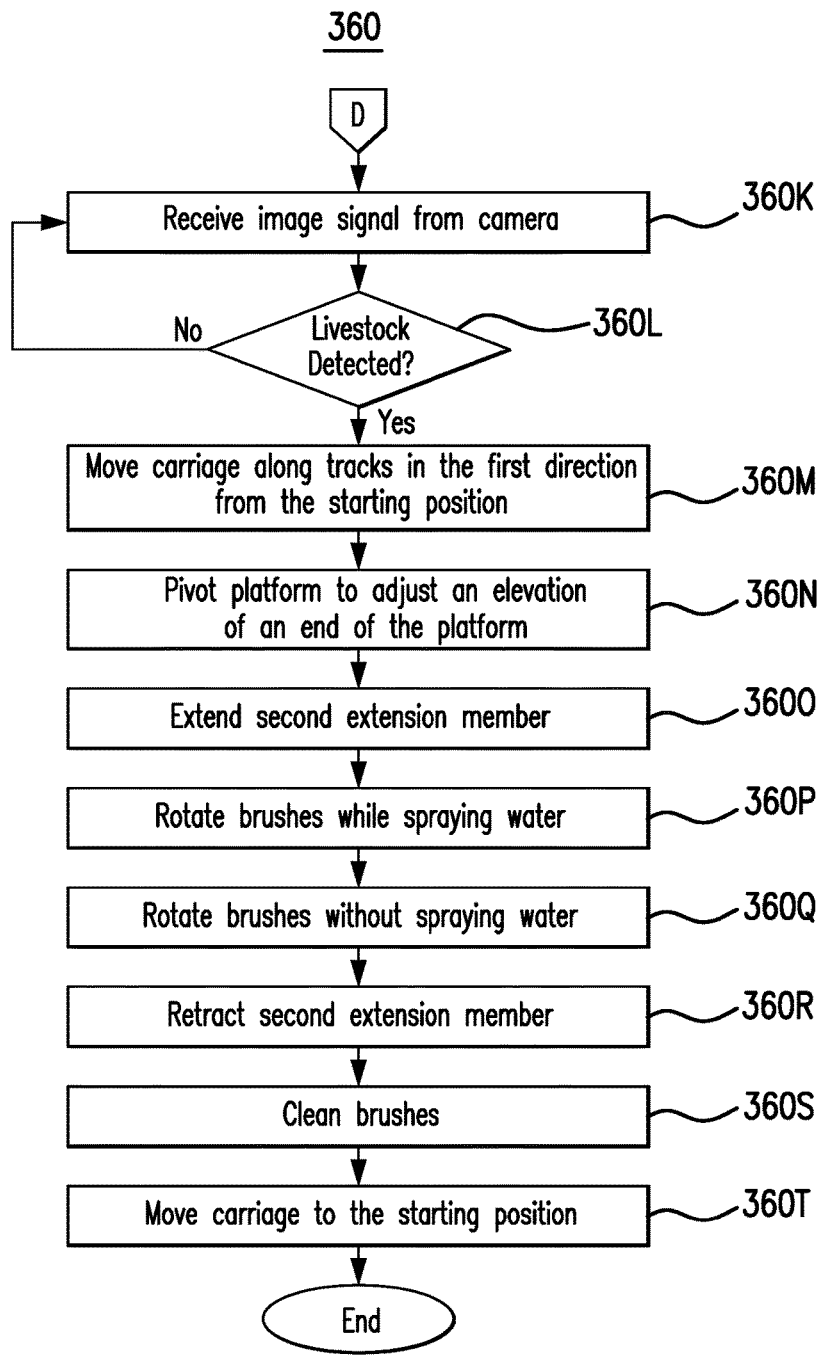

FIG. 3Q illustrates a method 360 for cleaning livestock. In particular embodiments, controller 115 performs method 360. Many of the steps in method 360 are the same as the steps in method 400 for controlling the robot of FIGS. 2A through 2AI. Further details concerning those steps may be found in the discussion of FIG. 4. By performing method 360, the teats of livestock are cleaned and potentially stimulated to produce milk.

Controller 115 begins in step 360A by receiving an image signal from a camera. The image signal may represent a livestock that has rotated in a rotary near the robot. In step 360B, controller 115 processes the image signal to determine whether livestock is detected. If livestock is not detected, then controller 115 returns to step 360A to receive another image signal from the camera. If livestock is detected, controller 115 proceeds to clean the livestock.

In step 360C, controller 115 moves the carriage along the tracks in a first direction from a starting position. By moving the carriage in the first direction along the tracks, the carriage can track the lateral movement of the livestock in the rotary. Controller 115 then pivots the platform to adjust an elevation of an end of the platform in step 360D. By adjusting the elevation of the end of the platform, controller 115 can accommodate livestock of various heights. For example, if the teats of the livestock are higher than the robot, then controller 115 pivots the platform upwards. If the teats of the livestock are lower than the robot, then controller 115 pivots the platform downwards. After the carriage is tracking the lateral movement of the livestock and the platform is properly pivoted, controller 115 extends a first extension member in step 360E. By extending the first extension member, a brush tool coupled to the first extension member is positioned near the teats of the livestock.

After the brush tool is positioned near the teats of the livestock, controller 115 proceeds to brush the livestock. In step 360F, controller 115 rotates the brushes while spraying water. The brushes are rotated to dislodge dirt and debris from the surface of the teats of the livestock. The water also dislodges and/or dissolves dirt and debris on the surface of the teats of the livestock. In step 360G, controller 115 rotates the brushes without spraying water. In this manner, the brushes are able to remove dirt, debris, and water from the surface of the teats of the livestock. In certain embodiments, the water is discharged by a nozzle positioned near the brushes and directed towards the brushes (e.g., nozzle 311).

After the livestock is brushed, controller 115 retracts the first extension member in step 360H. By retracting the first extension member, the first extension member is brought back towards the robot and the brushes are positioned underneath a cleaning hood. In step 360I, controller 115 cleans the brushes. In certain embodiments, the brushes are cleaned by spraying the brushes underneath a hood. The routine for cleaning the brushes will be described in more detail using FIG. 3S.

Controller 115 moves the carriage to the starting position in step 360J. In step 360K, controller 115 receives an image signal from the camera. As before, controller 115 processes this image signal to determine whether a new livestock is detected in step 360L. If no new livestock is detected, controller 115 returns to step 360K to receive another image signal from the camera. If a new livestock is detected, controller 115 proceeds to clean the new livestock.

In step 360M, controller 115 moves the carriage along the tracks in the first direction from the starting position to track the lateral movement of the new livestock in the rotary. Controller 115 then pivots the platform to adjust an elevation of an end of the platform in step 360N. After the carriage is tracking the lateral movement of the new livestock and the platform is properly pivoted, controller 115 extends a second extension member in step 360O. The second extension member is separate from the first extension member. By extending the second extension member, a brush tool coupled to the second extension member is positioned near the teats of the new livestock. After the brush tool is positioned near the teats of the livestock, controller 115 proceeds to brush the livestock.

In step 360P, controller 115 rotates the brushes while spraying water. In this manner, the brushes and the water dislodge dirt and debris on the surface of the teats of the livestock. In step 360Q, controller 115 rotates the brushes without spraying water. As a result, the brushes remove dirt, debris, and water from the surface of the teats of the livestock. As with previous embodiments, the time that the brushes are rotated can be adjusted for the livestock.

After the livestock is brushed, controller 115 retracts the second extension member 360R. By retracting the second extension member, controller 115 brings the extension member back towards the robot and positions the brushes coupled to the second member underneath the hood. Controller 115 then cleans the brushes in step 360S. In step 360T, controller 115 moves the carriage back to the starting position. In particular embodiments, by performing method 360, controller 115 cleans the teats of the livestock and stimulates a milk letdown.

As seen in method 360, controller 115 alternates between using brushes coupled to a first extension member and brushes coupled to a second extension member. By alternating which extension member and/or arm is used, controller 115 allows one set of brushes to be cleaned while the other set of brushes is used to clean livestock. In this manner, wait time between livestock is reduced thus allowing the rotary to spin at a greater speed.

FIG. 3S illustrates a method 365 for cleaning brushes. In particular embodiments, controller 115 performs method 365. By performing method 365, dirt and debris are dislodged and removed from the brushes. Method 365 is performed to clean the brushes coupled to an extension member while the extension member is retracted and the brushes are underneath a cleaning hood.

Controller 115 begins in step 365A by rotating the brushes. While the brushes are being rotated, controller 115 sprays the brushes with a disinfectant solution in step 365B. The nozzles under the hood spray the brushes with the disinfectant solution. In certain embodiments, the brushes are rotated in a direction opposite the direction that the brushes were rotated when brushing the livestock. In this manner, dirt and debris are move easily dislodged and removed from the brushes.

After the brushes are sprayed with a disinfectant solution, water is sprayed on the brushes in step 365C. The water may remove soap and/or disinfectant solution from the brushes. In certain embodiments, the nozzles underneath the hood spray the water. In some embodiments, a nozzle (e.g., nozzle 311) coupled to the extension member near the brushes sprays the water. After the water is sprayed on the brushes, controller 115 rotates the brushes at a higher speed in step 365D. By rotating the brushes at a higher speed, additional dirt and debris is removed from the brushes. Additionally, water may also be removed from the brushes.

By cleaning the brushes in this manner, controller 115 readies the brushes to clean subsequent livestock. By removing the dirt and debris from the brushes, the dirt and debris are not transmitted to subsequent livestock, thus reducing the chances of disease and/or infection.

In particular embodiments, by using the double-armed brush robot, the teats of livestock are cleaned, which reduces the chances of disease or infection. Additionally, the livestock is stimulated to have a milk letdown, which makes it easier to collect milk from the livestock.

IV. Second Spray Robot Embodiments

Figure 5B:
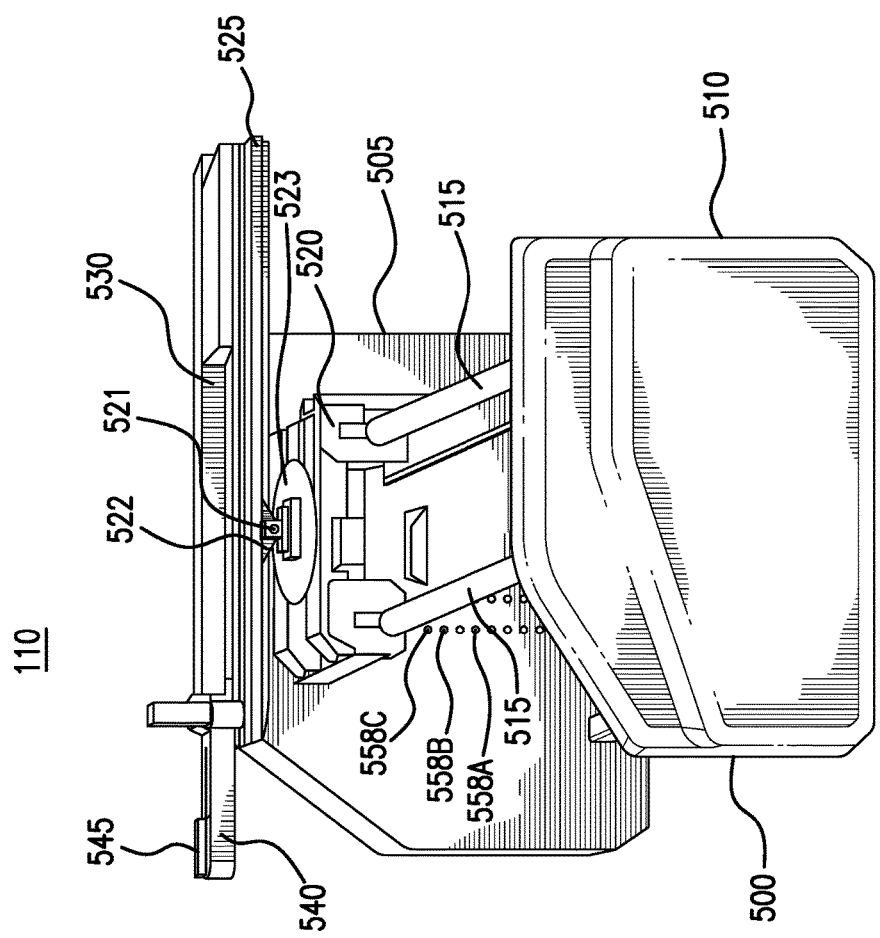

FIGS. 5A-5H show a second embodiment of robot 110 that sprays a disinfectant solution to the teats of livestock 108. FIG. 5A illustrates robot 110 positioned near rotary 105. Livestock 108 is rotating on rotary 105 past robot 110. Generally, robot 110 includes a platform moved by a carriage along tracks such that the platform tracks the lateral movement of livestock 108 as it rotates in rotary 105. As the platform moves, a camera detects and/or locates livestock 108 on rotary 105. When livestock 108 is located, robot 110 extends an extension member from the platform towards livestock 108. A spray tool is located near an end of the extension member. Robot 110 positions the spray tool near one or more teats of livestock 108. The spray tool then applies a solution such as, for example, a disinfecting solution to the one or more teats. The robot 110 retracts the extension member and moves the platform along the tracks until another livestock 108 is located. When that livestock 108 is located, the process of positioning the spray tool and applying the disinfecting solution can be repeated. In this manner, bacteria and/or viruses may be removed from livestock 108 to reduce and/or prevent the spread of disease and/or infection. Specific components of robot 110 will be described in more detail using FIGS. 5B-5H.

FIG. 5B illustrates a side view of robot 110. Generally, robot 110 moves four different components (carriage 520, platform 525, extension member 530, and spray tool member 540) to position spray tool 545 near the teat of livestock 108. As seen in FIG. 5B, robot 110 includes a base 500 formed using a first side member 505 and a second side member 510. First side member 505 and second side member 510 are formed using any suitable material such as, for example, plastic and/or metal. First side member 505 and second side member 510 are arranged on opposite ends of robot 110. First side member 505 and second side member 510 provide a foundation on which other components of robot 110 are attached. For example, tracks 515 of robot 110 couple to first side member 505 and second side member 510. First side member 505 and second side member 510 couple to opposite ends of tracks 515. First side member 505 and second side member 510 support the weight of tracks 515 and the weight of other components of robot 110 coupled to tracks 515.

First side member 505 and second side member 510 include cavities 558 through which tracks 515 may couple to first side member 505 and second side member 510. As shown in FIG. 5B, first side member 505 and second side member 510 include one or more cavities 558. Tracks 515 couple to first side member 505 and second side member 510 using cavities 558. For example, tracks 515 may include a stub that fits through cavities 558. As another example, screws may be set through cavities 558 to couple to tracks 515.

An elevation of tracks 515 can be adjusted by coupling tracks 515 through different cavities 558. For example, tracks 515 in FIG. 5B may be lowered by coupling tracks 515 to first side member 505 and second side member 510 using cavities 558A, 558B or 558C. Cavity 558A provides the lowest elevation of the three cavities 558A, 558B, and 558C. Cavity 558B provides an intermediate elevation and cavity 558C provides the highest elevation of cavities 558A, 558B, and 558C. In some embodiments, by allowing the elevation of tracks 515 to be adjusted, robot 110 is configurable for any rotary 105 height. For example, if rotary 105 is elevated, tracks 515 can be elevated on first side member 505 and second side member 510 through a higher cavity 558 (e.g., cavity 558C). As another example, if rotary 105 is lower to the ground, tracks 515 can be coupled through a lower cavity 558. In this manner, the elevation of tracks 515 is configured for any rotary 105 height.

Tracks 515 couple to first side member 505 and second side member 510. As discussed above, an elevation of tracks 515 can be adjusted by adjusting the point (e.g., cavities 558) on first side member 505 and second side member 510 at which tracks 515 couple. Tracks 515 support the weight of other components of robot 110 and allow those components to move laterally from first side member 505 to second side member 510, and vice versa, along tracks 515. Tracks 515 are formed using any suitable material such as, for example, metal. This disclosure contemplates robot 110 including any suitable number of tracks 515. As the number of tracks 515 increases, the amount of weight that can be supported by tracks 515 increases.

Robot 110 includes a carriage 520 coupled to tracks 515. Carriage 520 may be a metallic structure shaped to move laterally on tracks 515. Carriage 520 serves as a foundation upon which other components of robot 110 are mounted. When carriage 520 moves laterally along tracks 515, the components mounted onto carriage 520 also move laterally along tracks 515. In operation, controller 115 moves carriage 520 at particular velocities such that carriage 515 aligns itself with the teats of livestock 108 as livestock 108 rotates in rotary 105. In this manner, carriage 515 tracks the lateral component of livestock's 108 motion as livestock 108 rotates on rotary 105 past robot 110.

Carriage 520 includes a swivel plate 523 and a pivot coupler 521 positioned on a top surface of carriage 520. Other components of robot 110 are coupled or mounted upon carriage 520 using pivot coupler 521. Carriage 520 moves along tracks 515 laterally from first side member 505 towards second side member 510 and vice versa. As carriage 520 moves laterally along tracks 515, components of robot 110 that are coupled to carriage 520 also move laterally.

In the illustrated example of FIG. 5B, swivel plate 523 is circular and can rotate in the plane of the top surface of carriage 520. A pivot coupler 521 is positioned on swivel plate 523. Pivot coupler 521 couples other components of robot 110 to carriage 520. In some embodiments, swivel plate 523 allows these components to be rotated such that they are parallel to tracks 515 or transverse to tracks 515. When the components are parallel to tracks 515, robot 110 is configured for storage (e.g., because robot 110 is not in operation). When the components are transverse to tracks 515, robot 110 is configured for operation. As an example, a platform 525 couples to carriage 520 using pivot coupler 521. Swivel plate 523 allows platform 525 to rotate such that platform 525 is transverse to tracks 515 when robot 110 is in operation. When robot 110 is not in operation, swivel plate 523 may allow platform 525 to rotate such that platform 525 is parallel to tracks 515. When platform 525 is parallel to tracks 515, platform 525 does not extend transverse to tracks 515 which allows robot 110 to be stored more easily.

Platform 525 is a rectangular structure coupled to pivot coupler 521. Platform 525 is made of any suitable material (e.g., metal or plastic). Platform 525 provides a surface onto which other components of robot 110 are mounted. For example, extension member 530 is mounted to platform 525. Platform 525 may pivot about coupler 525. For example, platform 525 may pivot upwards or downwards about coupler 525. When platform 525 pivots about pivot coupler 521, an angle at which extension member 530 and spray tool member 540 approach livestock 108 in rotary 105 changes.

Extension member 530 is coupled to platform 525 and can move forwards and backwards along the length of platform 525. Extension member 530 is made of any suitable material (e.g., metal or plastic). When extension member moves forwards and backwards, other components coupled to extension member 530 (e.g., spray tool member 540 and spray tool 545) also move forwards and backwards.

Spray tool member 540 is coupled to extension member 530. Spray tool member 540 is made of any suitable material, such as metal or plastic. Spray tool member can rotate about a point of attachment to extension member 525. By rotating spray tool member 540, a spray angle of spray tool 545 is altered. This rotation may allow spray tool 545 to more accurately apply the disinfectant solution to the teats of livestock 108.

Spray tool 545 is coupled to an end of spray tool member 540. When spray tool 545 is positioned near the teats of livestock 108, spray tool 545 discharges or sprays a disinfectant solution onto the teats of livestock 108. Generally, robot 110 and/or controller 115 move carriage 520 along tracks 515, pivot platform 525, extend extension member 525, and rotate spray tool member 540 to position spray tool 545 at a spray location from which spray tool 545 can spray the teats of livestock 108 with a disinfectant solution.

Figure 5C:
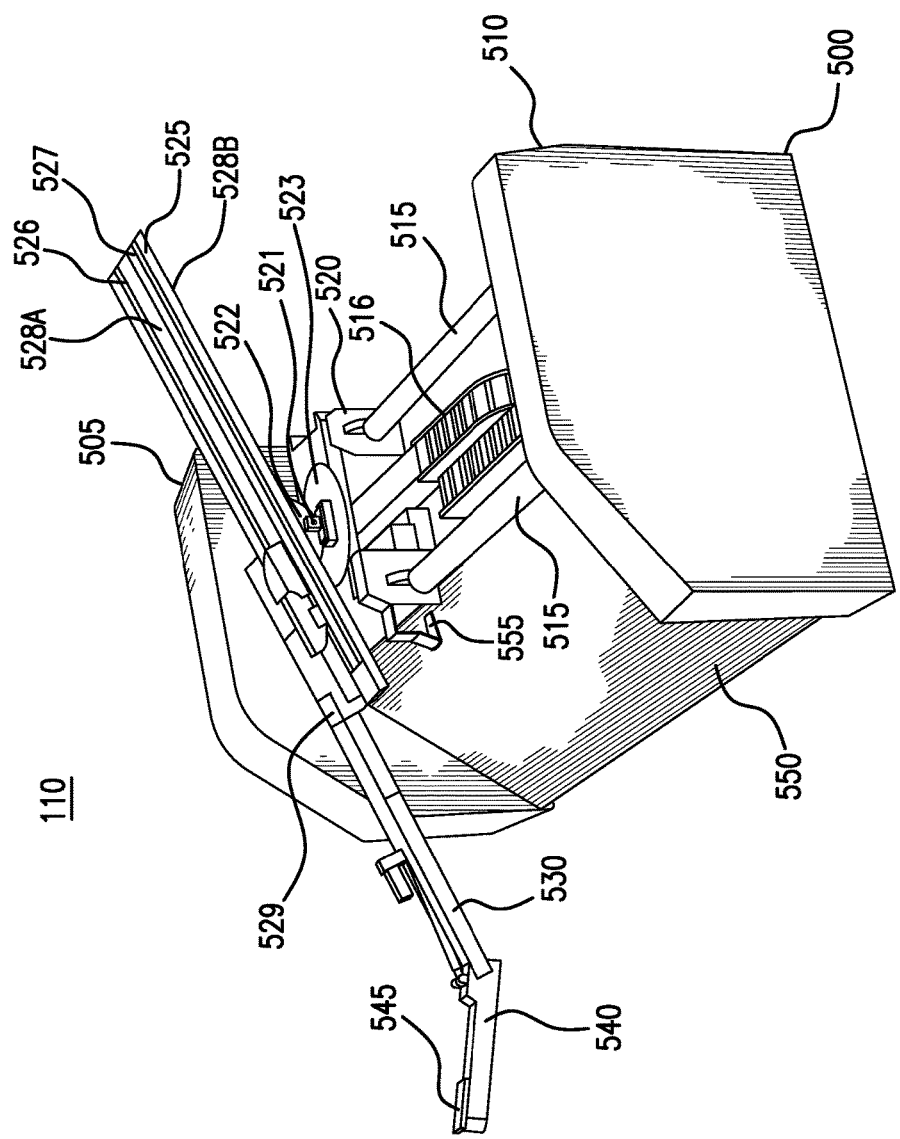

FIG. 5C illustrates robot 110 with platform 525 pivoted downwards, extension member 530 extended, and spray tool member 540 rotated.

In the example of FIG. 5C, robot 110 includes a camera 555 mounted to carriage 520. Camera 555 generates and communicates signals to controller 115. These signals represent images of livestock 108 captured by camera 555. Based on these signals, controller 115 determines the location and/or position of a teat of livestock 108. For example, controller 115 may first determine a location of the hind legs of livestock 108 from the image signal. Controller 115 may then determine that the teats of livestock 108 are located between the hind legs. Controller 115 may process the image signal to analyze the shape of objects in the image between the hind legs of livestock 108. Based on these shapes, controller 115 may determine that portions of the shapes are the teats of livestock 108. Then, controller 115 moves one or more of the four different components (carriage 520, platform 525, extension member 530, and spray tool member 540) to position spray tool 545 near the teat. Controller 115 may then activate spray tool 145 to discharge a disinfectant solution to the teat.

In conventional robotic arms 110, camera 555 may be positioned on extension member 530 and/or a spray tool member 540 of robot 110. However, such a positioning of camera 555 may result in camera 555 being kicked by livestock 108 and/or dirtied by livestock 108. By positioning camera 555 on carriage 520, camera 555 may continue to track livestock 108 in rotary 105, but camera 555 may be kept away from livestock 108 such that it is not damaged and/or dirtied by livestock 108.

The base 500 of robot 110 includes covering 550. Covering 550 may be a plastic or metallic sheet that protects certain components of robot 110. Covering 550 covers the front and/or back of robot 110 between first side member 505 and second side member 510. Covering 550 may also be positioned beneath tracks 515 between first side member 505 and second side member 510. Covering 550 protects certain components of robot 110 positioned beneath tracks 515. Covering 550 may be optional and/or removable.

As seen in FIG. 5C, carriage 520 is moved along tracks 515 by a belt 516. Belt 516 may couple to carriage 520. Belt 516 may be moved by a motor to push and/or pull carriage 520 along tracks 515. This disclosure contemplates carriage 520 being moved along tracks 520 using any appropriate mechanism, such as for example, motor, gears, ropes and pulleys, hydraulics, linear actuator, etc. In some embodiments, carriage 520 may be moved at least 1250 millimeters along tracks 515.

Platform 525 includes a top surface 528A and a bottom surface 528B. A coupler 522 is coupled to bottom surface 528B. Coupler 522 couples to pivot coupler 521 on carriage 520. In this manner, platform 525 is coupled to carriage 520. Coupler 522 is coupled to pivot coupler 521 such that platform 525 may pivot about a point of attachment on carriage 520 such as, for example, at a point of attachment on pivot coupler 521. In certain embodiments, platform 525 pivots at least 35 degrees. For example, platform 525 may pivot 16 degrees in a first direction (upwards or downwards) and 19 degrees in a second direction (downwards or upwards). By pivoting platform 525, an elevation of an end of platform 525 may be increased or decreased. In some embodiments, an actuator controls the pivoting of platform 525. This disclosure contemplates platform 525 being pivoted about the point of attachment to carriage 520 in any suitable manner, such as for example, by using a motor, gears, hydraulics, actuator, etc. For example, an actuator may push and/or pull on platform 525 so that it pivots about pivot coupler 521 and/or coupler 522. By pivoting platform 525, an angle of approach towards livestock 108 is adjusted. For example, if rotary 105 is higher than robot 110, then platform 525 can be pivoted upwards to approach livestock 108 on the higher rotary 105. If rotary 105 is lower to the ground than robot 110, then platform 525 can be pivoted downwards to approach livestock 108 that is lower on rotary 105.

Platform 525 defines a first channel 526 and a second channel 527 along the top surface 528A. Platform 525 may also include a guide 529 coupled near an end of platform 525. First channel 526 and second channel 527 run along top surface 528A along the length of platform 525 (e.g., from the back of robot 110 towards the front of robot 110 when platform 525 is transverse to tracks 515). First channel 526, second channel 527, and guide 529 may be configured to allow an extension member 530 to extend and/or retract along the length of platform 525. For example, one or more components of extension member 530 may be positioned within first channel 526 and/or second channel 527. These components move within first channel 526 and/or second channel 527 but are sized such that they do not leave or fall out of first channel 525 or second channel 527. Guide 529 may direct extension member 530 such that when extension member 530 is extending or retracting, extension member 530 does not pivot and/or rotate off course. In other words, extension member 530 passes through guide 529, which provides a physical boundary that keeps extension member 530 moving linearly towards livestock 108. As a result, guide 529 may direct extension member 530 to extend and/or retract in a linear fashion parallel to first channel 526 and/or second channel 527. In certain embodiments, a motor may control the extension and retraction of extension member 530. This disclosure contemplates using any appropriate mechanism to extend and/or retract extension member 530, such as for example, motor, gears, hydraulics, ropes and pulleys, etc.

Extension member 530 is configured to extend and/or retract along first channel 526 or second channel 527. For example, a portion of extension member 530 is positioned within first channel 526 or second channel 527. That portion moves within first channel 526 or second channel 527 but may be prevented from falling out of first channel 526 or second channel 527. By extending extension member 530, a spray tool member 540 is moved towards livestock 108 on rotary 105. After a disinfectant solution has been applied to livestock 108, extension member 530 retracts along first channel 526 or second channel 527. Guide 529 helps extension member 530 extend and/or retract along the length of platform 525. For example, guide 529 provides lateral support for extension member 530 and helps prevent extension member 530 from pivoting or rotating when extending away from platform 525. In some embodiments, a motor controls the extension and retraction of extension member 530. This disclosure contemplates extending or retracting extension member 530 using any suitable mechanism, such as for example, a motor, gears, hydraulics, ropes and pulleys, actuators, etc.

A spray tool member 540 is coupled to an end of extension member 530. Spray tool member 540 is coupled to extension member 530 such that spray tool member 540 may rotate about the point of attachment to extension member 530. In particular embodiments, by rotating spray tool member 540, spray tool 545 coupled near an end of spray tool member 540 may be positioned near a teat of livestock 108 and a direction or angle of spray of spray tool 545 may be adjusted. In this manner, spray tool member 540 and spray tool 545 can spray all surfaces of the teats of livestock 108, even if the surfaces are facing away from robot 110. For example, extension member 530 can extend such that spray tool 545 is beyond the front surface of the teat. Then, spray tool member 530 can rotate upwards so that spray tool 545 is directed upwards and backwards towards robot 110. When spray tool 545 discharges the disinfectant solution, the solution will cover the front surface of the teat. In some embodiments, a motor controls the rotation of spray tool member 540. This disclosure contemplates rotating spray tool member 540 using any suitable mechanism, such as for example, a motor, gears, hydraulics, ropes and pulleys, actuators, etc.

Spray tool 545 is coupled to spray tool member 540 near an end of spray tool member 540. Generally, spray tool 545 sprays a solution outwards and away from robot 110. For example, spray tool 545 can spray a disinfectant solution towards the teat of livestock 108. Carriage 520, platform 525, extension member 530, and spray tool member 540 may be moved and/or positioned such that spray tool 545 is near a teat of livestock 108. Spray tool 545 may then discharge a solution, such as a disinfectant, to the teat of livestock 108.

Figure 5D:
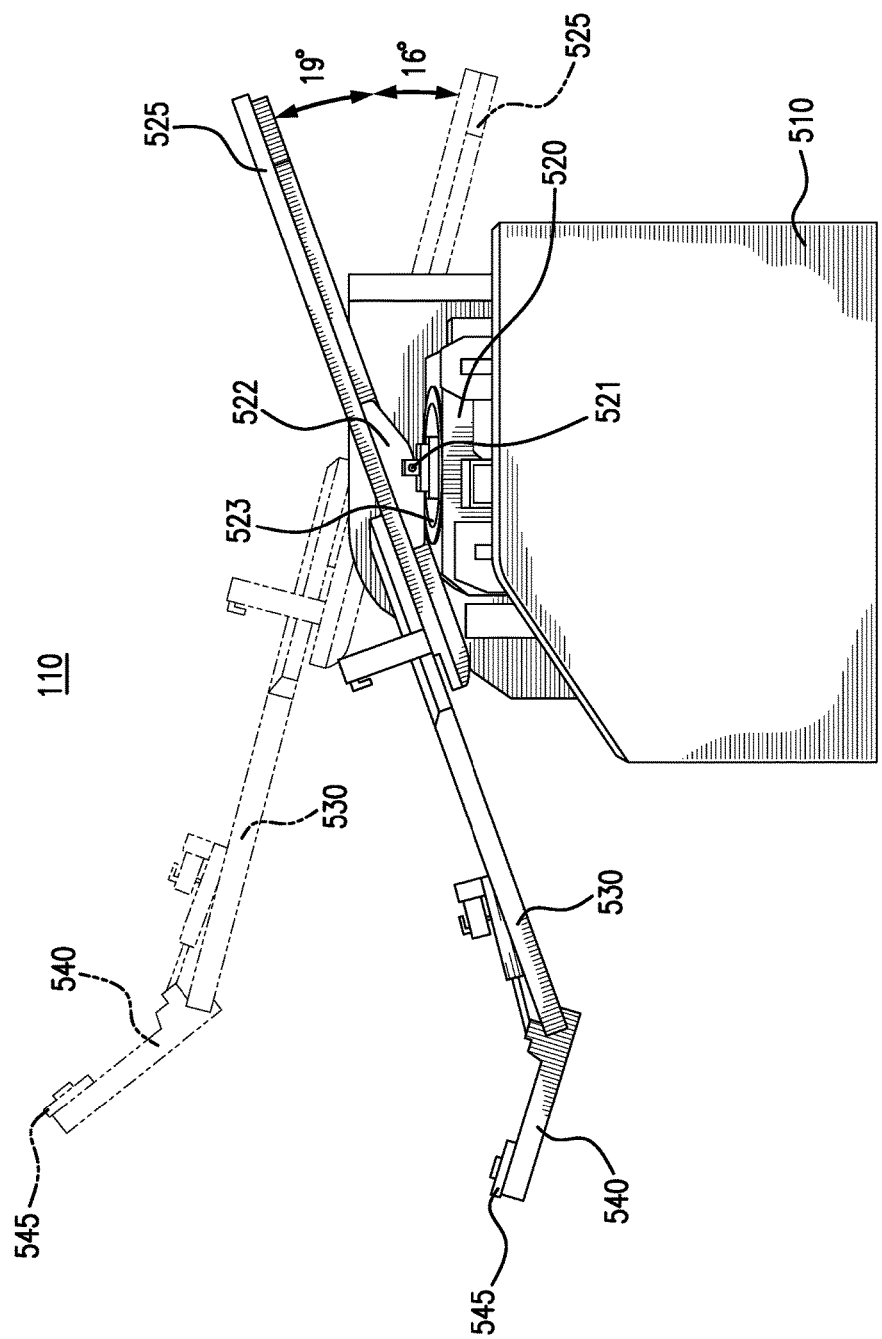

FIG. 5D shows robot 110 with extension member 530 extended and spray tool member 540 pivoted. Platform 525 is shown pivoted upwards and downwards. As seen in FIG. 5D, platform 525 can pivot up to 35 degrees (e.g., 19 degrees downwards and 16 degrees upwards). This disclosure contemplates platform 525 pivoting up to any suitable number of degrees. For example, platform 525 may pivot up to 40 or 50 degrees. Because platform can pivot both upwards and downwards, robot 110 can accommodate rotaries 105 and livestock 108 of different heights. For rotaries 105 or livestock 108 with teats that are higher than robot 110, platform 525 can be pivoted upwards so that spray tool member 540 and spray tool 545 is directed upwards when extension member 530 extends. For rotaries 105 or livestock 108 with teats that are lower than robot 110, platform 525 can be pivoted downwards so that spray tool member 540 and spray tool 545 is directed downwards when extension member 530 extends.

Figure 5E:
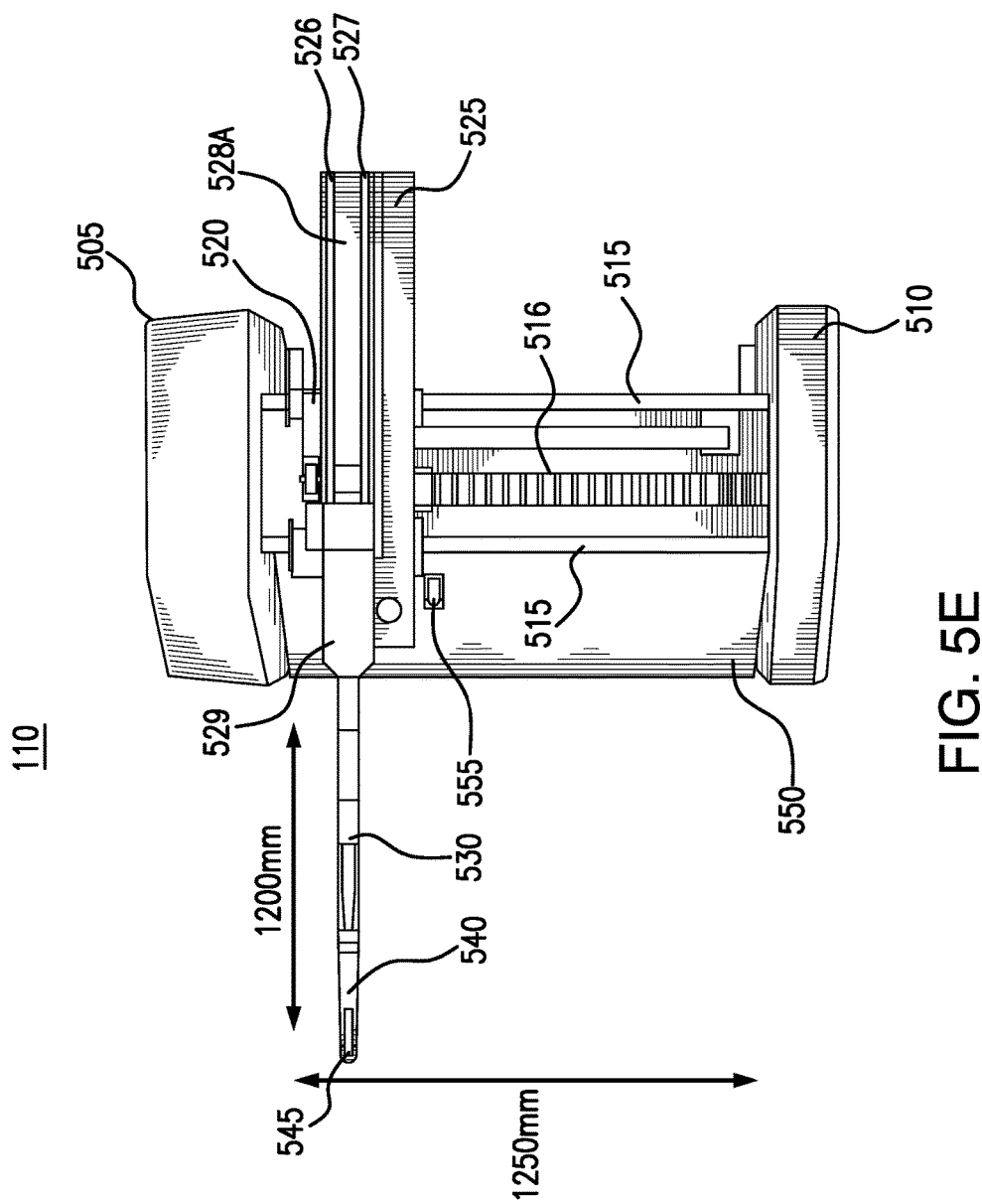

FIG. 5E illustrates a top-down view of robot 110 with extension member 530 extended. As shown in FIG. 5E, tracks 515 allow components of robot 110 (e.g., carriage 520) to move laterally up to 1250 millimeters. This disclosure contemplates tracks 515 allowing components of robot 110 to move any suitable distance. For example, tracks 515 can be any suitable length to allow components of robot 110 to move up to 2 meters, 3 meters, 4 meters, or 5 meters. Also, as shown in FIG. 5E, extension member 530 can extend up to 1200 millimeters. This disclosure contemplates extension member 530 extending up to any suitable distances, such as for example 2 meters or 3 meters.

FIG. 5F illustrates a side view of robot 110 with extension member 530 extended and spray tool member 540 rotated. As seen in FIG. 5F, extension member 530 an extend up to 1200 millimeters.

Figure 5G:
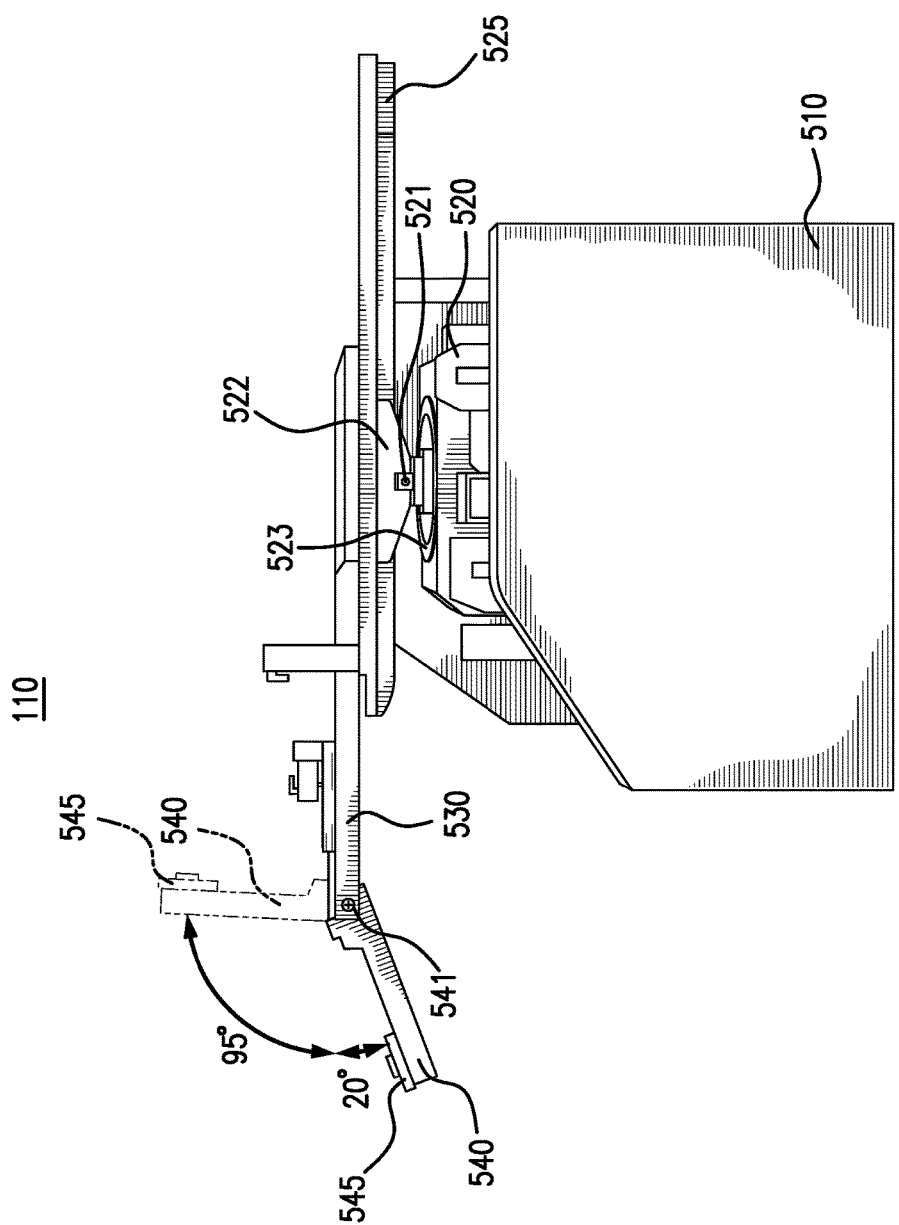

FIG. 5G shows a side view of robot 110 with spray tool member 540 rotated. As shown in FIG. 5G, spray tool member 540 may rotate up to 115 degrees about extension member 530. For example, spray tool member 540 may rotate 50 degrees in a first direction and 95 degrees in a second direction. The rotation occurs about an axis 541 directed through the point of attachment. In the illustrated example of FIG. 5G, axis 541 is directed into and out of the page.

FIG. 5H illustrates a top-down view of robot 110 with platform 525 swiveled and/or rotated. As discussed above, swivel plate 523 allows platform 525 to swivel and/or rotate into a storage configuration. In the storage configuration, platform 525 is rotated and/or swiveled such that platform 525 does not extend beyond a front surface or a back surface of robot 110. In this configuration, it becomes easier to store robot 110. As seen in FIG. 5H, platform 525 begins in an operational configuration in which platform 525 extends beyond a front or back surface of robot 110. Platform 525 can rotate and/or swivel up to 90 degrees into a storage configuration shown by the dashed silhouette of platform 525. When in the storage configuration, platform 525 does not extend beyond a front or back surface of robot 110, thus making it easier to store robot 110.

In operation, generally, robot 110 detects and locates a teat of livestock 108. Robot 110 then positions spray tool 545 near the teat of livestock 108. Spray tool 545 discharges a disinfectant solution to the teat of livestock 108. Robot 110 may then re-position spray tool 545 to apply disinfectant solution to the other teats of livestock 108. When robot 110 has finished disinfecting livestock 108, robot 110 may locate another livestock 108.

Robot 110 may move carriage 520 along tracks 515 from one end of robot 110 to another. For example, robot 110 may move carriage 520 from a starting position near first side member 505 towards second side member 510. As carriage 520 moves along tracks 515, camera 555 capture video and/or images and communicate signals representing the captured video and/or images to controller 115. These signals may represent images of livestock 108 in rotary 105. Controller 115 processes these signals to determine the location and/or position of livestock 108. Controller 115 can then adjust a velocity of carriage 520 along tracks 515 so that carriage 520 tracks the lateral movement of livestock 108 as livestock 108 rotates in rotary 105. For example, controller 115 may speed up or slow down carriage 520 such that carriage 520 tracks the lateral movement of livestock 108 in rotary 105. In some embodiments, carriage 520 is stationary on tracks 515 until controller 115 determines that livestock 108 is positioned in front of carriage 520. Controller 115 then begins moving carriage 520 along tracks 515 to track the movement of livestock 108. A belt 516 or actuator can be operated to move carriage 520 along tracks 515.

In an example embodiment, camera 555 scans rotary 105 as it rotates. When a livestock 108 is detected by camera 555, controller 115 moves carriage 520 along tracks 515 to track the motion of livestock 108. Carriage 520 moves tangentially to the rotation of rotary 105.

As carriage 520 moves to track livestock 108 in rotary 105, controller 115 controls the motions of platform 525, extension member 530, and spray tool member 540 to position spray tool 545 near a teat of livestock 108. For example, controller 115 pivots platform 525 as shown in FIGS. 5C and 5D. By pivoting platform 525, a height of spray tool 545 and an angle of approach towards livestock 108 is adjusted. For example, pivoting platform 525 may elevate spray tool 545 near the teat of livestock 108.

Controller 115 also extends and/or retract extension member 530 as shown in FIGS. 5C, 5E, and 5F. Typically, by extending extension member 530, spray tool 545 is moved closer to rotary 105 and closer to livestock 108. By retracting extension member 530, spray tool 545 is moved away from rotary 105 and/or away from livestock 108.

Controller 115 also rotates spray tool member 540 as shown in FIGS. 5C, and 5G. By rotating spray tool member 540, a direction and/or angle of spray from spray tool 545 is adjusted. For example, if spray tool 545 is below a teat of livestock 108, spray tool member 540 may be rotated to direct spray tool 545 to spray upward towards the teat.

Controller 115 may continuously adjust the position of platform 525, extension member 530, and/or spray tool member 540 to compensate for the movement of livestock 108 and/or rotary 105. When controller 115 determines, based on signals sent from camera 555 that spray tool 545 is positioned near a teat of livestock 108, controller 115 activates spray tool 545 to discharge a disinfectant solution to the teat of livestock 108. In this manner, livestock 108 is cleaned, which reduces the chances of disease and/or infection.

After the disinfectant solution has been discharged to a teat of livestock 108, controller 115 determines, based on signals from camera 555, whether there are other teats on livestock 108 that should be disinfected. If so, controller 115 moves carriage 520, platform 525, extension member 530, and/or spray tool member 540 to position spray tool 545 near another teat of livestock 108. If there are no other teats on livestock 108 that should be disinfected, controller 115 considers livestock 108 cleaned.

In some embodiments, after controller 115 determines that livestock 108 is disinfected, controller 115 begins moving carriage 520 in an opposite direction (e.g., back towards a starting position). For example, carriage 520 may be moving towards second side member 510 when controller 115 determines that a livestock 108 is disinfected. As a result, controller 115 begins moving carriage 520 back towards first side member 505. While carriage 520 is moving back towards first side member 505 to a starting position, camera 555 continues capturing video and/or images and communicates signals representing the captured video and images to controller 115. If controller 115 detects another livestock 108 based on those signals, controller 115 reverses the direction of carriage 520 such that carriage 520 is moving back towards second side member 510. Controller 115 controls the speed of carriage 520 such that carriage 520 begins tracking the newly detected livestock 108. Controller 115 then pivots platform 525, extends extension member 530, and rotates spray tool member 540 to position spray tool 545 near the teats of the newly detected livestock 108. As a result, carriage 520 need not return to a starting position by first side member 505 before robot 110 begins tracking another livestock 108, thus resulting in reduced downtime for robot 110 between livestock 108. Because carriage 520 reverses direction before reaching the starting position near first side member 505, rotary 105 may be rotated at a faster speed which may allow livestock 108 to be moved through system 100 faster.

FIG. 7 is a flowchart illustrating a method 700 of operating a robot 110 of the system 100 of FIG. 1. In particular embodiments, a controller 115 performs method 700. By performing method 700, livestock are disinfected which prevents the spread of disease and/or infection.

Controller 115 begins by moving a carriage along a track in a first direction from a starting position in step 705. Controller 115 uses a motor, belt, pulley, actuator, etc. to push and/or pull the carriage along the tracks. As the carriage moves along the track, a platform coupled to the carriage also moves along the track. The movement of the carriage and the platform tracks the lateral movement of a livestock as it rotates on the rotary. As the rotary rotates, a camera coupled to the carriage communicates signals representative of the livestock to controller 115. In step 710, controller 115 receives an image signal from the camera. Controller 115 processes that signal to determine whether a livestock was detected in step 715. If livestock was not detected in step 715, controller 115 returns back to step 705.

In particular embodiments, controller 115 skips step 705 and does not move the platform or the carriage along the tracks until it has detected livestock. If livestock is not detected in step 715, controller 115 keeps the carriage and platform stationary at the starting position.

If controller 115 detects livestock in step 715, then controller 115 pivots the platform in step 720. Controller 115 can use a motor, pulley, belt, actuator, etc. to pivot the platform. By pivoting the platform, an elevation of the spray tool is adjusted. Additionally, by pivoting the platform, an angle of approach towards the livestock is adjusted. In this manner, robot 110 can accommodate rotaries and livestock of various heights. For example, if the rotary or the teats of the livestock are higher than robot 110, controller 115 can pivot the platform upwards to direct the spray tool upwards towards the rotary and teats of the livestock. If the rotary or the teats of the livestock are lower than robot 110, controller 115 can pivot the platform downwards to direct the spray tool downwards towards the rotary and the teats of the livestock.

Controller 115 extends an extension member in step 721. Controller 115 uses a motor, pulley, belt, actuator, etc. to extend the extension member. The extension member extends along a length of the platform towards the rotary and the livestock. By extending the extension member, the spray tool is moved closer to the livestock.

Controller rotates a spray tool member in step 722. Controller 115 uses a motor, actuator, etc. to rotate the spray tool member. By rotating the spray tool member, the direction and/or angle of the discharge from the spray tool is controlled. For example, if the spray tool is below the livestock, controller 115 rotates the spray tool member such that the spray tool discharges the disinfectant upwards.

By performing steps 705, 720, 721, 722, and 723, controller 115 positions a spray tool between the hind legs of the livestock at a spray position from which the spray tool can discharge a disinfectant to the teats of the livestock. In step 723, controller 115 activates the spray tool and discharges a solution (e.g., disinfectant) to the teats of the livestock.

In step 725, controller 115 determines whether the livestock is finished. For example, if controller 115 determines that all the teats of the livestock have been disinfected, controller 115 determines that the livestock is finished. However, if controller 115 determines that there are additional teats on the livestock that have yet to be disinfected, controller 115 determines that the livestock is not finished. If controller 115 determines that the livestock is not finished, controller 115 returns to step 720 to position the spray tool near the teat that has not been disinfected. For example, controller 115 pivots the platform, extends the extension member, and rotates the spray tool member to position the spray tool near the teat that has not been disinfected. The spray tool then discharges the disinfectant to the teat. In some embodiments, controller 115 retracts the extension member instead of extending it to reposition the spray tool near an uncleaned teat of the livestock. In other words, controller 115 may retract and/or extend the platform to re-position the spray tool near a teat that should be disinfected.

After controller 115 determines that the livestock is clean, controller 115 retracts the extension member in step 728. The extension member retracts along the length of the platform. By retracting the extension member, the spray tool is moved away from the livestock.

When controller 115 determines that the livestock is finished, controller 115 moves the platform along the track in a second direction towards the starting position in step 730. As the platform moves along the tracks back towards the starting position, controller 115 receives signals from the camera in step 733. In step 735, controller 115 determines, based on the received signals, whether another livestock is detected in step 735. If another livestock is detected, controller 115 reverses the direction of the platform such that the platform moves along the tracks back in the first direction away from the starting position in step 740. Controller 115 then again pivots the platform, extends the extension member, and rotates the spray tool member to position the spray tool in steps 720, 721, and 722. In this manner, controller 115 reduces downtime between livestock in the rotary, which may allow the rotary to rotate faster without livestock being missed or insufficiently cleaned.

If another livestock is not detected, controller 115 continues moving the carriage along the track back towards the starting position until the carriage has reached the starting position. Controller 115 determines whether the carriage has reached the starting position in step 745. If the carriage has reached the starting position, controller 115 concludes method 700. If the carriage has not reached the starting position, controller 115 continues moving the carriage back towards the starting position. From the starting position, controller 115 continues monitoring signals from the camera to determine wither livestock is detected. When livestock is detected, controller 115 begins method 700 again.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to methods 350, 355, 360, 365, 400, and 700 depicted in FIGS. 3D, 3O-3S, 4, and 7. Methods 350, 355, 360, 365, 400, and 700 may include more, fewer, or other steps. For example, steps may be performed in parallel or in any suitable order. While discussed as controller 115 (or components thereof) performing the steps, any suitable component of system 100 may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
   a carriage movably coupled to a track;
   a camera coupled to the carriage;
   a spray tool coupled to the carriage; and
   a controller configured to:
      based on a first signal received from the camera, move the carriage along the track away from a starting position on the track;
      as the carriage is moving away from the starting position based on the first signal, discharge, through the spray tool, a solution for a first time;
      after the solution has been discharged for the first time, move the carriage along the track towards the starting position;
      based on a second signal received from the camera as the carriage is moving back towards the starting position and before the carriage has reached the starting position, move the carriage along the track away from the starting position; and
      as the carriage is moving away from the starting position based on the second signal, discharge, through the spray tool, the solution for a second time.

2. The apparatus of claim 1, wherein the first signal corresponds to a portion of a first dairy livestock and the second signal corresponds to a portion of a second dairy livestock.

3. The apparatus of claim 1, wherein the controller is further configured to, as the carriage is moving away from the starting position based on the first signal and after the solution is discharged for the first time, reposition the spray tool and discharge, through the spray tool, the solution after the spray tool is repositioned.

4. The apparatus of claim 1, further comprising:
   a platform coupled to the carriage and positioned above the carriage, the platform having a length and a width orthogonal to the length, the length greater than the width, the platform comprising a front end and a back end, the platform configured to pivot such that the front end and the back end of the platform move vertically in opposite directions;
   an extension member movably coupled to the platform, the extension member comprising a front end and a back end, the extension member having a longitudinal axis that extends from the front end of the extension member to the back end of the extension member and is parallel to the length of the platform, the spray tool coupled to the front end of the extension member; and
   the controller is further configured to move the extension member towards the front end of the platform based on the first signal.

5. The apparatus of claim 4, wherein the controller is further configured to retract the extension member towards the back end of the platform before moving the carriage back towards the starting position.

6. The apparatus of claim 1, wherein the controller is further configured to move the carriage along the track towards the starting position after the solution has been discharged for the second time.

7. The apparatus of claim 6, wherein the controller is further configured to wait for a third signal from the camera if the carriage reaches the starting position after the solution has been discharged for the second time.

8. A method comprising:
   based on a first signal received from a camera, moving a carriage along a track away from a starting position on the track, the carriage movably coupled to the track, the camera coupled to the carriage;

as the carriage is moving away from the starting position based on the first signal, discharging, through a spray tool coupled to the carriage, a solution for a first time;

after the solution has been discharged for the first time, moving the carriage along the track towards the starting position;

based on a second signal received from the camera as the carriage is moving back towards the starting position and before the carriage has reached the starting position, moving the carriage along the track away from the starting position; and as the carriage is moving away from the starting position based on the second signal, discharging, through the spray tool, the solution for a second time.

9. The method of claim 8, wherein the first signal corresponds to a portion of a first dairy livestock and the second signal corresponds to a portion of a second dairy livestock.

10. The method of claim 8, further comprising, as the carriage is moving away from the starting position based on the first signal and after the solution is discharged for the first time, repositioning the spray tool and discharging, through the spray tool, the solution after the spray tool is repositioned.

11. The method of claim 8, further comprising:

pivoting a platform coupled to the carriage such that a front end and a back end of the platform move vertically in opposite directions, the platform positioned above the carriage, the platform having a length and a width orthogonal to the length, the length greater than the width;

moving an extension member towards the front end of the platform based on the first signal, the extension member movably coupled to the platform, the extension member comprising a front end and a back end, the extension member having a longitudinal axis that extends from the front end of the extension member to the back end of the extension member and is parallel to the length of the platform, the spray tool coupled to the front end of the extension member.

12. The method of claim 11, further comprising retracting the extension member towards the back end of the platform before moving the carriage back towards the starting position.

13. The method of claim 8, further comprising moving the carriage along the track towards the starting position after the solution has been discharged for the second time.

14. The method of claim 13, further comprising waiting for a third signal from the camera if the carriage reaches the starting position after the solution has been discharged for the second time.

15. A system comprising:
a rotary; and
a robot comprising:
a carriage movably coupled to a track;
a camera coupled to the carriage;
a spray tool coupled to the carriage; and
a controller configured to:
based on a first signal received from the camera, move the carriage along the track away from a starting position on the track;
as the carriage is moving away from the starting position based on the first signal, discharge, through the spray tool, a solution for a first time;
after the solution has been discharged for the first time, move the carriage along the track towards the starting position;
based on a second signal received from the camera as the carriage is moving back towards the starting position and before the carriage has reached the starting position, move the carriage along the track away from the starting position; and
as the carriage is moving away from the starting position based on the second signal, discharge, through the spray tool, the solution for a second time.

16. The system of claim 15, wherein the first signal corresponds to a portion of a first dairy livestock in the rotary and the second signal corresponds to a portion of a second dairy livestock in the rotary.

17. The system of claim 15, wherein the controller is further configured to, as the carriage is moving away from the starting position based on the first signal and after the solution is discharged for the first time, reposition the spray tool and discharge, through the spray tool, the solution after the spray tool is repositioned.

18. The system of claim 15, further comprising:

a platform coupled to the carriage and positioned above the carriage, the platform having a length and a width orthogonal to the length, the length greater than the width, the platform comprising a front end and a back end, the platform configured to pivot such that the front end and the back end of the platform move vertically in opposite directions;

an extension member movably coupled to the platform, the extension member comprising a front end and a back end, the extension member having a longitudinal axis that extends from the front end of the extension member to the back end of the extension member and is parallel to the length of the platform, the spray tool coupled to the front end of the extension member; and the controller is further configured to move the extension member towards the front end of the platform and towards the rotary based on the first signal.

19. The system of claim 18, wherein the controller is further configured to retract the extension member towards the back end of the platform and away from the rotary before moving the carriage back towards the starting position.

20. The system of claim 15, wherein the controller is further configured to move the carriage along the track towards the starting position after the solution has been discharged for the second time.

21. The system of claim 20, wherein the controller is further configured to wait for a third signal from the camera if the carriage reaches the starting position after the solution has been discharged for the second time.

* * * * *